US006654738B2

(12) United States Patent
Nishioka et al.

(10) Patent No.: US 6,654,738 B2
(45) Date of Patent: *Nov. 25, 2003

(54) COMPUTER PROGRAM EMBODIED ON A COMPUTER-READABLE MEDIUM FOR A DOCUMENT RETRIEVAL SERVICE THAT RETRIEVES DOCUMENTS WITH A RETRIEVAL SERVICE AGENT COMPUTER

(75) Inventors: Shingo Nishioka, Hiki-gun (JP); Makoto Iwayama, Kawagoe (JP); Kazuhiro Ono, Hiki-gun (JP); Akihiko Takano, Higashimatsuyama (JP); Yoshiki Niwa, Hiki-gun (JP); Atsuko Yamaguchi, Higashimatsuyama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/015,790

(22) Filed: Dec. 17, 2001

(65) Prior Publication Data

US 2002/0042792 A1 Apr. 11, 2002

Related U.S. Application Data

(63) Continuation of application No. 09/515,323, filed on Feb. 29, 2000, now Pat. No. 6,446,065, which is a continuation of application No. 09/145,155, filed on Sep. 1, 1998, which is a continuation-in-part of application No. 08/888,017, filed on Jul. 3, 1997, now Pat. No. 5,987,460.

(30) Foreign Application Priority Data

Sep. 5, 1997 (JP) .............................. 9-240963

(51) Int. Cl.[7] .............................................. G06F 17/30
(52) U.S. Cl. ................................... 707/3; 707/5; 707/6
(58) Field of Search .......................... 707/3, 5, 104.1, 707/4, 6

(56) References Cited

U.S. PATENT DOCUMENTS 4,734,848 A 3/1988 Yamano et al. ............. 717/149

(List continued on next page.)

FOREIGN PATENT DOCUMENTS

| JP | 8-161343 | 6/1996 |
| JP | 9-062693 | 3/1997 |

OTHER PUBLICATIONS

Proceedings of the 1st ACM International Conference on Digital Libraries '96. Interactive Term Suggestion for Users of Digital Libraries: Using Subject Thesauri and Co–occurrence Lists for Information REtrieval, B. Schatz et al, pp. 126–133. (no date).

"Information Retrieval Using Pathfinder Networks. In Pathfinder Associative Networks", Ablex. article 12, 1990, R.H. Fowler et al.

*Primary Examiner*—Charles Rones
(74) *Attorney, Agent, or Firm*—Mattingly, Stanger & Malur, P.C.

(57) ABSTRACT

A document retrieval assistance method has a user interface with an interactive guidance function. In response to a search query, search results including a title list of retrieved documents is displayed alongside a separate display of topic words extracted from the retrieved documents which reflect the search results. In particular, a topic-word graph is displayed alongside a list of titles of the retrieved documents and the interface enables browsing of the documents using the topic words. Further, the interface permits emphasized display of the list of titles of the documents through direct selection of the titles displayed in the list or through selection of the topic words. Further, an associative search can be executed using a selected document to refine the original search results and develop updated displays of the search results and topic words contained in the documents.

1 Claim, 58 Drawing Sheets

U.S. PATENT DOCUMENTS

| | | | |
|---|---|---|---|
| 5,544,049 A | * 8/1996 | Henderson et al. | 704/7 |
| 5,544,352 A | 8/1996 | Egger | 707/5 |
| 5,598,557 A | * 1/1997 | Doner et al. | 707/5 |
| 5,606,690 A | 2/1997 | Hunter et al. | 707/5 |
| 5,694,594 A | * 12/1997 | Chang | 707/6 |
| 5,713,016 A | 1/1998 | Hill | 707/5 |
| 5,754,939 A | 5/1998 | Herz et al. | 455/3.04 |
| 5,794,178 A | 8/1998 | Caid et al. | 704/9 |
| 5,798,752 A | 8/1998 | Buxton et al. | 345/863 |
| 5,832,494 A | 11/1998 | Egger et al. | 707/102 |
| 5,838,965 A | 11/1998 | Kavanagh et al. | 707/103 R |
| 5,845,278 A | 12/1998 | Kirsch et al. | 707/3 |
| 5,893,087 A | * 4/1999 | Wlaschin et al. | 707/3 |
| 5,911,138 A | 6/1999 | Li et al. | 707/3 |
| 5,987,460 A | 11/1999 | Niwa et al. | 707/6 |
| 6,006,221 A | * 12/1999 | Liddy et al. | 707/5 |
| 6,038,561 A | * 3/2000 | Snyder et al. | 707/6 |
| 6,112,203 A | * 8/2000 | Bharat et al. | 707/5 |
| 6,446,065 B1 | * 9/2002 | Nishioka et al. | 707/5 |
| 6,457,004 B1 | * 9/2002 | Nishioka et al. | 707/5 |
| 6,493,703 B1 | * 12/2002 | Knight et al. | 707/3 |
| 2003/0041058 A1 | * 2/2003 | Ibuki et al. | 707/4 |

OTHER PUBLICATIONS

Proceedings of the 15th Annual International SIGIR '92/ Denmark. "Scatter/Gather: A Cluster–based Approach to Browsing Large Document Collections", D. Cutting et al, pp. 318–329.

Introduction to Modern Information Retrieval, Chapter 6, G. Salton et al. (no dates).

* cited by examiner

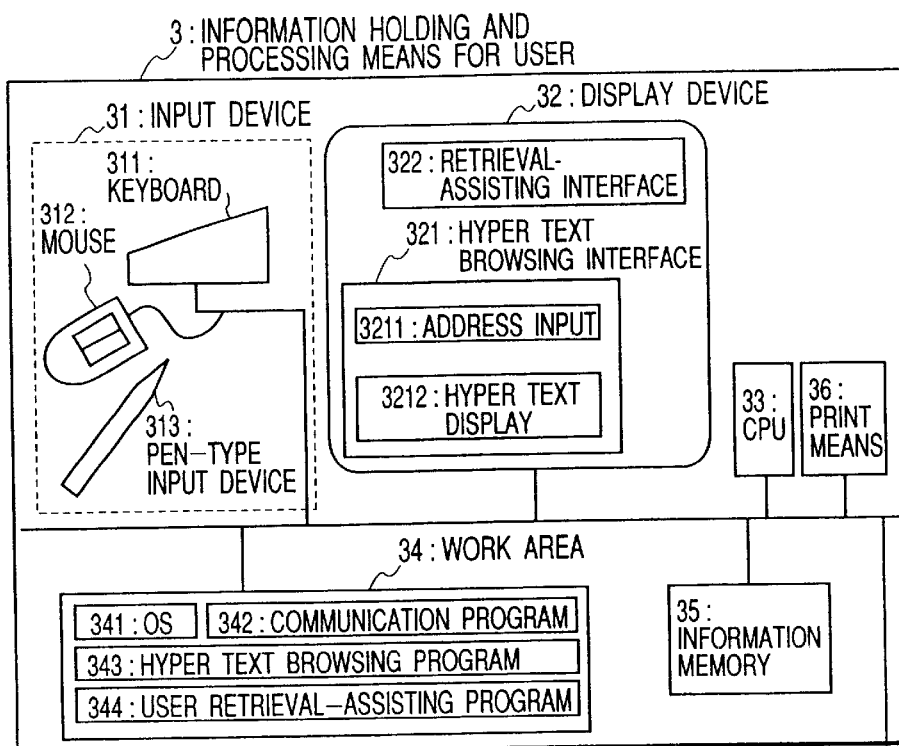
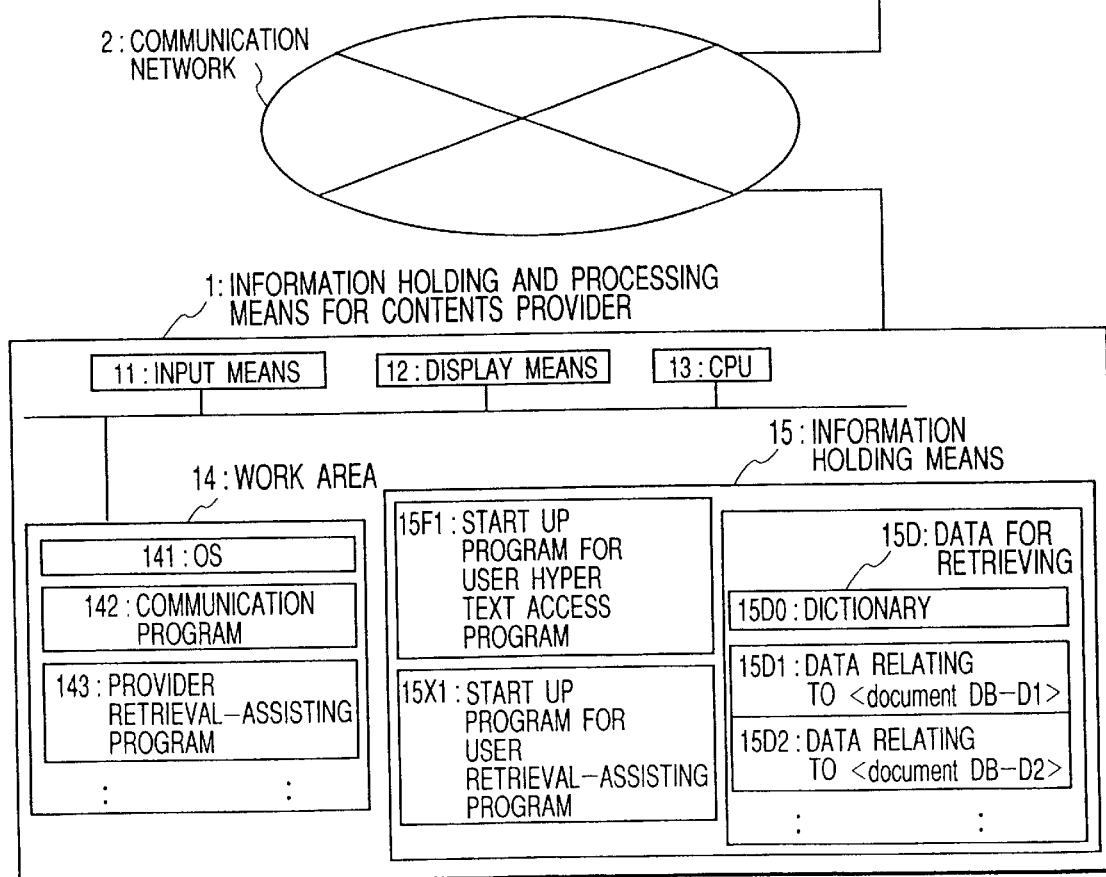
FIG. 1

FIG. 2

344: USER RETRIEVAL-ASSISTING PROGRAM

3441: USER RETRIEVAL-ASSISTING ROUTINE

3442: DATA AREA

34421: AREA FOR STORING PARAMETER

344211: PARAMETER FOR DISPLAYING THE SEARCH RESULT

344212: PARAMETER FOR DISPLAYING A GRAPH OF TOPIC WORDS

34422: AREA FOR STORING INTERFACE DISPLAYING DATA

34423: AREA FOR STORING QUERY

34424a: AREA FOR STORING THE SEARCH RESULT

34424b: AREA FOR STORING DISPLAY ORDER OF THE SEARCH RESULT

34425: AREA FOR STORING TOPIC WORDS

34426: AREA FOR STORING LINK INFORMATION BETWEEN TOPIC WORDS

34427: AREA FOR STORING CORRESPONDING TABLE BETWEEN TOPIC WORDS AND DOCUMENTS

34428: AREA FOR STORING CORRESPONDING TABLE BETWEEN DOCUMENTS AND TOPIC WORDS (SUB-ROUTINES)

3443: ROUTINE FOR GENERATING DISPLAY DATA OF THE SEARCH RESULT

3444: ROUTINE FOR GENERATING DISPLAY DATA OF TOPIC WORDS GRAPH

3445: ROUTINE FOR GENERATING DISPLAY DATA OF TOPIC WORDS LIST

FIG. 4

34422 : AREA FOR STORING INTERFACE DISPLAYING DATA

| 34422F1 : DATA FOR DISPLAYING TOTAL AREA |
|---|
| 34422M1 : DATA FOR DISPLAYING AREA OF SEARCH OBFECT |
| 34422T : DATA FOR DISPLAYING AREA OF TEXT INPUT WINDOW |

34422E1 : DATA FOR DISPLAYING AREA OF QUERY

| 34422E11 : POSITION | (5, 20) |
|---|---|
| 34422E12 : SIZE | 80 (character) |
| 34422E13 : DISPLAY CONTENTS | (empty) |
| 34422E14 : OFFSET | 0 (character) |
| 34422E15 : CURSOR POSITION | 0 (character) |
| 34422E16 : MARK POSITION | 0 (character) |
| OTHERS | (BACKGROUND COLOR, FONT, FRAME STYLE ETC..........) |

| 34422P1 : DATA FOR DISPLAYING AREA OF THE SEARCH RESULT |
|---|
| 34422P2 : DATA FOR DISPLAYING AREA TOPIC WORD |

34422B : DATA FOR DISPLAYING BUTTON

| 34422B01 : 「Keyword Search」 | 34422B02 : 「Associative Search」 |
|---|---|
| 34422B03 : 「Text Input」 | 34422B04 : 「Quit」 |
| 34422B11 : 「Expand」 | 34422B21 : 「Propagate」 |
| 34422B12 : 「Prune」 | |
| 34422B13 : 「UnSelect (title)」 | 34422B23 : 「UnSelect (topic words)」 |
| 34422B31 : 「Mark Title」 | 34422B41 : 「Mark Topics」 |
| 34422B32 : 「Gather」 | 34422B42 : 「Select」 |
| 34422B33 : 「Clear」 | 34422B43 : 「Clear」 |

34422L : DATA FOR DISPLAYING CHARACTER ROW

| 34422L11 : 「Total Number」 | 34422L21 : 「Total Number」 |
|---|---|
| 34422L12 : VALUE OF TOTAL NUMBER | 34422L22 : VALUE OF TOTAL NUMBER OF TOPIC WORDS |
| 34422L13 : 「Selected Number」 | 34422L21 : 「Selected Number」 |
| 34422L14 : VALUE OF SELECTED NUMBER | 34422L21 : VALUE OF SELECTED NUMBER OF TOPIC WORDS |

FIG. 7

34422P1 : DATA FOR DISPLAYING AREA OF THE SEARCH RESULT

34422P11 : DISPLAY POSITION (20, 150)

34422P12 : AREA SIZE (180, 200)

34422P13 : OFFSET (0, 0)

34422P14 : OBJECTS

| POSITION | TYPE OF OBJECTS | CONTENTS |
|---|---|---|
| (40, 30) | RECTANGLE | SIZE=(5, 5)  COLOR=TRANSPARENT |
| (60, 30) | TEXT | TEXT="2" |
| (80, 30) | TEXT | TEXT=\<title−a1\> |
| (40, 60) | RECTANGLE | SIZE=(5, 5)  COLOR=TRANSPARENT |
| (60, 60) | TEXT | TEXT="2" |
| (80, 60) | TEXT | TEXT=\<title−a2\> |
| (40, 90) | RECTANGLE | SIZE=(5, 5)  COLOR=TRANSPARENT |
| (60, 90) | TEXT | TEXT="1" |
| (80, 90) | TEXT | TEXT=\<title−a3\> |
| ⋮ | ⋮ | ⋮ |

FIG. 8

34422P2 : DATA FOR DISPLAYING AREA TOPIC WORD

34422P21 : DISPLAY POSITION (220, 150)

34422P22 : AREA SIZE (180, 200)

34422P23 : OFFSET (0, 0)

34422P24 : OBJECTS

| POSITION | TYPE OF OBJECTS | CONTENTS |
|---|---|---|
| (80, 80) | LINE | END POSITION=(100, 30) |
| (150, 100) | LINE | END POSITION=(100, 30) |
| (60, 160) | LINE | END POSITION=( 80, 80) |
| (140, 170) | LINE | END POSITION=( 80, 80) |
| (100, 30) | TEXT | TEXT=<topic word−a1><br>BACKGROUND COLOR=GREEN |
| ( 80, 80) | TEXT | TEXT=<topic word−a2><br>BACKGROUND COLOR=GREEN |
| (150, 100) | TEXT | TEXT=<topic word−a3><br>BACKGROUND COLOR=GREEN |
| ( 60, 160) | TEXT | TEXT=<topic word−a4><br>BACKGROUND COLOR=GREEN |
| ( 140, 170) | TEXT | TEXT=<topic word−a5><br>BACKGROUND COLOR=GREEN |

FIG. 9

34423: AREA FOR STORING QUERY

344231: AREA FOR STORING SEARCH METHOD

Keyword Search

344232: AREA FOR STORING SEARCH EXPRESSION

< KW-a1 > or < KW-a2 >

344233: AREA FOR STORING TARGET DB

< document DB-D1 >

344234: UPPER LIMIT OF NUMBER OF SEARCH RESULT

143: PROVIDER RETRIEVAL-ASSISTING PROGRAM

1431: PROVIDER RETRIEVAL-ASSISTING ROUTINES

1432: DATA AREA

| 14321: AREA FOR STORING PARAMETER |
| --- |
| 14322: AREA FOR STORING QUERY |
| 14323: AREA FOR STORING THE SEARCH RESULT |
| 14324: AREA FOR STORING TOPIC WORDS |
| 14325: AREA FOR STORING LINK INFORMATION BETWEEN TOPIC WORDS |
| 14326: AREA FOR STORING CORRESPONDING TABLE BETWEEN TOPIC WORDS AND DOCUMENTS |
| 14327: AREA FOR STORING CORRESPONDING TABLE BETWEEN DOCUMENTS AND TOPIC WORDS |
| 14328: AREA FOR STORING TOPIC WORDS COOCCURRENCE TABL |

(SUB-ROUTINES)

| 1433: ORTHOGRAPH ROUTINE |
| --- |
| 1434a: WORD SPELLING-WORD ID LOOKUP ROUTINE |
| 1434b: WORD ID WORD-SPELLING LOOKUP ROUTINE |
| 1435: KEYWORD SEARCH ROUTINE |
| 1436: ASSOCIATIVE SEARCH ROUTINE |
| 1437: TOPIC WORD EXTRACT ROUTINE |
| 1438: TOPIC WORDS COOCCURRENCE TABLE GENERATE ROUTINE |
| 1439: ROUTINE FOR GENERATE LINKS BETWEEN TOPIC WORDS |

FIG. 11

15D1 : DATA FOR <document DB-D1>

15D11 : DOCUMENT DATABASE

15D12 : ARTICLE ID TO WORD ID LOOKUP TABLE

| ARTICLE ID | LIST OF WORD ID | | |
|---|---|---|---|
| ⋮ | ⋮ | ⋮ | |
| d | (W1, f1) | (w2, f2), | ⋯ |
| ⋮ | ⋮ | ⋮ | |

15D13 : WORD ID TO ARTICLE ID LOOKUP TABLE

| WORD ID | LIST OF ARTICLE ID | | |
|---|---|---|---|
| ⋮ | ⋮ | ⋮ | |
| w | (d1, f'1) | (d2, f'2), | ⋯ |
| ⋮ | ⋮ | ⋮ | |

15D14 : WORD FREQUENCY DATA

| WORD ID | TERM FREQUENCY | DOCUMENT FREQUENCY |
|---|---|---|
| ⋮ | ⋮ | ⋮ |
| d | F(d) | DF(d) |
| ⋮ | ⋮ | ⋮ |

15D15 : CLUSTER TREE DATA

FIG. 13A

34424a : AREA FOR STORING THE SEARCH RESULT

| TEMPORAL ARTICLE ID | SELECTION FLAG | MARK INTENSITY | ARTICLE ID | RELEVANCE SCORE | TITLE |
|---|---|---|---|---|---|
| 1 | 0 | 0 | <article-a1> | 2 | <title-a1> |
| 2 | 0 | 0 | <article-a2> | 2 | <title-a2> |
| 3 | 0 | 0 | <article-a3> | 1 | <title-a3> |
| 4 | 0 | 0 | <article-a4> | 1 | <title-a4> |
| ⋮ | ⋮ | ⋮ | ⋮ | ⋮ | ⋮ |
| N | 0 | 0 | <article-aN> | 1 | <title-aN> |

FIG. 13B

34424b : AREA FOR STORING DISPLAY ORDER OF THE SEARCH RESULT

| DISPLAY ORDER | TEMPORAL ARTICLE ID |
|---|---|
| 1 | 1 |
| 2 | 2 |
| 3 | 3 |
| 4 | 4 |
| ⋮ | ⋮ |
| N | N |

FIG. 14

34425: AREA FOR STORING TOPIC WORDS

| TEMPORAL TOPIC WORD ID | DISPLAY FLAG | SELECTION FLAG | MARK INTENSITY | TEXT | POSITION | FREQUENCY CLASS |
|---|---|---|---|---|---|---|
| 1 | 1 | 0 | 0 | <topic word-a1> | (100, 30) | 1 |
| 2 | 1 | 0 | 0 | <topic word-a2> | ( 80, 80) | 2 |
| 3 | 1 | 0 | 0 | <topic word-a3> | (150, 100) | 2 |
| 4 | 1 | 0 | 0 | <topic word-a4> | ( 60, 160) | 3 |
| 5 | 1 | 0 | 0 | <topic word-a5> | (140, 170) | 3 |
| 6 | 0 | 0 | 0 | <topic word-a6> | (***, ***) | * |
| ⋮ | ⋮ | ⋮ | ⋮ | ⋮ | ⋮ | ⋮ |
| M | 0 | 0 | 0 | <topic word-aM> | (***, ***) | * |

FIG. 15

34426: AREA FOR STORING LINK INFORMATION BETWEEN TOPIC WORDS

| TEMPORAL TOPIC WORD ID | CANDIDATES OF LINK DESTINATION | LINK DESTINATION | LINK SOURCES |
|---|---|---|---|
| 1 | (empty) | — | 2, 3 |
| 2 | 1 | 1 | 4, 5 |
| 3 | 1, 2, ⋯ | 1 | (empty) |
| 4 | 2, 1, 3, ⋯ | 2 | (empty) |
| 5 | 2, 1, 4, ⋯ | 2 | (empty) |
| ⋮ | ⋮ | | |
| M | *, *, *, ⋯ | — | (empty) |

FIG. 16

34427: AREA FOR STORING CORRESPONDING TABLE BETWEEN TOPIC WORDS AND DOCUMNTS

| TEMPORAL TOPIC WORD ID | LIST OF TEMPORAL ARTICLE ID |
|---|---|
| 1 | 1, 2, 5, · · · |
| 2 | 1, 3, 5, · · · |
| 3 | 2, 4, 6, · · · |
| 4 | 1, 5, 9, · · · |
| 5 | 5, 7, 9, · · · |
| ⋮ | ⋮ |
| M | 2, 6, 9, · · · |

FIG. 17

34428: AREA FOR STORING CORRESPONDING TABLE BETWEEN DOCUMENTS AND TOPIC WORDS

| TEMPORAL DOCUMENT ID | LIST OF TEMPORAL TOPIC WORD ID |
|---|---|
| 1 | 1, 2, 4, · · · |
| 2 | 1, 3, 6, · · · |
| 3 | 2, 7, 10, · · ·, M |
| 4 | 3, 8, 12, · · · |
| 5 | 1, 2, 4, 5 · · · |
| ⋮ | ⋮ |
| N | *, *, *, · · · |

FIG. 18

344211 : PARAMETER FOR DISPLAYING THE SEARCH RESULT

| | |
|---|---|
| LIST PITCH ($\Delta y$) | 30 |
| MARK OFFSET ($x1$) | 20 |
| MARK SHIFT PITCH ($\Delta x1$) | 1 |
| MARK BITMAP IDENTIFIER (Bm) | <BM-1> |
| HORIZONTAL COORDINATE OF SELECTION WINDOW ($x2$) | 40 |
| SIZE OF SELECTION WINDOW (h, v) | (10, 10) |
| COLOR OF SELECTION WINDOW WHICH IS NOT SELECTED (CS0) | TRANSPARENT |
| COLOR OF SELECTION WINDOW WHICH IS SELECTED (CS1) | RED |
| HORIZONTAL COORDINATE OF DISPLAYING SCORES ($x3$) | 70 |
| HORIZONTAL COORDINATE OF DISPLAYING TITLES ($x4$) | 80 |
| BACKGROUND COLOR OF THE AREA OF DISPLAY (CD) | LIGHT BLUE |
| FONT FOR DISPLAYING TITLES (F) | <FT-1> |

FIG. 20

344212 : PARAMETER FOR DISPLAYING A GRAPH OF TOPIC WORDS

| | |
|---|---|
| BACKGROUND COLOR OF TEXT AREA FOR TOPIC WORDS WHICH IS NOT SELECTED (CBS0) | GREEN |
| BACKGROUND COLOR OF TEXT AREA FOR TOPIC WORDS WHICH IS SELECTED (CBS1) | ORANGE |
| FONT OF TEXT FOR TOPIC WORDS WHICH IS NOT SELECTED (FTS0) | <FT-2>(NORMAL) |
| FONT OF TEXT FOR TOPIC WORDS WHICH IS SELECTED (FTS1) | <FT-3>(EMPHASIZED) |
| FRAME COLOR OF TOPIC TEXT AREA FOR TOPIC WORDS WHICH IS NOT MARKED (CFM0) | TRANSPARENT |
| FRAME COLOR OF TOPIC TEXT AREA FOR TOPIC WORDS WHICH IS MARKED (CFM1) | RED |

3444: ROUTINE FOR GENERATING DISPLAY DATA OF TOPIC WORDS GRAPH

34446: ROUTINE FOR GENERATING DRAWING DATA FOR LINKS BETWEEN TOPIC WORDS

FIG. 23C (MM: MODE VARIABLE OF RETRIEVAL ASSISTING ROUTINE 3441)     3441MP-P2-1

3441MP-P2

3441MP-P2-1: POINTED TOPIC WORD IS ONLY TOGGLED THE STATUS OF SELECTED/NOSELECTED. STATUS OF OTHER TOPIC WORDS ARE NOT CHANGED.

+SHIFT — YES → (3441MP-P2-1)
+SHIFT — NO ↓

SELECTION 1 FLAG OF PUSHED TOPIC WORD PRIOR TO PUSHING — 1 → 3441MP-P2-2: PUTTING ONLY PUSHED TOPIC WORD AT SELECTION STATE, WHILE PUTTING OTHER TOPIC WORDS AT NON SELECTION STATE

SELECTION 1 FLAG OF PUSHED TOPIC WORD PRIOR TO PUSHING — 0 ↓

KIND OF PRESSED MOUSE BUTTON — LEFT ↑
KIND OF PRESSED MOUSE BUTTON — RIGHT →

PUSHED TOPIC WORD AT SELECTION STATE AFTER PUSHING — YES → 3441MP-P2-3: MM=21 (MODE OF MOVING SELECTED TOPIC WORDS)
PUSHED TOPIC WORD AT SELECTION STATE AFTER PUSHING — NO ↓

POSITION PUSHED ON ANY OF TOPIC WORDS WITH MOUSE — YES ↑
POSITION PUSHED ON ANY OF TOPIC WORDS WITH MOUSE — NO →

3441MP-P2-4: MM=22 (MODE OF DETERMINING TOPIC WORD SELECTION AREA)

3441MP-P2-5: Fc (UPDATE FLAG OF TOPIC WORDS IMAGING)=1 (ON)

P1: AREA FOR DISPLAYING THE SEARCH RESULT

P1: AREA FOR DISPLAYING THE SEARCH RESULT

P2: AREA FOR DISPLAYING TOPIC WORDS

P2: AREA FOR DISPLAYING TOPIC WORDS

P2: AREA FOR DISPLAYING TOPIC WORDS

P2: AREA FOR DISPLAYING TOPIC WORDS

P2: AREA FOR DISPLAYING TOPIC WORDS

E1: INPUT WINDOW FOR QUERY

E1: INPUT WINDOW FOR QUERY

P2: AREA FOR DISPLAYING TOPIC WORDS

P2: AREA FOR DISPLAYING TOPIC WORDS

P2: AREA FOR DISPLAYING TOPIC WORDS

P2: AREA FOR DISPLAYING TOPIC WORDS

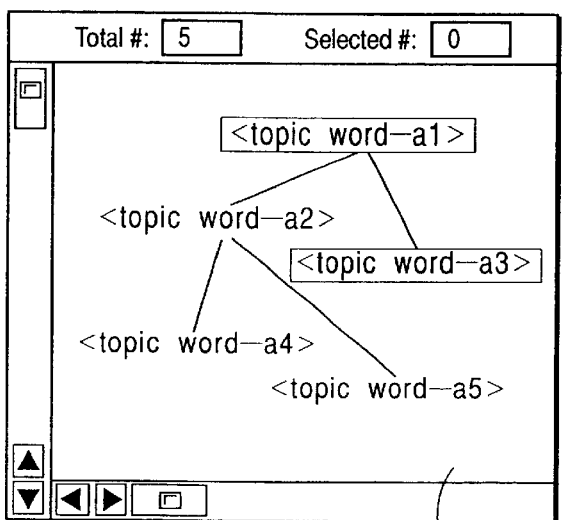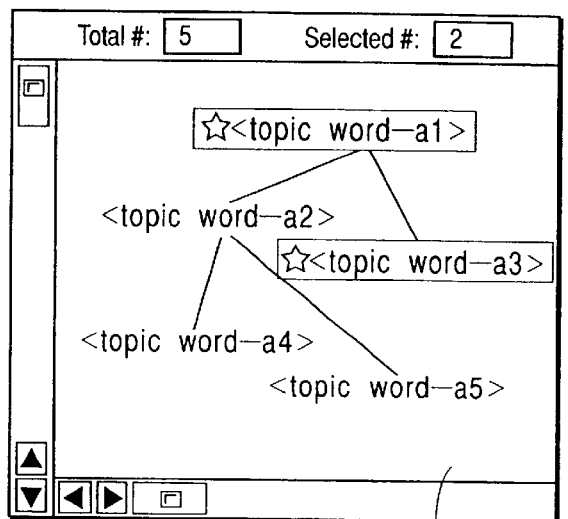

«COMPUTER PROGRAM EMBODIED ON A COMPUTER-READABLE MEDIUM FOR A DOCUMENT RETRIEVAL SERVICE THAT RETRIEVES DOCUMENTS WITH A RETRIEVAL SERVICE AGENT COMPUTER»

CROSS-REFERENCE TO RELEVANT APPLICATION

This is a continuation application of U.S. Ser. No. 09/515,323, filed Feb. 29, 2000 now U.S. Pat. No. 6,446,065, which is a continuation of U.S. Ser. No. 09/145,155, filed Sep. 1, 1998, which is a continuation-in-part of Ser. No. 08/888,017 filed Jul. 3, 1997 U.S. Pat. No. 5,987,460, on Nov. 16, 1999, which is now pending to U.S. PTO and the disclosure of which is incorporated herein by reference.

BACKGROUND OF THE INVENTION

The present invention relates to a document retrieval assisting method having a user interface with an interactive guidance function realized therein and a document retrieval service or document retrieval assisting service utilizing the same.

For document retrieval systems, a variety of assisting functions have been designed and developed so that users might readily reach a desired document assembly as soon as possible. Feedback and guidance are primary ones among them. Feedback is such a mechanism that, when a user draws his determination of YES/NO concerning several items from search results, search results reflecting the determination can then be gained, as is described for example in G. Salton, J. M. McGill (1983), Introduction to Modern Information Retrieval, McGraw-Hill, Chapter 6. Further, guidance is a function to provide information relevant to a retrieval operation at the individual processes of the retrieval operation, namely information believed to possibly work as reference when a user intends to modify or improve search queries.

As to the guidance function, conventionally, a method has generally been executed, comprising proposing information relevant to input search queries. For example, a method is illustrated, comprising storing a database representing relations between words, such as thesaurus, and retrieving from the data base, a set of words relevant to the input keywords. Thesaurus is a tree-structure database primarily showing the "is-a" relations between words, and furthermore, a method is also suggested, comprising automatically generating a data of relevant words using co-occurrence statistics (see for example Japanese Patent Laid-open No. Hei 8-161343 entitled "Related Word Dictionary Preparing Device"; or see B. R. Schatz et al. (1966), Interactive term suggestion for users of digital libraries: Using subject thesauri and co-occurrence lists for information retrieval, Proc. ACM DL'96, pp. 126–133). R. H. Fowler and D. W. Dearholt also propose, in "Information Retrieval Using Pathfinder Networks", in R. W. Schvaneveldt ed., Pathfinder Associative Networks, Ablex, Chapter 12 (1990), a method comprising displaying a search word and words relevant to the word in a network structure, on the basis of the co-occurrence statistic data between words.

However, the method providing information relevant to a query is disadvantageous in that the method is hardly applicable to a case with a plurality of search words or a case with negation used; and the method is also problematic in that the method is hardly applicable to document retrieval with no use of any key word (associative search). So as to overcome these problems, a method is proposed, comprising automatically extracting relevant information from search results and providing the information to a user. For example, Scatter/Gather method [D. Cutting, et al. (1992), Scatter/Gather: A Cluster-based Approach to Browsing Large Document Collections. Proc. ACM SIGIR'92, p. 318–329] comprises automatically classifying a retrieved document group (clustering) and displaying the topic words per each class. U.S. Pat. No. 5,987,460 submitted by the present inventors proposes a method for preparing and displaying a topic word graph, comprising extracting topic words from search results and extracting the co-occurrence relation between the topic words.

However, these conventional methods are disadvantageous in that the interaction between the display area of title list as primary information of search results and guidance information is so insufficient that users cannot sufficiently utilize the guidance information.

From the standpoint of search style, complementary two search types, namely key word search and associative search, are required, but disadvantageously, no user interface exists, which is capable of selecting and using one of them, depending on the search queries, to execute guidance within the same frame.

SUMMARY OF THE INVENTION

So as to overcome the aforementioned problems of the prior art, it is an object of the present invention to attain that users can catch both individual information such as title list as search results and the over view of the search results such as a topic-word graph and try to improve the search queries while analyzing the relation between the individual information and the overview or to carry out retrieval from another standpoint; and it is the other object of the present invention to attain that a user can readily retrieve a set of documents highly related to same an interesting documents for the user or to some documents owned by the user or to some interesting documents or a part thereof the user has encountered during the course of retrieval operation.

So that users might make attempts for improving search queries while catching the whole set of search results or for performing retrieval from another standpoint, the overview information in the form of a topic-word graph along with the list of titles as primary information of search results, is mapped at readily comparable positions on the same image, thereby enabling the utilization of the displayed topic words as search words through click operation with mouse, or selecting some of the displayed topic words through simple mouse operation to make an emphasized display of titles including them or concentrating the emphasized titles toward the top of the lists, which promotes ready identification of the relation between the topic words and documents including them, or alternatively selecting some of the titles to make an emphasized display of topic words contained in these documents, so that a retrieval assisting interface for propagating more deepened search can be achieved.

BRIEF DESCRIPTION OF THE DRAWINGS

FIG. 1 is a block diagram depicting one example of the system composition of the present document retrieval assisting service;

FIG. 2 is a block diagram representing the detail of one example of the user side retrieval assisting program loaded on the work area of a user side computer;

FIG. 4 is a block diagram representing one example of the detail of the data storage area for imaging the retrieval interface on the display means;

FIG. 7 is a view representing a data composition example for imaging the search results display area;

FIG. 8 is a view representing a data composition example for imaging topic word display area;

FIG. 9 is a view representing a composition example of query to be received by the information provider side retrieval assisting program;

FIG. 10 is a view representing a composition example of the information provider side retrieval assisting program;

FIG. 11 is a view representing a composition example of text data base as a search subject;

FIGS. 13A and 13B are views representing examples of search result relevant data sent to a user side;

FIG. 14 is a view representing an example of topic word relevant data;

FIG. 15 is a view representing an example of the data relevant to links between topic words for imaging a topic word graph;

FIG. 16 is a view representing an example of topic word/document corresponding table data;

FIG. 17 is a view representing an example of document/topic word corresponding table data;

FIG. 18 is a view representing an example as to how to set parameters for preparing a data for imaging search results;

FIG. 20 is a view representing an example as to how to set parameters for preparing a data for mapping a topic word graph;

FIG. 23C is a PAD view representing the remaining part of the process of the user side retrieval assisting routine when mouse is pushed;

FIGS. 33A through 33C are views representing examples as to how the interface image changes when topic words are marked through selection among retrieved documents;

DESCRIPTION OF THE PREFERRED EMBODIMENT

Figure 3:
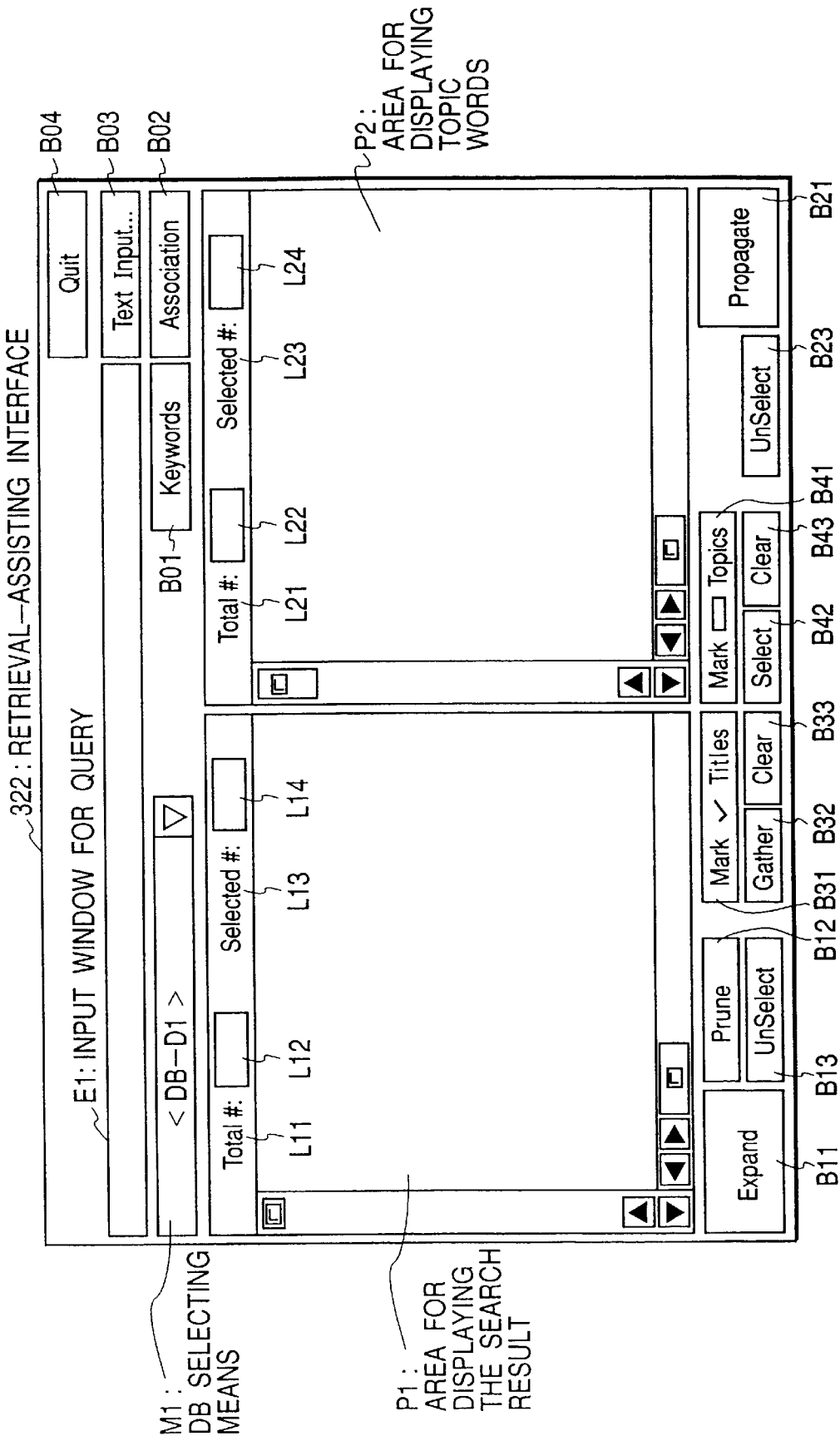
FIG. 3 is a block diagram representing a composition example of the retrieval assisting interface displayed on the display area.

Modes for carrying out the document retrieval assisting method and document retrieval assisting service by utilizing the method, in accordance with the present invention, will now be described below.

FIG. 1 is one example of the system composition of the document retrieval assisting service. The document retrieval assisting service is composed of information holding/processing means 1 (general purpose computer, work station, personal computer, etc.) for information provider, communication network 2 (Internet, Intranet, or a combination thereof) and information holding/processing means 3 (work station, terminals, computers such as personal computer) for users. Plural users and information providers may be satisfactory, but for simple description, the diagrams herein are expressed by assuming a single user and a single information provider.

The information holding/processing means 1 for information provider (referred to as "computer" hereinafter for simple description) comprises input means 11, display means 12, CPU 13, work area 14, information storage means 15 and the like, and in response to a query from a user, the means 1 primarily functions for carrying out the retrieval of the corresponding documents in a text data base as a supply subject, to transmit the results to the user, and the means also functions for generating and processing useful information with relevance to the query and the search results, if necessary, to send the information to the user. The work area 14 comprises memory media such as semiconductor memory capable of read and write at a high speed, wherein retrieval assisting program 143 for the execution of document retrieval assisting service functions, together with operating system 141 and communication process 142. The information storage means 15 comprises a combination of memory media capable of storing an enormous volume of information and suitable for high-speed read, such as magnetic disk, optical disk, and CD ROM, and the means stores user side retrieval assisting driving program 15X1 operable as a retrieval assisting means on a user side computer, user side hypertext 15F1 for retrieval assisting start, which works for delivering the program and carrying out the program, and retrieval data 15D such as search subjects. The retrieval data 15D comprises dictionaries 15D0 and data 15D1, 15D2, - - - , relevant to the individual text data base.

The user side information holding/processing means (referred to as "computer" or "terminal" hereinbelow for simple description) is composed of input means 31, display means 32, CPU 33, work area 34, information storage means 35 and printing means 36, and primarily functions for transmitting the query from a user to an information provider side and for proposing, in a user friendly manner, the search results and attached information, sent back from an information provider side. The input means 31 comprises keyboard 31, mouse 32, and pen input means 33, wherein the work area 34 is composed of memory media capable of high-speed read and write, such as semiconductor memory, while the information storage means 35 comprises memory media, such as magnetic disk, optical disk and CD ROM.

The mode for carrying out the retrieval assisting service is variable, and a method by utilizing hypertext browsing interfaces such as WWW browse is described below. In the user side computer 3 of FIG. 1, hypertext browsing process 343 already loaded in the work area 34 is in operation, and on the display means 32, hypertext browsing interface 321 is at a state on display.

When an address designated by the retrieval assisting service (namely, the address of the network of the information provider computer 1 and the file name where the user side hypertext 15F1 for initiating retrieval assisting if present, and the like) is directly designated at the address input area 3211 of the hypertext browsing interface 321 or when an address designated by the retrieval assisting service is preliminarily embedded as an anchor in a hypertext displayed on the text display area 3212 of the hypertext browsing interface 321 and the address embedded part is clicked with mouse, the hypertext browsing process 343 receives the user side hypertext 15F1 for starting retrieval assisting through the user side communication program 342 and the information provider side communication program 142. Simultaneously, then, the user side retrieval assisting driving program 15X1 is sent in a dependent manner and is initiated in the work area 34 of the user side computer, which functions as the retrieval assisting program 344, and the retrieval assisting program 344 displays the retrieval assisting interface 322 on the display means 32. Additionally, the retrieval assisting interface 322 may be displayed in the hypertext display area 3212 or may be displayed in another window. FIG. 1 depicts an example of the display in another window.

Alternatively, the user side retrieval assisting driving program 15X1 may satisfactorily be received through a communication program by direct command input and the like, with no use of the hypertext browsing program 343, and the program may then operate satisfactorily on the work area for receiving retrieval assisting service. Still additionally, a service mode is also possible, comprising preliminarily delivering the user side retrieval driving program 15X1 to users with such desire, who may start the program if necessary.

FIG. 2 is a block diagram representing the detail of the user side retrieval assisting program 344 loaded on the work area 34 of the user side computer 3. The user side retrieval assisting program 344 comprises main retrieval assisting routine 3441, data area 3442, and routine for generating display data of the search result 3443, routine for generating display data of topic word graph 3444, and routine for generating display data of topic word list 3445.

The data area 3442 comprises area 34421 for storing various parameters, area 34422 for storing data relevant to interface imaging, query storage area 34423, search results storage area 34424a, search results display order storage area 34424b, topic word storage area 34425, between-topic word linking information storage area 34426, topic word/document corresponding table storage area 34427, and document/topic word corresponding table storage area 34428. The parameter storage area 34421 includes parameter 344211 for preparing search results imaging data, as well as parameter 344212 for preparing topic word graph mapping data.

On the basis of the data 34422 relevant to interface imaging, the user side retrieval assisting routine 3441 displays the retrieval assisting interface 322 on the display means 32. Additionally, the user side retrieval assisting routine 3441 carries out various operations, depending on the type of a button on the interface, if pushed with mouse.

FIG. 3 depicts a composition example of retrieval assisting interface 322 displayed on display area 32. The retrieval assisting interface 322 comprises query input window E1 for a user to input queries such as key words, button B01 for carrying out key word search, associative search button B02 for carrying out search (associative search) on the basis of the similarity to the designated document, text input button B03 for inputting sentences and a set of words for carrying out associative search, a set of parts relevant to search, such as DB selection means M1 for selecting a text data base as search subjects, a set of objects relevant to the displaying of results, such as search results display area P1 for displaying search results and topic word display area P2 for displaying information characterizing the search results, and a set of objects to carry out various operations on the basis of the search results and the topic word display. The set of objects for carrying out various operations on the basis of the search results and the topic word display, includes expand button B11 for retrieving a document similar to the selected document or set of documents, prune button B12 for discarding documents except the selected document or set of documents, unselect button B12 for releasing all the selection states attached to the document(s), mark title button B31 for attaching emphasis, such as check mark, to the titles of selected documents containing a single or a plurality of topic words, sort button B32 for rearranging the titles in the decreasing order of mark intensity, clear button B33 for deleting the marks, mark topic word button B41 for emphasizing topic words contained in selected documents, the topic words corresponding to a single or a plurality of titles, selection button B42 for selecting marked topic words, clear button B43 for releasing the marks, unselect button B23 for releasing all the selected state of topic words, and topic word selection propagate button B21 for putting topic word with strong relation with a single or a plurality of topic words selected, at selection state.

The characteristic point of such arrangement is that search results display area P1 for directly displaying search results such as title list and topic word display area P2 for displaying the overview of a set of retrieved documents and are arranged adjacently for ready comparison. Advantageously, users can thereby catch instantly specific information (title list) of the search results and the whole abstract information, to readily construct the interaction between the two, as shown in the latter part of the present example.

FIG. 4 depicts the detail of data storage area 34422 for imaging retrieval interface. The area 34422 is composed of imaging data of all objects composing the retrieval interface. For example, the data 34422E1 for imaging query input window E1 comprises arrangement position, window size, display contents (search queries), origin position (number of words hidden on the left of the window or the length corresponding to the number), cursor position, mark position, background color, type of character font, and type of frame line.

Figure 5:
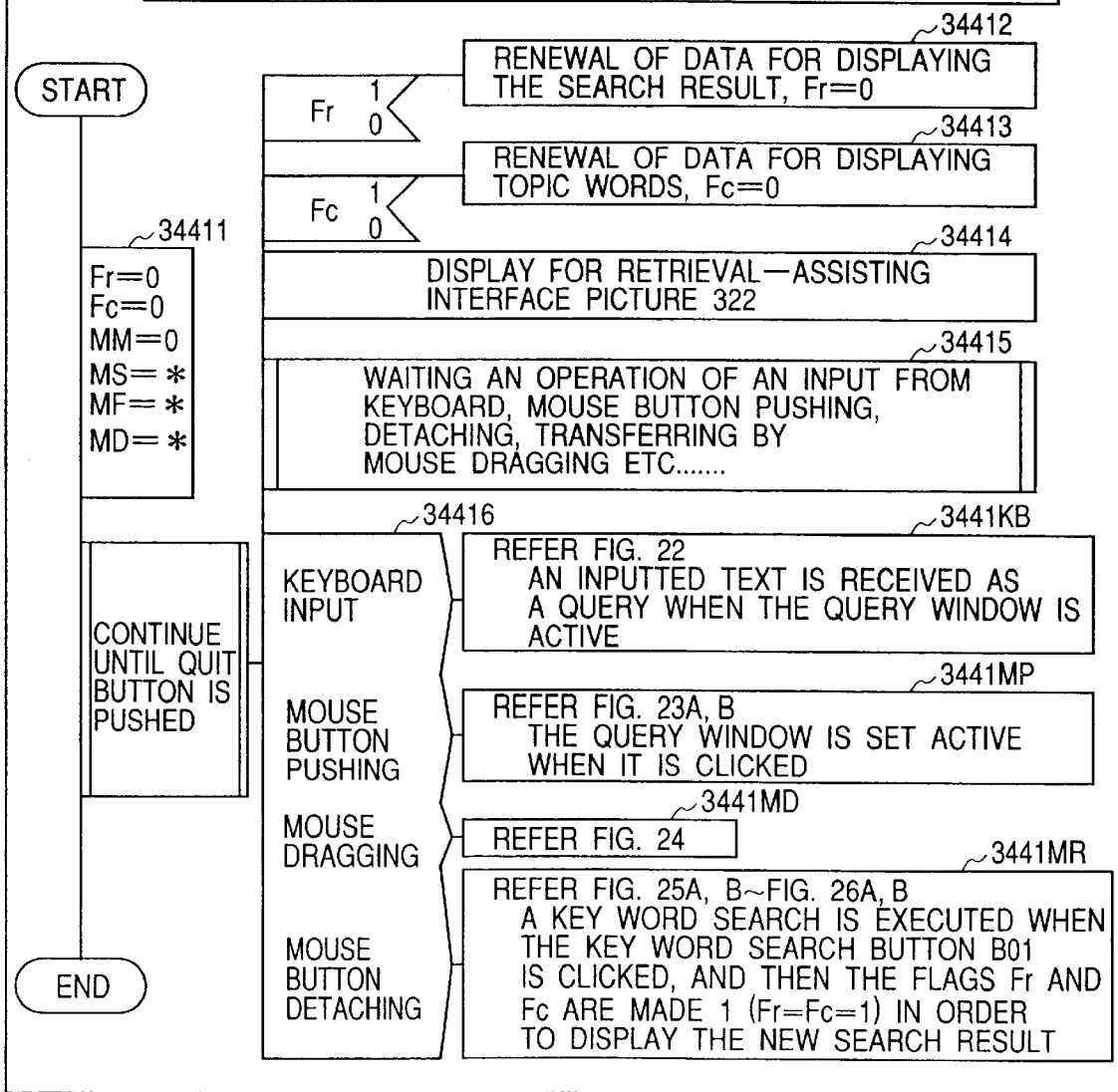
FIG. 5 is a PAD view representing the process flow of the user side retrieval assisting routine.

FIG. 5 is a PAD view representing the process flow of the user side retrieval assisting routine 3441. The retrieval assisting routine 3441 primarily manages the retrieval assisting interface, and display search results or relevant information, in response to the operation of a user.

Firstly, the parameters (for example, flag) used in the retrieval assisting routine 3441 will be described. Update flag of search results imaging (name of parameter is "Fr") indicates whether the imaging data to be displayed on the search results display area P1 (FIG. 3) should be updated. Update flag of topic word imaging (name of parameter is "Fc") indicates whether the imaging data to be displayed on the topic word display area P2 should be updated. According to the present retrieval method, the search results display area P1 and topic word display area P2 are required to be updated since the commitment of retrieval, but such updating is not necessarily required for other operations. Neither one is required to be updated, for example, when query is inputted. Therefore, these flags should be used so that these operations might be done only when these operations are necessary. Additionally, drag mode (name of parameter is MM) indicates the type of operation when drag operation with mouse is continued, including document selection (MM=11), display document designation (MM=12), topic word move (MM=21), and topic word selection region (MM=22). Furthermore, parameter MS records the temporary identification number of the document or of the topic word at a position where mouse is pushed just immediately beforehand; parameter MF records the selection state of the same document or topic word before the mouse is pushed; and parameter MD records the (global) identification number of a document currently displayed for browsing. At initial process 34411, these parameters are set at start as follows; Fr=Fc=0; MM=0; MS, MF, and MD, no value set.

The processes after 34412 are continuously repeated until quit button is pushed. At first, update operation 34412 of search results display area imaging data 34422P1 should be effected by using routine for generating display data of the search result 3443 when the update flag of search results imaging (Fr) is on. When the update flag of topic word imaging (Fc) is on, alternatively, update operation 34413 of the topic word display area imaging data 34422P2 should be done by using the routine for generating display data of topic word graph 3444. Because both the flags are off at start, these operations are skipped.

At the following process 34414, on the basis of the retrieval interface imaging data 34422 (FIG. 4), the retrieval interface 322 is imaged on the display means 32. When these processes are completed, input stand-by state 34415 is set. The display image of FIG. 3 depicts the display state of the retrieval interface 322, at a stage when the retrieval assisting program is initiated to lead to the input stand-by state. On an input from keyboard and mouse, the stage progresses to branch 34416, where process 3441KB is executed in case of keyboard input (including cut & paste); process 3441MP is executed in case of mouse push; process 3441MD is executed in case of mouse moving under pushing (or dragging); and process 3441MR is executed in case of mouse release. The details of these individual processes will be described later. Through the retrieval assisting interface, users can input query and carry out various operations. Various methods may be used at the starting point of the retrieval operation, including for example key word search by key word input, designation of a highly interesting document, to retrieve documents with similarity to the document or just some sentences or phrases as parts of the document, not as the whole document. Firstly, a case starting from key word search will be described.

Queries are inputted into the query input window E1 (FIG. 3) from keyboard, but the query input window E1 may sometimes not be at an input stand-by state at start, so in that case, the query input window E1 should be clicked with mouse prior to the initiation of input. Thereby, the process 3441MP for mouse pushing puts the query input window E1 at an input stand-by state. And every character input from the keyboard is stored on display contents area 34422 E13 of the query input imaging data, by the process 3441KB, then displayed on the query input window by the imaging process 34414. In other words, the input characters from keyboard are consistently and sequentially written on the query input window E1.

After the termination of the input of the queries, retrieval is committed on mouse clicking of the keyboard search button B01 (FIG. 3). More specifically, the process 3441MR is selected on the branch 34416 when the mouse is released, where branching occurs, depending on the type of a button clicked. In a case of the search button B01, key word search query is transmitted to the retrieval assisting program 143 of the information provider side computer 1, so that search results and topic word information and the like are sent back. Because both the update flag of the search results imaging and the update flag of the topic word imaging are set at on, the search results imaging data update process 34412 and the topic word imaging data update process 34413 prepare individual imaging data on the basis of the newly received data, so that the data of the search results display area imaging data 34422P1 and the data of the topic word display area imaging data 34422P2 are updated.

Figure 6:
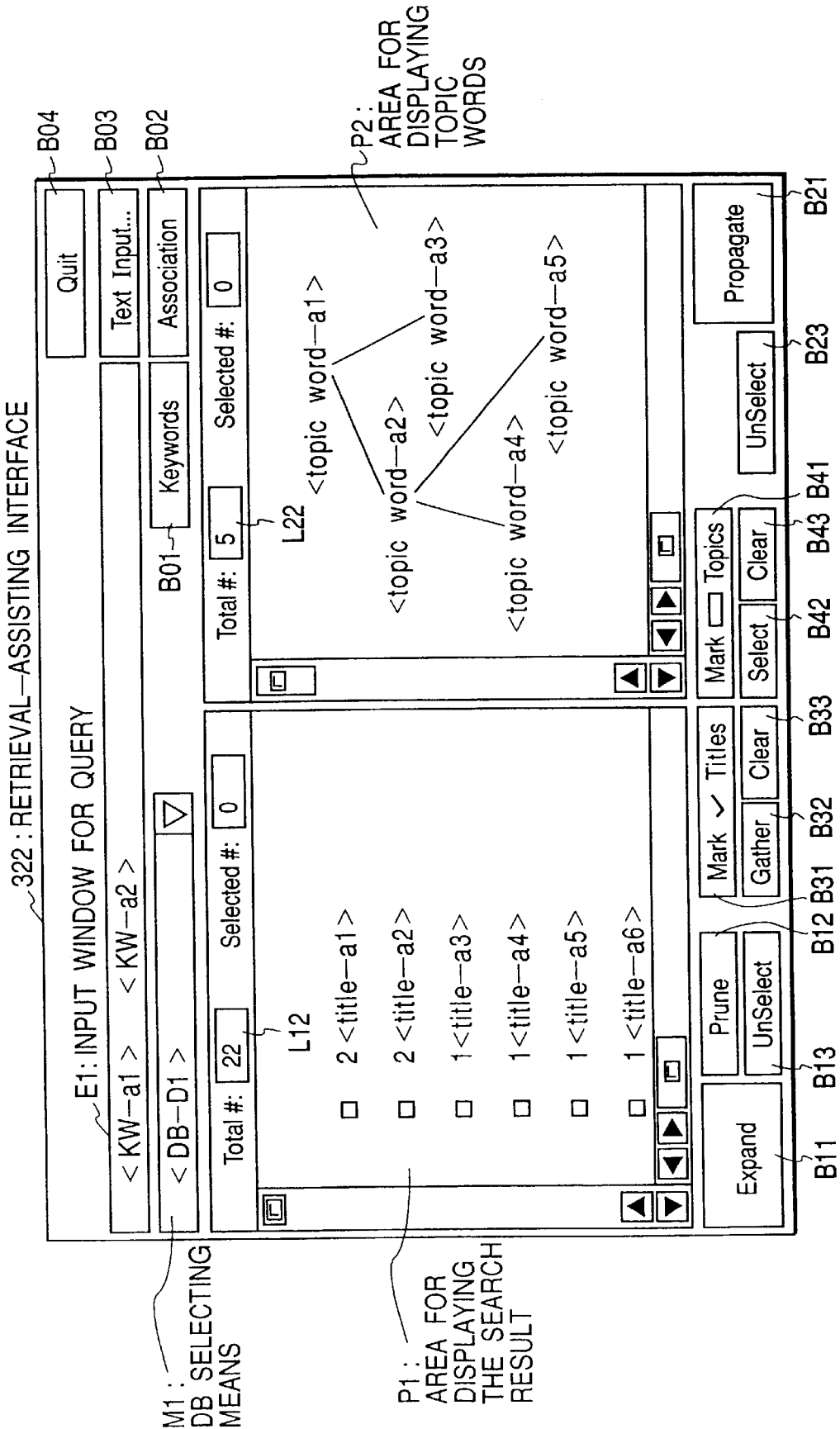
FIG. 6 is a view representing a display example of search results and topic words on the retrieval assisting interface.

FIG. 6 is a view representing a display example of search results and topic words on retrieval assisting interface. It is an example of retrieval interface image after "key word a1, key word a2" input as queries for key word search. On the search results display area P1, the list of retrieved documents is output, together with relevance scores. One line corresponds to the information about one document, and each line is composed of a small window for users to select the corresponding document, a numerical figure showing the suitability with the query for the document, information for a person to identify the document (information about document title, issue date, etc.). Furthermore, the total number of retrieved documents is shown on the area L12 thereon. As the numerical figure, the retrieved document number "22" is stored as character row information in the "total number (left)" imaging data 34422L11 as one of the character row imaging data 34422L in the interface imaging data 34422, and the number is displayed on the display area L12. On the topic word display area P2, furthermore, words characteristically appearing in a set of the retrieved documents are graphically displayed so that their interactive relation might be identified. As the method for generating such topic word graphs from the set of the retrieved documents, the method described in U.S. patent application Ser. No. 08/888,017 entitled "Document retrieval assisting method and system therefor and document retrieval service using the same" may be used.

FIG. 7 depicts the detail of the search results display area imaging data 34422P1 (FIG. 4) then. The data is composed of display position, area size, origin position and display contents. The display position shows at which position in the overall interface frame the area is attached; the origin position shows the coordinate of the imaging area lying at the upper left corner of the display area. By scrolling, the value can be modified.

The imaging contents 34422P14 is composed of imaging position, figure type, and attached information. The first line thereof means that a transparent rectangle should be imaged at position (40, 30) and size (5, 5). The second line means that a character row "2" should be imaged at position (60, 30). Additionally, the third line means that the title name of the corresponding document, "title-a1" should be imaged at position (80, 30). By imaging following these lines, then, the first line of the search results display area P1 of FIG. 6 is to be imaged. The same is true with the second line and thereafter.

Similarly, FIG. 8 depicts the detail of the topic word display area imaging data 34422P2 (FIG. 4) then. The imaging contents thereof are composed of a line imaging data set representing links of graphs and a character row imaging data set representing the character row of a node. The line is designated with the start point and end point. For example, the first line means that a line should be imaged from coordinate (80, 80) to coordinate (100, 30); and the fifth line means that a character row "topic word-a1" is imaged on a background color =green at coordinate (100, 30). The graph on the topic word display area P2 of FIG. 6 is imaged, on the basis of the imaging contents.

It has been described insofar that when key word search button B01 is pushed at a state where query "key word a1, key word a2" is inputted from the query input window E1 of the retrieval assisting interface image, various processes are intermediately executed, to generate such an interface image as shown in FIG. 6, which displays the title list of search results and the information about topic words. It will be described hereinafter the processing course until search results display area imaging data 34422P1 and topic word display area imaging data 34422P2, shown in FIGS. 7 and 8, are prepared after pushing a search button, that is, to transmit the query to the retrieval assisting program 143 of information provider side, to prepare necessary information such as search results and topic words, which is sent back to the user side retrieval assisting program 344 to prepare the imaging data, based on the information.

When the key word search button B01 is clicked, the demand of key word search is sent to the information provider to receive necessary information at one branch of the process 3441MR which acts when a mouse button is released.

FIG. 9 is a view representing an example of the contents of the user side query storage area when the key word search button B01 is clicked at the state of FIG. 3 after inputting keywords. As the retrieval method, "key word search" is stored; as the retrieval contents (search queries), "key word-a1" or "key word-a2" is stored; as the search subject data base, furthermore, the currently selected "document DB-D1" is stored. The retrieval contents are prepared from character rows (in this case, "key word a1", "key word a2") stored in the display contents column of the query input area imaging data 34422E1 (FIG. 4). Additionally, the search subject data base is the data base shown in the column of DB selection means Ml in FIG. 3. In practice, the information is written in the search subject selection area imaging data 34422M1 (FIG. 4).

The information provider side retrieval assisting program 143 and data sets used therein are described below in FIGS. 10 through 12.

FIG. 10 is a view representing a composition example of the information provider side retrieval assisting program 143 operating in the work area 14 of the information provider side computer 1. The retrieval assisting program 143 comprises main routine 1431, data area 1432 and sub routines 1433 to 1439 and the like. The data area 1432 is composed of area 14321 for storing various parameters used in the main routine and sub routine, query storage area 14322, search results storage area 14323, topic word storage area 14324, between-topic word linking information storage area 14325, topic word/document corresponding table storage area 14326, document/topic word corresponding table storage area 14327, between-topic word co-occurrence table storage area 14328 and the like; and the sub routine is composed of word spelling normalization routine 1433, word spelling/word number lookup routine 1434*a*, word number/word spelling lookup routine 1434*b*, key word search routine 1435, associative search routine 1436, topic word extraction routine 1437, between-topic word co-occurrence table preparation routine 1438, between-topic word linking information preparation routine 1439 and the like.

FIG. 11 is a view representing the detail of the data 15D1 relevant to a text data base with an identification name "document DB-D1" as one of search subject data base stored in the information storage means 15 of the information provider side computer 1. The data 15D1 is composed of text data base 15D11, document/word corresponding data 15D12, word/document corresponding data 15D13, word frequency data 15D14, cluster tree 15D15 and the like. The detail of the individual data is now described below.

The text data base 15D11 is a data base about the text and bibliographical information about a document as a search subject, and on receipt of the browsing query with designated document identifiers from a user, the information provider side retrieval assisting routine 1431 draws out the corresponding document data from the data base to send back the data to the user.

The document/word corresponding data 15D12 is a list of a set of the number of each word contained in the document and the frequency of the word, vs. document number. When the size of a subject document is large, furthermore, not the whole document is defined as a subject of word counting, but a part thereof, well reflecting the contents described in the whole document, such as summary, may be used as a subject. Additionally, only a word list may be used for comparison, with no frequency data, because of omission.

The document number means an identification number unique to each document contained in the data base, and the word id is an identification number unique to each of all the words treated as key words on the present retrieval assisting system. So as to get the identification number (id) of a word, the word spelling/word id lookup routine 1434*a* (FIG. 10) should be used. So as to get the word spelling of a word, word id/word spelling lookup routine 1434*b* (FIG. 10) is used. For these lookup routines, the word id/word spelling lookup table in the dictionary 15D0 (FIG. 1) is to be referenced.

The word/document corresponding data 15D13 is a data with an inverse relation with the document/word corresponding data 15D12. More specifically, each word id corresponds to the list of a set of the number of documents containing the word and the frequency of the word. Herein, the frequency data may be omitted, and a list of words (documents) alone may be corresponded.

The word frequency data 15D14 is a data set, vs. each word number d, of the frequency F (d) of word d , which means how many times the word appears in the overall document DB, and the document frequency DF (d) of word d, which means how many documents contain the word.

The cluster tree 15D15 is in a stratified form prepared by repeating clustering of similar documents in the document DB (repeating clustering of similar document clusters into more larger clusters). By using for example "Document classifying method according to probability model" of Japanese Patent Laid-open No. Hei 9-62693, a document cluster tree of a high precision can be prepared. (Word distribution status in a document may be gained from the document/word corresponding data 15D12 and because the word distribution status can be defined as one vector with a base of the entire words, a method comprising measuring the similarity from that angle between word distribution vectors is also present). The cluster tree is utilized by carrying out associative search (retrieval based on between—documents similarity) by a top-down binary search decomposition method at a high speed. The search is done, through a process comprising selecting a cluster where a key document is at a higher probability, among candidate document clusters, at each branch point. The probability of a document belonging to a document cluster is calculated by using a calculation method according to the Japanese Patent Laid-open No. Hei 9-62693.

Figure 12:
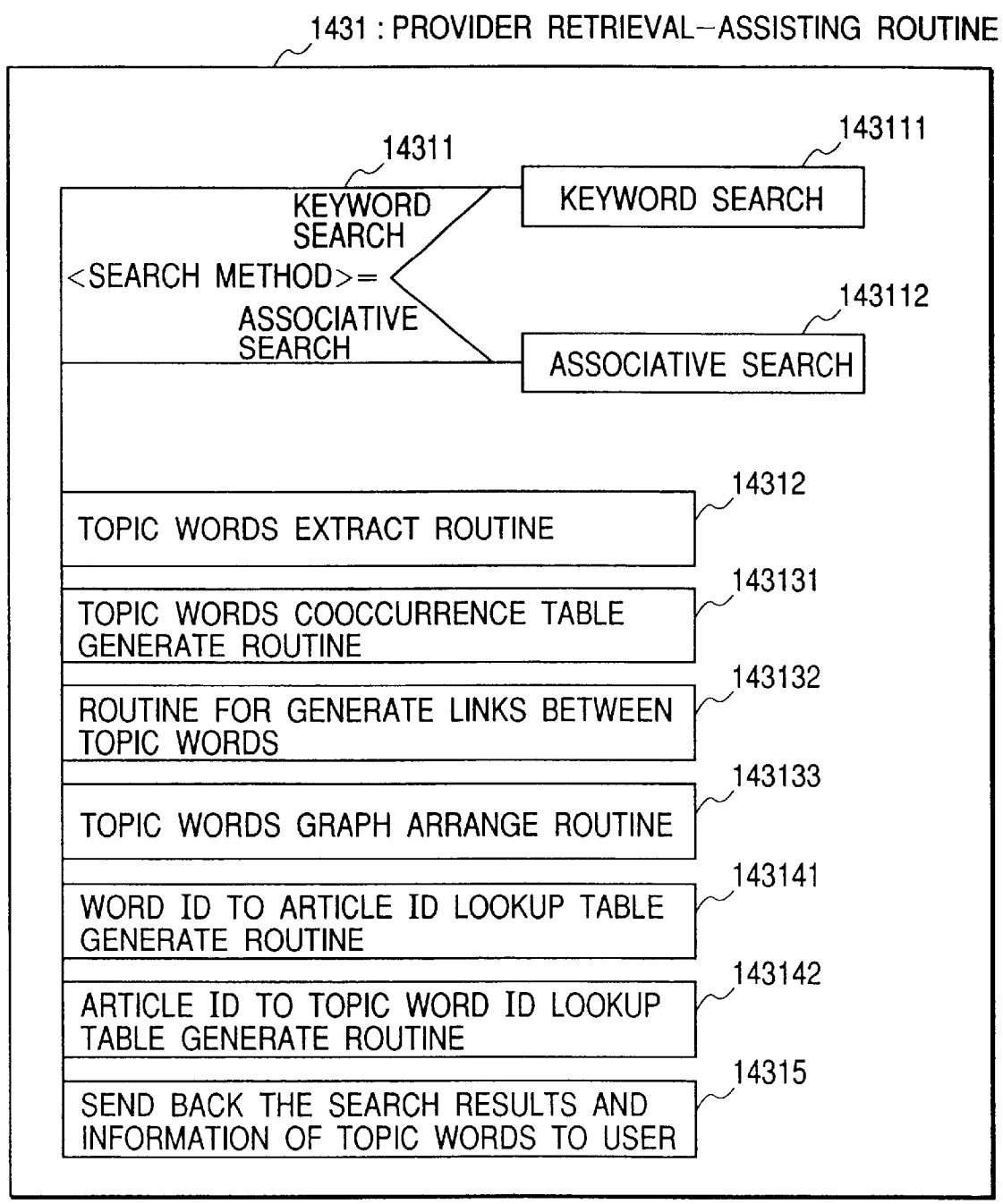
FIG. 12 is a PAD view representing the process flow of the information provider side retrieval assisting routine.

FIG. 12 is the detail of the information provider side retrieval assisting routine 1431 (FIG. 10). The routine 1431 starts on receipt of the query from a user side. Firstly at branch 14311, keyword search 143111 or associative search 143112 is carried out according to the designation of a retrieval method on the query. If the query in the example of FIG. 9 is received, the retrieval method is designated as "key word search" and therefore, key word search should be selected. For key word search, retrieval contents storage area 344232 functions as a logical binding of key words, and therefore, an assembly of document numbers containing each key word is obtained with reference to the word/document corresponding data 15D13, to calculate an assembly as the logical binding of them. For associative search, furthermore, a document similar to the document as a key according to the method described in the description of the cluster tree 15D15, should be retrieved. In any case, the search results are expressed as assemblies of sets of document identification numbers and suitability scores for search queries, and they are stored in the decreasing order of suitability score in the search results storage area 1423. The suitability score for key word search can be gained for example from the number of key words contained therein, and for associative search, similarity can be used as the score.

Subsequently, operations including topic word extraction 14312, between-topic word co-occurrence table preparation 143131, between-topic word linking information preparation 143132, topic word graph mapping coordinate calculation routine 143133, topic word/document corresponding table preparation 143141, and document/topic word corresponding table preparation 143142 are carried out, to send back necessary information for representing search results and topic words to users.

The present retrieval assisting method is characterized by the proposition of search results along with the characteristic information. Herein, drawings and descriptions are skipped, but users can select whether or not they want them. If a user selects an option of no need thereof, only search results may simply be sent back to the user, so the processes after the topic word extraction 14312 can be skipped.

Because the method described in "Document retrieval-assisting method and system therefor and document retrieval service by using the same" is used for the topic word extraction 14312 and between-topic word co-occurrence table preparation 143131 from search results, between-topic word linking information preparation 143132, and topic word graph mapping coordinate calculation routine 143133, brief description thereof is simply illustrated herein. By the topic word extraction 14312 routine, the number df(X) of documents in a search results containing each (X) of all the words appearing at least one in the search results is counted. With reference to the document/word corresponding table 15D12, this calculation can be performed in a simple manner. With reference to the word frequency data 15D14 (FIG. 11), additionally, document frequency DF(X) indicating in how many documents these words appear in the entire data base, can be recovered. Since the ratio of df(X) to DF(X) represents the extent as to how unusually frequently word X appears in the search results, a word with a larger value thereof is to be extracted as topic word. Because the comparison between a general word with a larger frequency and a highly specific word with a smaller frequency at an identical scale is very difficult, words are divided in some classes on the basis of the document frequency df(X) in the search results, to pick up topic words from each frequency class of at good balance.

The topic word co-occurrence table generation routine generates a table-form data wherein the topic word extracted by the above method are arranged vertically and horizontally. In a column with topic word X vertically and topic word Y horizontally, number CF (X, Y) of documents in the search results where topic word X and Y concurrently appear is placed.

By between-topic word links generation routine 143132, topic words with larger frequencies than the frequency of each topic word (X) are prepared in arrangement in the decreasing order of relevance degree. The calculation method of the relevance degree between the topic words X and Y includes various methods, and one of these methods comprises calculating the ratio of CF(X, Y)/df(Y) wherein CF(X, Y) and df(Y) represent co-occurrence document frequency CF(X, Y) and document frequency of Y (namely, df(Y)) in the search results, respectively. Linking candidates are arranged in the decreasing order of the value. Because not all of the extracted topic words are displayed, actual link address is determined by examining the linking candidates starting from the upper order (left) to select the one which is displayed. Since it is very convenient to examine where links may come, other than the link address, where links may come should be examined to be stored as information.

By topic word graph mapping coordinate calculation routine 143133, the coordinate for arranging a topic word two-dimensionally is calculated on the basis of topic word linking information, under the provision that and all topics words are displayed. For brief description of the method of the U.S. patent application Ser. No. 08/888,017, the document frequency df(X) of each topic word in the search results is on the vertical coordinate. (So as to make the parameter region compact, herein, logarithmic representation or inverse tangent function may be used.) On the horizontal coordinate, firstly, nodes with no link address are uniformly arranged within a predetermined range. Thereafter, horizontal coordinates should be sequentially determined, recursively, by a method comprising uniformly arranging the horizontal coordinates of the nodes with the same link address nodes for which the horizontal coordinates are already determined. Because overlaps of nodes may occur according to the method, furthermore, a right node should be shifted, further toward the right side, if any overlap is present, to avoid overlapping.

By the topic word/document corresponding table preparation routine 143141, a data to correspond the temporary ID numbers of retrieved documents containing a topic word among the retrieved documents to the temporary ID number of the topic word, should be prepared, with reference to the word/document corresponding data 15D13. Herein, the temporary ID number of a word means the number representing what position is occupied by the topic word stored in the topic word storage area. Additionally, the temporary ID number of a document stored in the search results storage area means what position is occupied by the document.

By the document/topic word corresponding table preparation routine 143142, a table to correspond the temporary ID numbers of topic words contained in each retrieved document to the document is prepared with reference to the document/word corresponding data 15D12.

After completion of the aforementioned operations, the information provider side retrieval assisting routine 1431 sends back the data relevant to the search results and topic words and the data representing the relation between documents and topic words, to users. Hereinafter, FIGS. 13A and 13B to 17 show examples of data sent back to a user side.

FIGS. 13A and 13B are examples of the data of transmitted search results. The data is divided as main part (a) and data (b) relevant to display order. The main user side search results storage area 34424a is composed of temporary document number, flag relevant to document selection, the mark intensity attached to a document, document identification number, suitability score with search queries, and information for users to identify a document, such as title and issue date. (The temporary document number is a number indicating at what position the document is stored in the table, but the document identification number is rather used for actually recovering document contents.) The selection flag and the mark intensity are at states of all clear, as initially set by an information provider side. When a user operates the retrieval assisting interface 322(FIG. 3 ), these values change and correspondingly, the interface image changes. The selection flag is on (1) when a user designates a document as interesting. The flag is utilized for associative search based on the selected documents or for marking (emphasizing) topic word contained in the selected documents. The selection flag may take two values, namely on (1) and off (0), or may be three values of 1/0/−1 when negative selection (selection indicating no active interest) is permitted. In the present example, two values of 1/0 are present. As to the mark intensity, alternatively, a mechanism exists for selecting such intensity for topic word, and is utilized for a case of marking a document containing the selected topic words, and the like. A greater number of topic word species increases the mark intensity.

As to the suitability score, the former two have a value of 2 and the remaining ones have a value of 1 in the example of FIG. 13A, which indicates that, by using a scoring method on the basis of the number of the species of designated key words being contained for key word search, the former two contain both the designated key words "KW-a1" and "KW-a2" and are accordingly scored as point 2, while others except them contain only either one of them and are therefore scored as point 1. Various methods may be applicable as the calculation method of suitability degree. When associative search (similarity) is done, furthermore, the similarity may be used as such score, as it is or after some normalization by a certain process. As the normalization process, for example, a process is illustrated, comprising defining a document with the highest similarity as point 100 and subsequently proportionally dividing the score.

FIG. 13B is a data relevant to the display order of documents. Because the data is represented in the increasing order of temporary document numbers, as initially sent from an information provider side, the documents are arranged in the sequential order from 1. As will be described below, the present retrieval assisting interface has sorting function B32 (button B32 (see FIG. 3 )) based on mark intensity, to provide a function to display documents in the decreasing order of the mark intensity. In order that the document display order can be changed or reversed to the original state when the function is used, the display order storage area 34424b is substantially used.

FIG. 14 is an example of the data relevant to topic words. The data stored in the user side topic word storage area 34425 is composed of the temporary topic word number, flag showing whether or not the topic word appear in graph mapping, selection flag, mark intensity, word spelling, display position on a topic word graph, and frequency class.

As to the flags concerning the presence or absence in graphic display, the former five are defined as 1 (present) and the remaining ones are defined as 0 (absent) in the example of FIG. 14. The number 5 indicates that the number of words appearing in graphs is defined by presetting in the parameters storing area 344212 in FIG. 2, and an information provider side or both an information provider side and a user side can preset parameters for actually determining the value. Under no presetting from a user side, the preset value from an information provider side is to be used as default.

Like the case of search results, the selection flag and mark intensity are at initial states of all clear. Graphic display position is represented as a value calculated by a provider side retrieval routine 1431 according to the topic word graph mapping coordinate calculation routine 143133 (FIG. 12). The frequency class is represented as a classification value, depending on the document frequency in the search results of topic words in the topic word extraction routine 14312 (FIG. 12). Class 1 represents a relatively high frequency; Class 2 represents a moderate frequency; and Class 3 represents a relatively low frequency.

FIG. 15 depicts one example of between-topic word linking information data. Words to be linked from each topic word are arranged in the decreasing order of the preference for graphic mapping of topic words. The data is represented in such a form that a list of temporary topic word numbers as linking candidates might correspond to a temporary topic word number. When a set of words to be expressed on graphs are determined, the most preferential linking partner is selected among linking candidates. For example, the preferential order from a topic word with the temporary topic word number 3 is 1, 2, - - - , but for the data of FIG. 14, temporary topic word numbers 1 through 5 are displayed on graphic display, and therefore, the first number 1 is the linking partner. The linking base list is automatically prepared from the linking partner data.

FIG. 16 is an example of the topic word/document corresponding table. The table is shown in such a form that a document list with temporary numbers of documents containing each topic word corresponds to the temporary number of the topic word. This is prepared with reference to the word/document corresponding data 15D13 (FIG. 11) in the topic word/document corresponding table preparation routine 143141 (FIG. 12).

FIG. 17 is one example of the document/topic word corresponding table. The table is shown in such a form that the list of temporary numbers of topic words contained in each document with a temporary number as search results corresponds to the document. The table is prepared with reference to the document/word corresponding data 15D13 in the document/topic word corresponding table preparation routine 143142 (FIG. 12).

The topic word/document correspondence and the document/topic word correspondence are in the inverse relation with each other. In FIG. 16, for example, the document with a temporary document number 1 appears in the columns with temporary topic word numbers 1, 2 and 4, while in FIG. 17, the topic word numbers 1, 2 and 4 appear in the column with a document number 1.

Based on the received data described insofar (search results and topic word data), user side retrieval assisting routine 3441 (FIG. 5) carries out updating process 34412 of search results imaging data and updating process 34413 of topic word imaging data. For updating of search results imaging data, the routine for generating display data of the search result 3443 (FIG. 2) is used as subroutine; for updating of topic word imaging data, routine for generating display data of topic word graph 3444 is used as subroutine. Additionally, these imaging data preparation routines utilize the parameter values preset in the parameter storage area 34421 (FIG. 2). The routines and parameter values are described in detail by using FIGS. 18 to FIGS. 21A through 21C.

FIG. 18 depicts the detail of the parameter 344211 to be used for search results imaging data preparation. There are parameters such as line interval ($\Delta y$), mark display position (x1), mark shift width ($\Delta x1$), bit map mark identifier (Bm), selection window display horizontal coordinate (x2), selection window size (h, v), window display color (CS0) for unselect, window display color for select (CS1), horizontal coordinate of score display position right end (x3), horizontal coordinate of title display position left end (x4), background color (CD) of title display area of document display, title display font (F), and the like. The character rows shown in ( ) are for reference in the description of the routine for generating display data of the search result 3443.

Figure 19A:
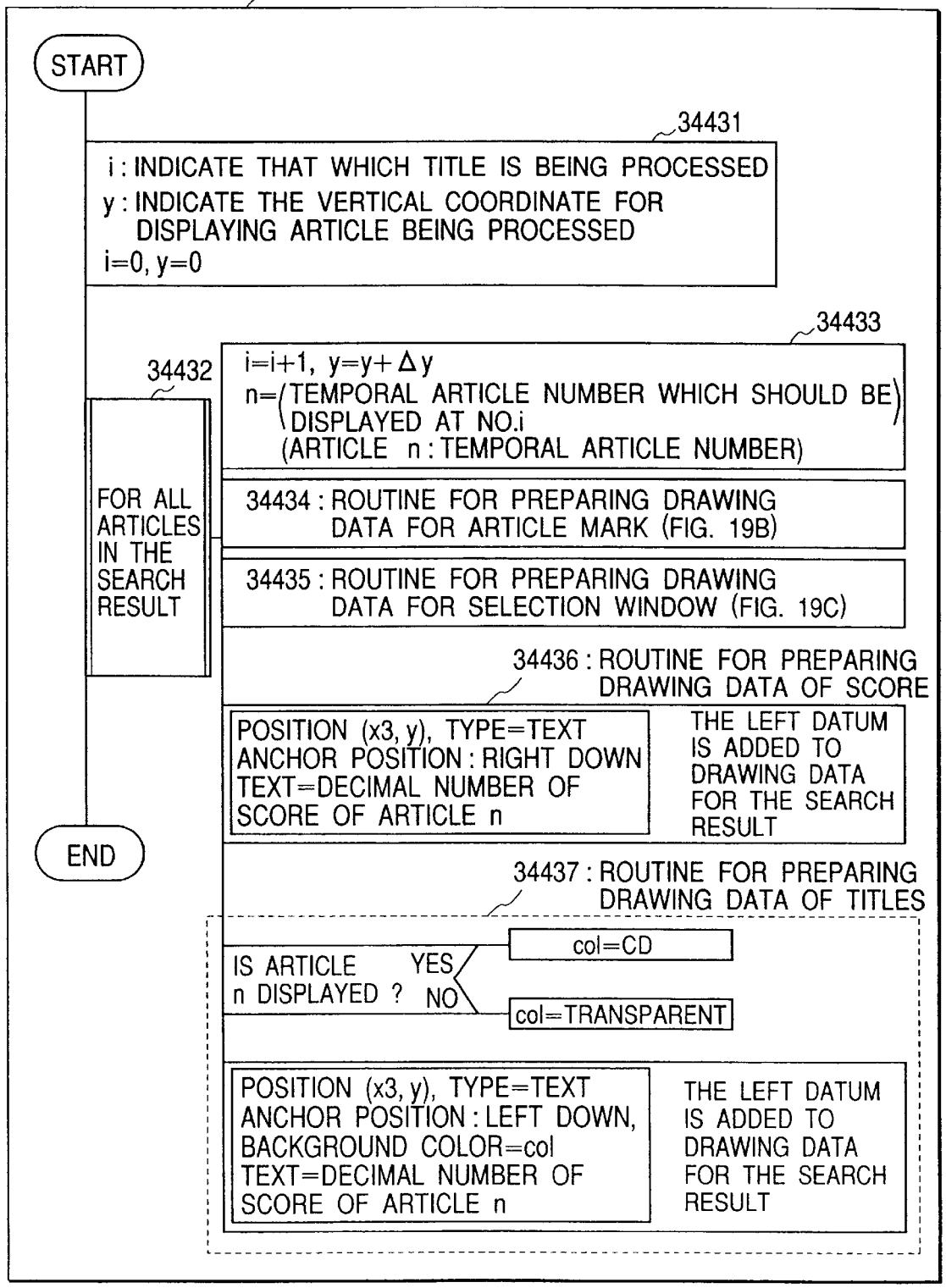
FIGS. 19A and 19B are PAD views representing a part of the process flows of the search results imaging data preparation routine.
Figure 19B:
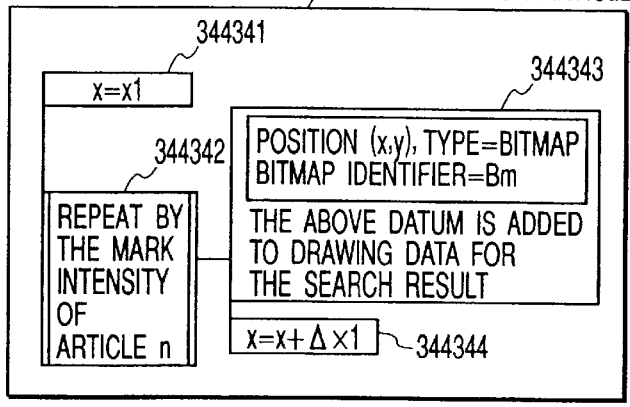
Figure 19C:
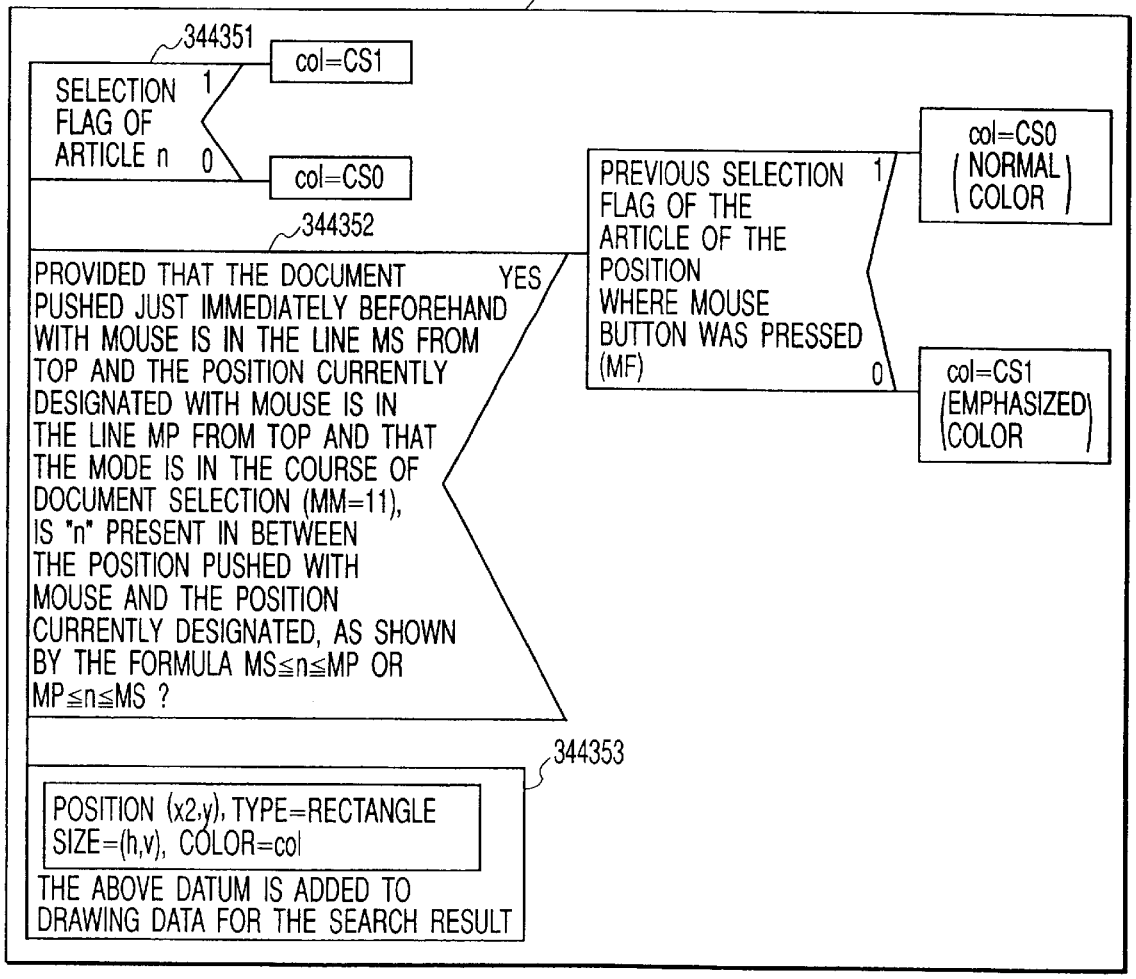
FIG. 19C is a PAD view representing the remaining part of the process flow of the search results imaging data preparation routine.

FIGS. 19A through 19C depict the detail of routine for generating display data of the search result 3443, which is used for the search results imaging data update routine 34412 of the retrieval assisting routine 3441 (FIG. 5). At initial presetting 34431, firstly, variable "i" representing display order and variable "y" representing the vertical coordinate value of the display position should be preset at 0. At loop 34432, the following process should be repeated at the number of documents as search results. Firstly at the process 34433, the value of variable "i" and the value of variable "y" should be incremented by 1 and $\Delta y$, respectively. $\Delta y$ is a value preset as a line interval value for displaying search results in the parameter 344211 (FIG. 18). (The numerical figure of the vertical coordinate of the display position increases from top to down.) Additionally, the temporary number of a document displayed on the sequential order "i" is substituted with the variable "n". With reference to the search results display order storage area 34424b (FIG. 13B), the value is determined by picking up a number corresponding to the display order i. In the following description, furthermore, "document with a temporary document number n", if described accurately, should be abbreviated as "document n", if no specific concern of the occurrence of any mistake exists.

Subsequently, mark imaging data preparation routine 34434, selection window imaging data preparation routine 34435, score imaging data preparation routine 34436, and imaging data preparation routine of title, etc., 34437 are performed. The former two are described in detail in FIG. 19B and 19C, respectively. At the score imaging data preparation routine 34436, an imaging data of "position (x3, y), diagram type=character row, attaching position=lower right, character row=(decimal expression of the score of document n)" is added to the search results imaging data 34422P1 (FIG. 7). Herein, x3 is preset as the horizontal coordinate of the right end of the score display position in the search results imaging data preparing parameter 344211 (FIG. 18).

Finally at the imaging data preparation routine of title, etc. 34437, temporal variable col is set to the background color CD (FIG. 18) of the title display area during the display of the document if the document is displayed, and otherwise, col is set to transparent. Whether or not the document is on display is determined, depending on whether or not the identification number of the document (indicated in the document number column of the search results storage area 34424a) is equal to the value of the variable MD to be used in the retrieval assisting routine 3441 (FIG. 5). Continuously, an imaging data of "position (x4, y), diagram type=character row, attaching position=lower left, background color=Col, character row "(title of document n)" is added to the search results imaging data 34422P1. Herein, x4 is a value, parametrically preset as the horizontal coordinate of the left end of the title display position (FIG. 18). The score of the document n and the title of the document n can be picked up from the corresponding column of the search results storage area 34424a.

FIG. 19B is the detail of the mark imaging data preparation routine 34434. By the operation, a process of adding an imaging data to display a mark symbol (check mark, etc.) parameter preset in the variable Bm (FIG. 18) as a bit map identifier for marking, to the search results imaging data 34422P1 (FIG. 7) is repeated at a number of times corresponding to the mark intensity of the document n (recovered from the search results storage area 34424a). For display on the horizontal coordinate (X), the parameter preset value x1 as mark display position is substituted by initial presetting 344341, and after shifting, mark is shifted each time by a shift corresponding to the similarly preset value $\Delta$x1 as mark shift pitch (FIG. 18) for display. Therefore, a check mark with a broadness in proportion to the mark intensity is drawn.

FIG. 19C depicts the detail of the selection window imaging data preparation routine 34435. At conditional branch 344351, firstly, it is determined whether or not the document n is selected (as indicated by the selection flag in the search results storage area 34424a) and if selected, the window display color (col) is defined as a color (unambiguous color such as red) and otherwise, the color is defined as an ambiguous color (transparency, etc.). Continuously at conditional branch 344352, if it is judged whether the document pushed just immediately beforehand with mouse is in the line MS from top and the position currently designated with mouse is in the line MP from top and that the mouse is in the course of document selection (MM=11), is "n" present in between the position pushed with mouse and the position currently designated, as shown by the formula MS$\leq$n$\leq$MP or MP$\leq$n$\leq$MS. if yes, then it is judged whether the article of the position user mouse button was pushed is preliminarily selected or not. If selected, non-selection color CS0 is substituted with the variable col, and the selection color CS1 is substituted with the variable col, if not selected. By further using the designated value X2 as the horizontal coordinate of selection window and (h, v) as the size of the selection window, an imaging data of "position (x2, y), diagram type=rectangle, size (h, v), color=col" should added to the search results imaging data 34422P1. Thereby, the selection window is colored with the selection color (CS1) of the document at selected state or a document currently under dragging to be put at selection state; otherwise, the document is colored with non selection color (CS2).

FIG. 20 depicts the detail of the topic word graph mapping data preparation parameter 344212. The background color, font type and frame line color of a part displaying the character row of a topic word are designated, and for them, individually, values during selection or non-selection or values marked or not marked are designated. In this example, the background color is green and the font is general one, when a topic word is not selected; if selected, the background color is orange and the font is a font for emphasis; if marked, the frame line color is red, and otherwise, the line color is transparent. Generally, prominent color and prominent font are preferably used, if selected or if marked.

Figure 21A:
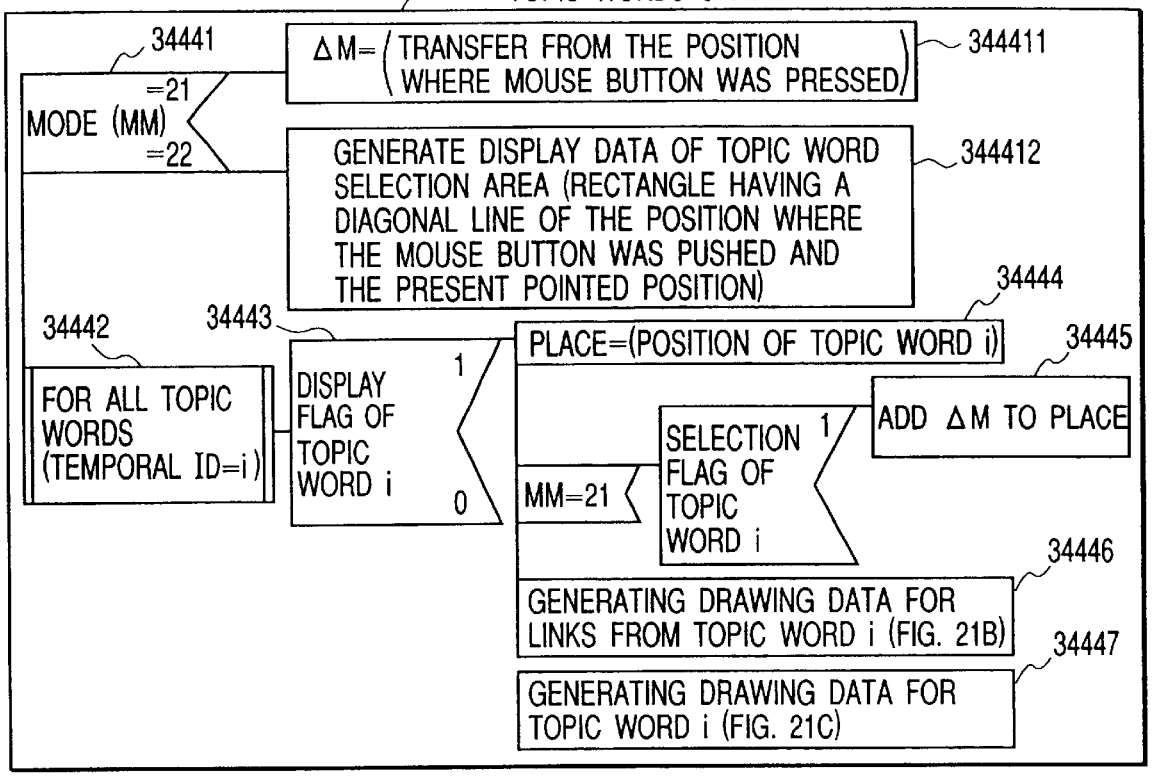
FIGS. 21A and 21B are PAD views representing a part of the process flows of the topic word graph mapping data preparation routine.

FIG. 21A depicts the detail of the routine for generating display data of topic word graph 3444, for use in the topic word imaging data update routine 34413 of the retrieval assisting routine 3441 (FIG. 5). Firstly, if the drag mode of the retrieval assisting routine 3441 works to move topic word (MM=21), the shift value (vertical, horizontal) from the position where the mouse was pushed should be substituted with the variable $\Delta$M; if the drag mode works to set the topic word selection region (MM=22), a data imaging the topic word selection region (rectangle with diagonal angles on the position where the mouse was pushed and the position currently designated) is added to the topic word imaging data 34422P2.

Continuously, a data imaging the node of a topic word (temporary number=i) with a display flag being on as well as a data imaging the link from the topic word is prepared. Firstly at the process 34444, a variable "place" is substituted with the display position of topic word "i". The value can be gained from the topic word storage area 34425 (FIG. 14). Additionally, whether or not the display flag of topic word are on can be known, similarly, from the corresponding column of the topic word storage area. When the mode is topic word move mode (MM=21) and the selection flag of the topic word "i" is on, continuously, $\Delta$M (mouse move distance) previously calculated is added to the variable "place". (More specifically, the display position varies, depending on the mouse move.) In such manner, the preparation routine 34446 (FIG. 21B) of the imaging data of links from the topic word "i" and the preparation routine 34447 of the imaging data of the node of the topic word "i" are executed.

Figure 21B:
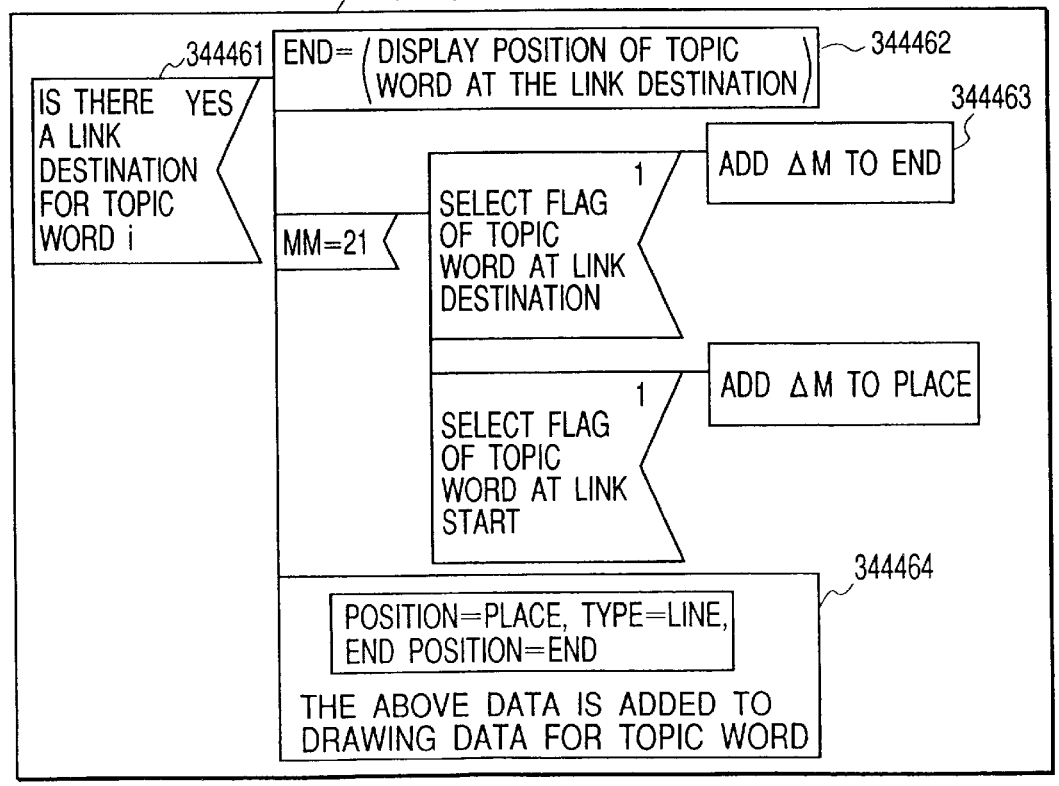

FIG. 21B depicts the detail of the preparation routine 34446 of the imaging data of links from the topic word "i". If any of linking partners from the topic word "i" is present, all of such linking partners are processed as follows. At the process 344462, firstly, the display position of a linking partner (in the topic word storage area 34425) is substituted with a variable "end". Continuously when the mode is the topic word move mode (MM=21) and the selection flag of the linking partner is on, the ΔM as the mouse move is added to the variable "end" of the linking partner. By presetting as described above, the imaging data of "position=place, diagram type=line, end position=end" is added to the topic word imaging data 34422P2.

Figure 21C:
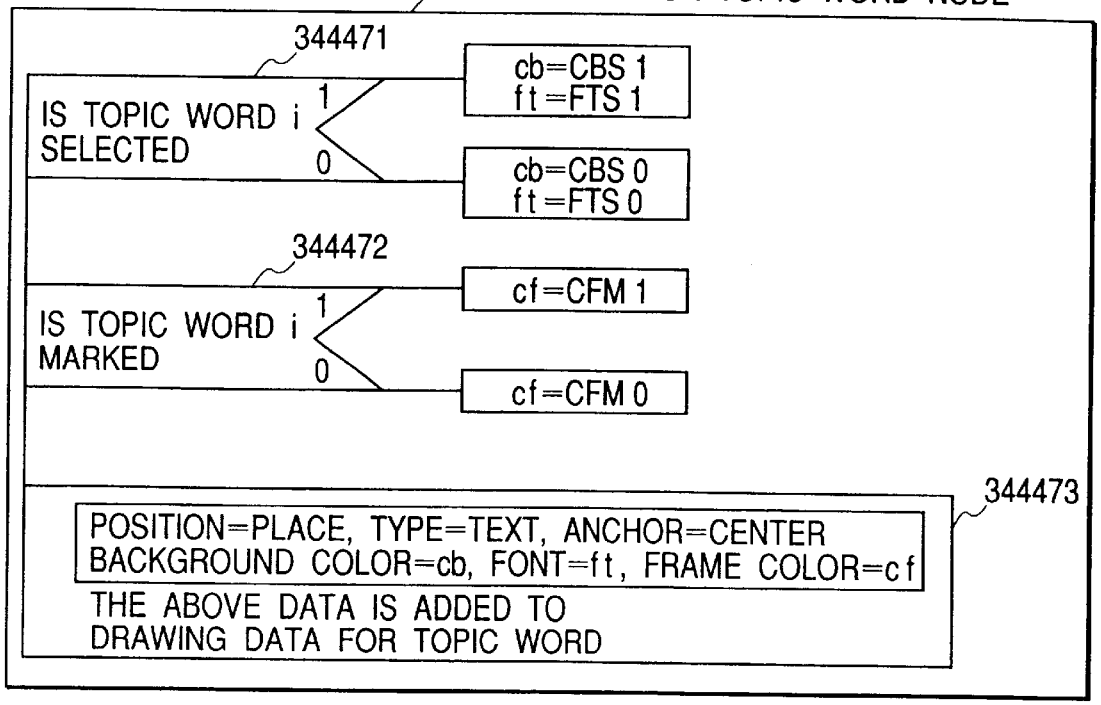
FIG. 21C is a PAD view representing the remaining part of the process flow of the topic word graph mapping data preparation routine.

FIG. 21C depicts the detail of the preparation routine 34447 of the node imaging data of the topic word "i". Depending on whether or not the topic word "i" is selected, the background color "cb" and font "ft" are set at preset values, and depending on whether or not the topic word "i" is marked, the frame line color "cf" is set at the preset value. Then, the imaging data of "position=(display position of topic word i), diagram type=character row, attaching position=center, background color=cb, font=ft, frame line color=cf" should be added to the topic word imaging data 34422P2.

Various functions provided to users by the present retrieval assisting interface are described hereinbelow. By utilizing various combinations of these functions, users can analyze search results or can browse the desired search results while selecting the optimal retrieval method and refining the search queries.

The retrieval assisting routine 3441 for operating the interface has already been shown in FIG. 5, but the details as to which process works for various inputs, such as button operation and mouse operation, where omitted. As shown in FIG. 5, the part corresponds to the process 3441KB for keyboard input, the process 3441MP when mouse is pushed, the process 3441MD when mouse is moved under pushing, and the process 3441MR when the mouse is released. With reference to FIGS. 22 to 26A and 26B hereinbelow, these are described in detail.

Figure 22:
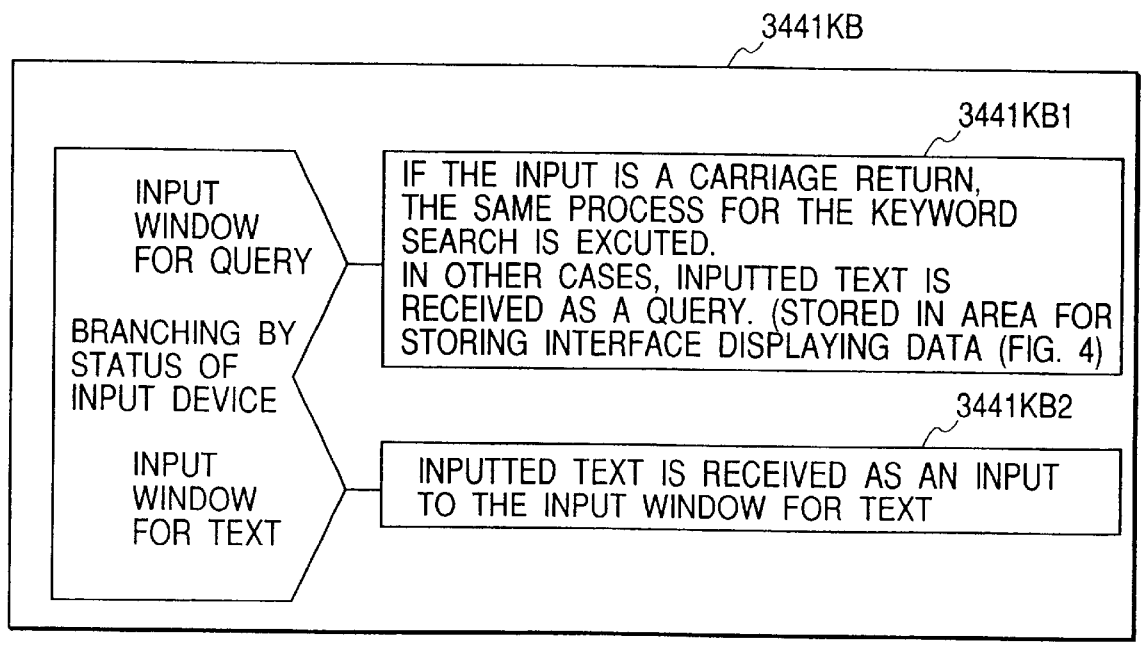
FIG. 22 is a PAD view representing the process of user side retrieval assisting routine in response to keyboard input.

FIG. 22 depicts the detail of the process 3441KB for keyboard input. Because plural interface objects with a possibility of receiving input are present, it should be determined firstly which object is at a state capable of receiving input, and when the query input window E1 (FIG. 3) is at a state capable of receiving input, the input characters should be added to a position designated with the cursor position 34422E15 of the display contents 34422E13 in the query input imaging data 34422E1 of the interface imaging data storage area 34422 (FIG. 4). The contents are displayed on the query input window E1 on the interface, at the interface image imaging process 34414 (FIG. 5) of the retrieval assisting routine 3441. (Hence, the input from keyboard is going to be written on the query input window E1.) As to the method for executing deletion input, a number of variations are possible, but a method is suggested, comprising deleting characters from the mark position to the cursor position when the mark position is designated, and deleting a character just immediately before the cursor position, if no position is designated.

It is also a convenient setting that when the query input window E1 is at a receivable state, the same process as the case of pushing a key word search button should be effected if a carriage return is inputted, so that the present retrieval method is easier to use.

As an additional input receiving window, text input part TE1 (described below in the description of FIG. 36) to be opened when text input button B03 is pushed is present, and text should necessarily be inputted therein from keyboard. The detail is described in the section "text input function".

Figure 23A:
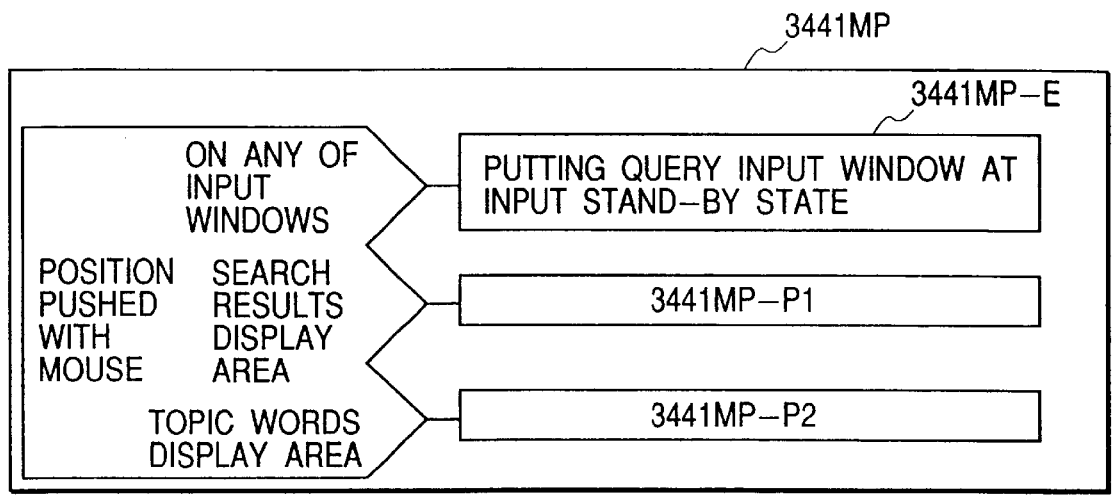
FIGS. 23A and 23B are PAD views representing a part of the processes of the user side retrieval assisting routine when mouse is pushed.

FIG. 23A depicts the detail of the process 3441MP in the retrieval assisting routine 3441 when mouse is pushed. When any input window is pushed, the input window falls into an input receiving state (Process 3441MP-E). Because the process 3441MP-P1 for the case the position pushed is on the search results display area P1 as well as the process 3441MP-P2 when the position is on the topic word display area P2 requires complex procedures, these processes are shown separately in FIG. 23B and FIG. 23C, respectively.

Figure 23B:
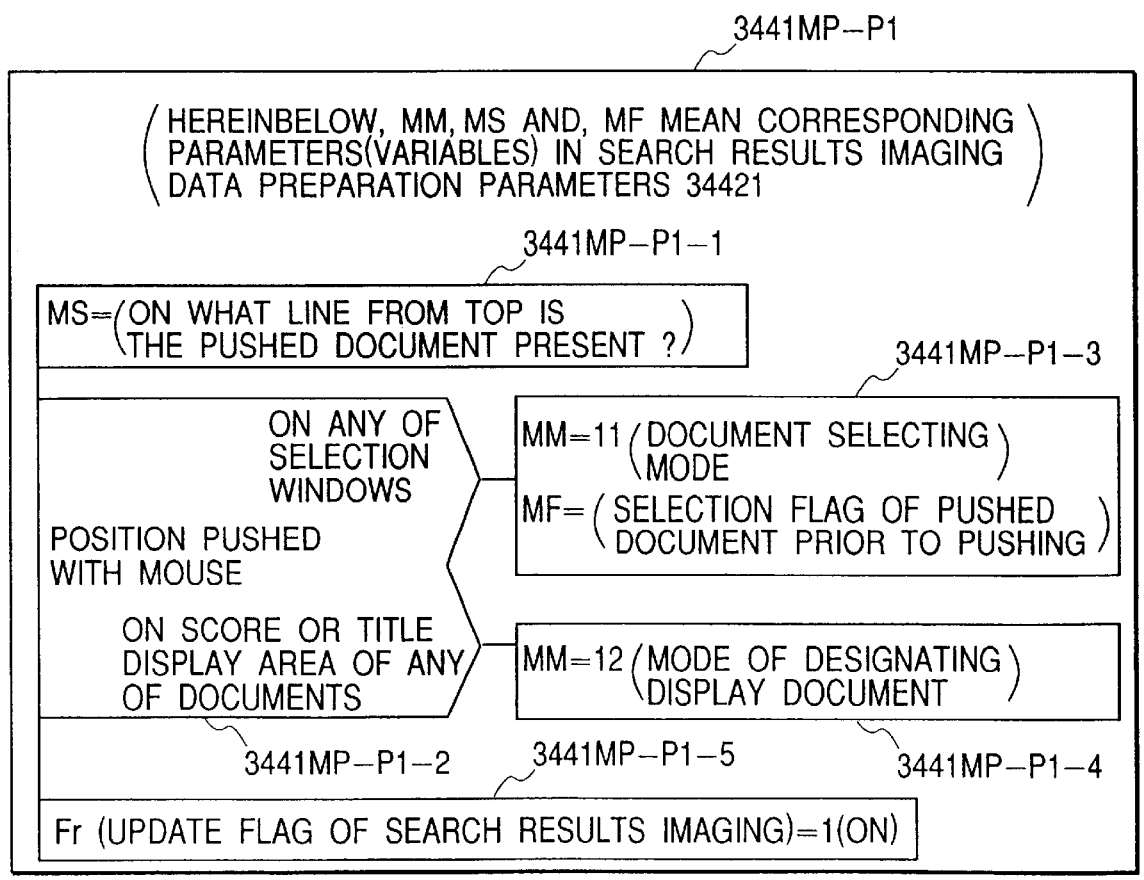

FIG. 23B depicts the detail of the process 3411MP-P1 when mouse is pushed on the search results display area P1. Firstly at the process 3441MP-P1-1, the sequential order of the pushed document from top is recorded in the variable MS (FIG. 5) used in the retrieval assisting routine 3441 when the area is pushed. Then, branch 3441MP-P1-2 comes, depending on the position of mouse pushed, and when the position is on the selection window (small rectangle) of any document (see FIG. 6), the variable MM used in the retrieval assisting routine 3441 is defined as 11, which indicates that the mode is during document selection. Furthermore, the value of a selection flag just immediately before the pushing of mouse on the corresponding document (the value is gained from the search results storage area 34424a (FIG. 13A)) is substituted with the variable MF. When the pushed position is on the score or title display area of any document, the mode variable MM is set at the value (=12) meaning that the display document is on the way of designation.

These values are referenced and used when mouse is moved under pushing or released, to facilitate the processes corresponding to the individual values. Therefore, what effects may be brought about are described in the section for processes for mouse move or mouse release.

At the end of the process 3441MP-P1 for mouse push on the search result display area, the search results imaging update flag Fr (FIG. 5) is set at 1 (on), so that the search results imaging data be updated.

FIG. 23C depicts the detail of the process 3441MP-P2 when mouse is pushed on the topic word display area P2.

For mouse operation for topic word, a designated topic word is used as search key word, or selection/non selection (+move) is done. In the present example, it is preset such that selection/non selection is executed with left mouse, while key word addition or deletion can be executed with right mouse. It is needless to say that these may be replaced with each other. Additionally, it is preset that different operations may be performed, depending on the use of shift key in combination or no such use, but these may also be replaced with each other. Therefore, the description herein is about a method for the practice of one of possible presetting.

At the process 3441MP-P2 when mouse is pushed, firstly, branching is done, depending on whether or not the position where mouse is pushed lies on any topic word. When mouse is pushed on a topic word, branching is effected, depending on the mouse type, and for left mouse, the following operations are effected.

Firstly, conditional branching is effected, depending on whether or not shift key is pushed, and by a concurrent use of left mouse and shift key, the process 3441MP-P2-1 is effected to toggle the selection/non selection of the pushed topic word alone. In other words, the value in the selection flag column of the topic word storage area 34425 (FIG. 14) should be rewritten. When left mouse is pushed with no use of shift key, further branching is effected, depending on the selection state of the pushed topic word, and when the topic word is already at selection state, no operation is effected; when the topic word is at non selection state, the topic word is set at selection state while other topic words are all set at non selection state. The above processes correspond to the process 3441MP-P2-2.

When a pushed topic word falls into selection state after the aforementioned processes are effected by using left mouse, the value of mode variable MM in the retrieval assisting routine 3441 is set at the value (=21) meaning the topic word under moving. Thereby, mouse move under pushing can move a selected topic word, following the move of the mouse.

No operation is executed if right mouse is pushed on a topic word, but when released, an operation for adding the selected topic word to query or deleting the topic word from query is effected (see the operation when mouse is released, as described below).

When the position pushed with mouse does not lie on any topic word, the process 3441MP-P2-3 is executed to set the value of the mode variable MM at the value (=22) meaning that the topic word selection region is now under the way of setting. Thereby, a rectangle representing the topic word selection region is displayed on the topic word display area P2 when mouse is moved under pushing, to effect the process of selecting all topic words with some overlap with the topic word selection region, when the mouse is released.

At the end of process 3441MP-P2 for mouse push on the topic words display area by setting the update flag of topic word imaging Fc (FIG. 5) at 1 (on), the imaging data on the topic word display area is to be updated.

Figure 24:
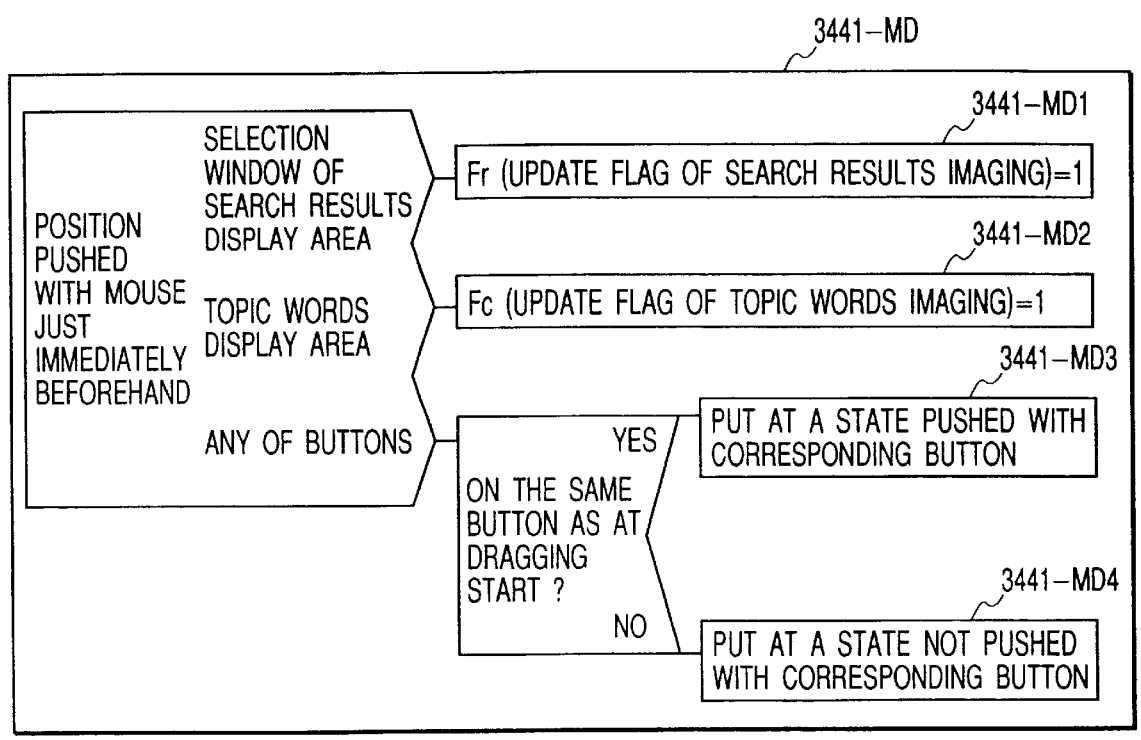
FIG. 24 is a PAD view representing the process of the user side retrieval assisting routine when mouse is moved under pushing.

FIG. 24 depicts the detail of the process 3441MD during mouse move under pushing (during dragging operation). The following processes are effected, depending on the position of mouse pushed just immediately beforehand. Because mouse was pushed on the selection window of the search results display area, the update flag of search results imaging Fr (FIG. 5) is set at on (=1), to continuously update the imaging contents on the search results display area during move. In case mouse was pushed on the topic word display area, furthermore, the update flag of topic word imaging Fc is set at on (=1) to continuously update the imaging contents on the topic word display area. In case mouse was pushed on any of buttons except those described above and the mouse is currently positioned on the same button as when the mouse was pushed, the button is set at a pushed state; otherwise, the button is put at a state not pushed. [Rewriting the data of the corresponding button in the interface imaging data storage area 34422 (FIG. 4).]

For the former two cases, herein, the update flag of search results imaging Fr or the update flag of topic word imaging Fc are set at on, respectively, to continuously update individual imaged contents during move, and how these operations appear on image will now be described below.

First case starts dragging from the selection window of the search results display area therefor the mode MM is set to 11 by the process 3441MP-P31-3 of FIG. 23B. And at the selection window imaging data preparation routine 34435 (FIG. 19C) of the routine for generating display data of the search result 3443 to update the search results imaging data, the mode is checked at branch 344352; at document selection mode (MM=11), the selection state of a document between at the position (MS) where mouse is pushed just immediately beforehand and at the position currently designated is locally modified, to effect the process of setting the document at an inverse value of the selection flag (substituted with the variable MF) of the document at the position where mouse is pushed just immediately beforehand. (At the process 3441MP-P1 when mouse is pushed, variables MM, MS and MF are already set.) More specifically, when the selection window of a document at a non-selection state is pushed with mouse which is then moved under pushing, the selection windows of all documents between at the position pushed and at the current position are imaged with the color for the selected state.

It should be noted herein that the change of the selection state of a document simply means that the change is local, not for rewriting the selection flag of the search results storage area 34424a (FIG. 13A). In other words, the initial selection flags of individual documents are stored, and therefore, the flags after temporary change along with mouse move can be reversed to initial states. When mouse starts from the third document to move downward as it is, to subsequently reach the seventh document (provided that the third document is initially selected), the third to seventh documents are put at selected state. By changing the direction while pushing the mouse to move the mouse upward to reach the fifth document, the third to fifth documents are put at selected states, and others except these are reversed to the initial states.

Then, a case will be described such that the area pushed with mouse just immediately beforehand is the topic word display area to display topic word graphs. The following two cases are illustrated, wherein the imaging contents are changed during move. One case is such that mouse is pushed on a topic word and the topic word is immediately thereafter put to selected state; and the other case is such that mouse is pushed on the base area with no display of topic word. It should be noted that at the process 3441MP-P2 (FIG. 23C), the mode variable is set at topic word move mode (MM=21) in the former case, while in the latter case, the mode variable is set at topic word selection area setting mode (MM=22).

The generation of imaging data is done by the routine for generating display data of topic word graph 3444 (FIG. 21A). Firstly, in case of topic word move mode (MM=21), mode determination is done at branch 34441, to record mouse move distance on the variable ΔM. Imaging position of topic word nodes for preparing an imaging data of topic words selected are based on the coordinate written in the topic word storage area 34425 (FIG. 14), but the mouse move from the pushed point should be added to the imaging position for a selected topic word at the process 34445. More specifically, the imaging position shifts by the mouse move. Because ΔM is added to the coordinate when topic words corresponding to the link start or end points are selected even in the linking imaging data preparation routine 34446 (FIG. 21B), and furthermore, links are also transferable together with the transfer of topic words, and are then to be displayed.

Then, the case of topic word selection region setting mode (MM=22) is described. In this case, process 344412 is selected at conditional branch 34441, to prepare an imaging data of a rectangle with diagonal angles lying on the position of mouse pushed and the currently designated position as a topic word selection region and display the data.

Figure 25A:
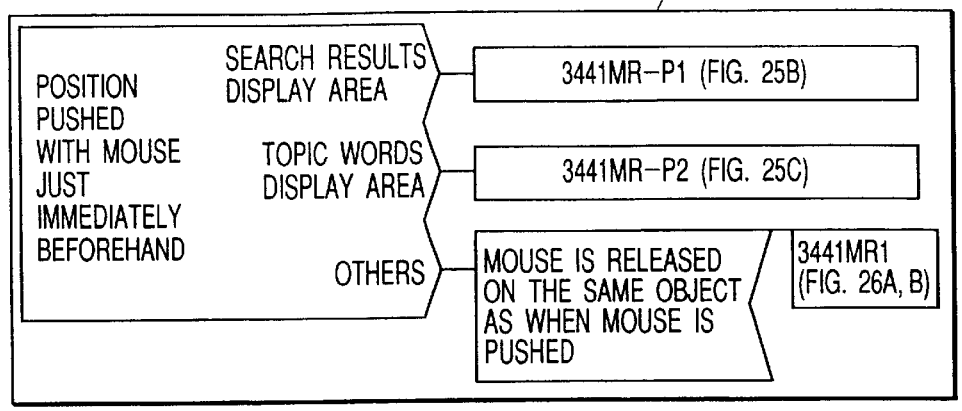
FIGS. 25A and 25B are PAD views representing a part of the processes of the user side retrieval assisting routine when mouse is released.
Figure 25B:
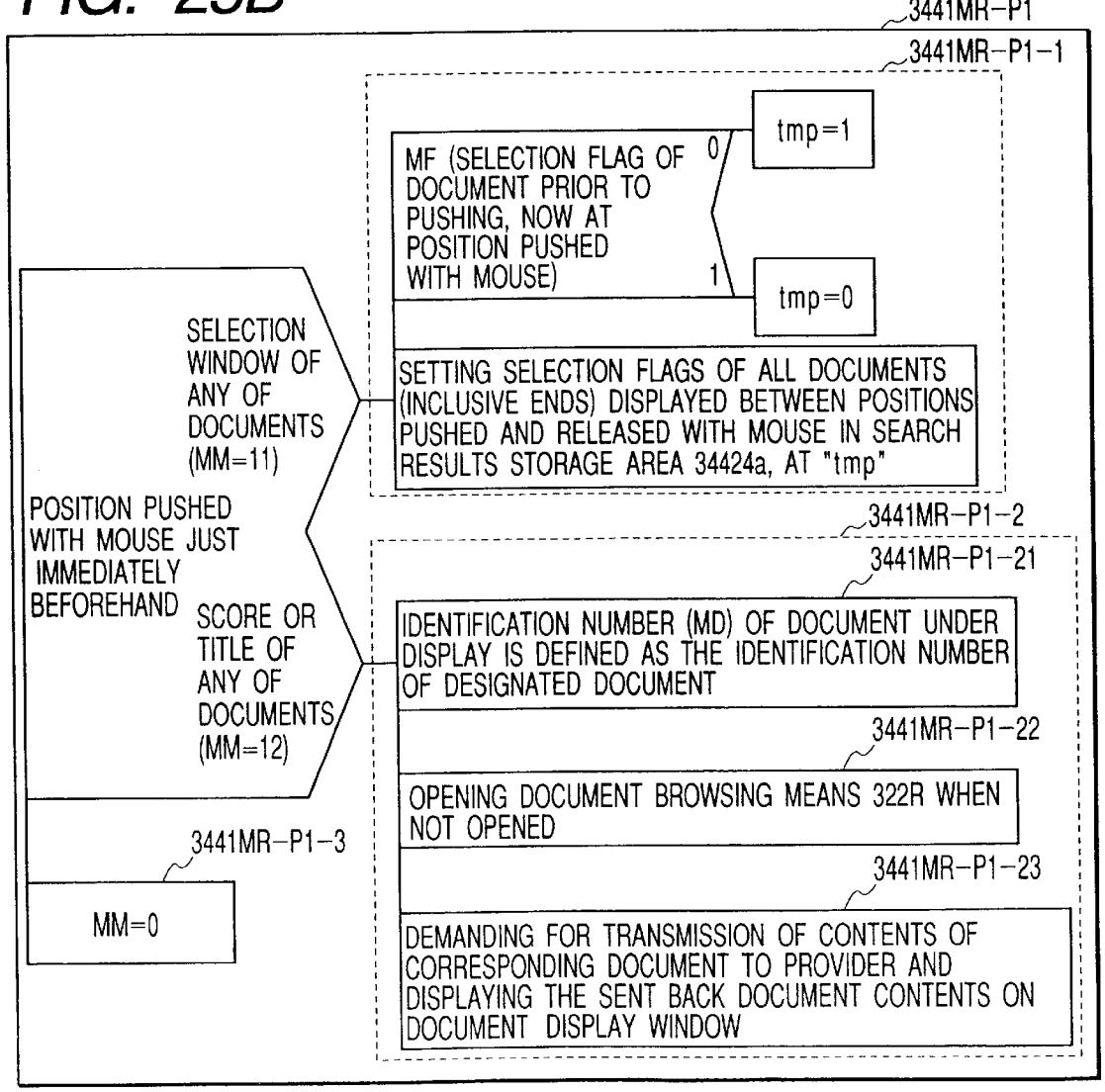
Figure 25C:
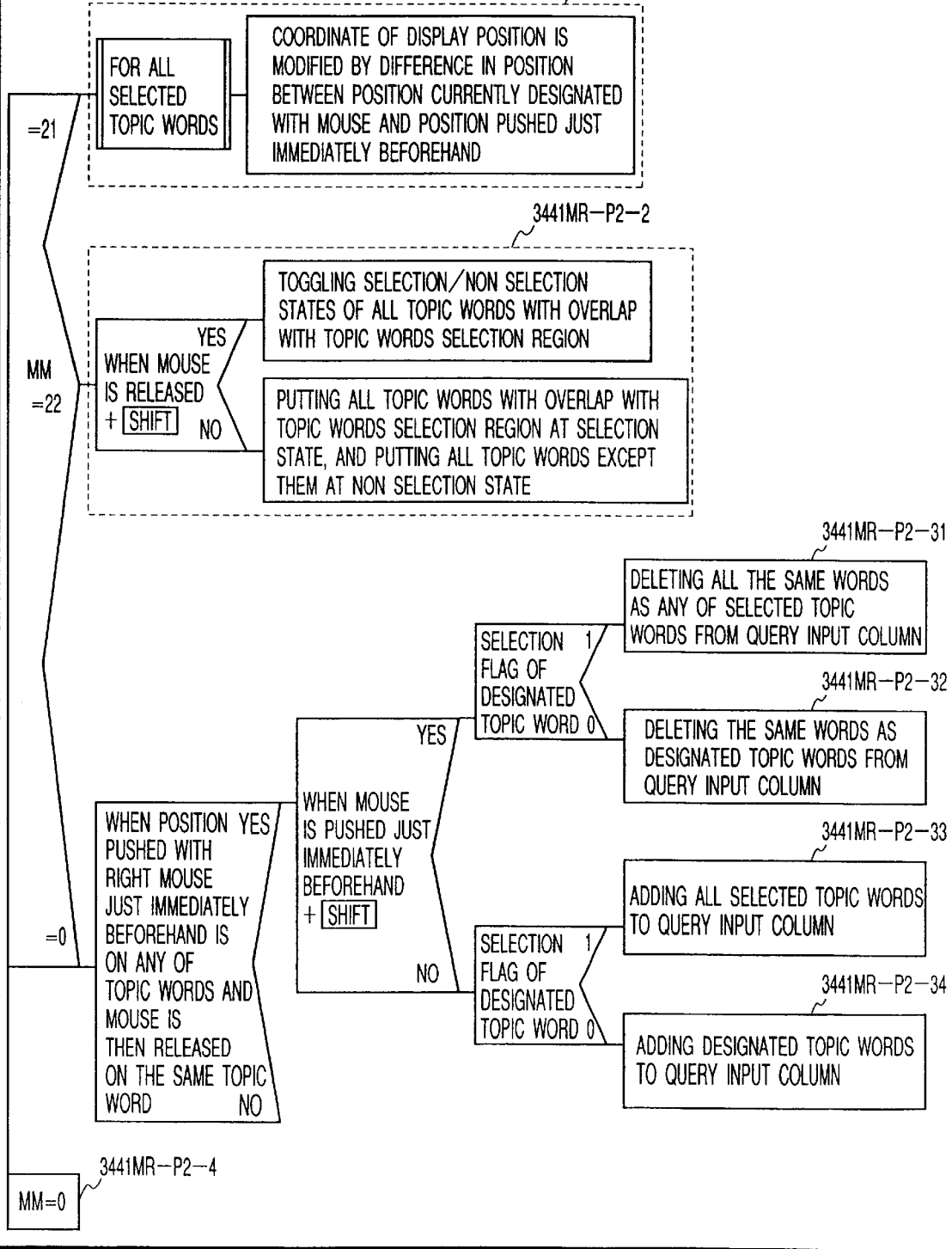
FIG. 25C is a PAD view representing the remaining part of the process of user side retrieval assisting routine when mouse is released.

FIGS. 25A through 25C depict the detail of the process 3441MR when mouse is released (mouse is reversed to the initial state from the pushed state). FIG. 25A is the overall view separately including a case wherein the position pushed just immediately beforehand with mouse is the search results display area (3441MR-P1, FIG. 25B); a case wherein the position is the topic word display area (3441MR-P2, FIG. 25C); a case wherein mouse is pushed at other parts; and a case wherein the mouse is released on the same parts (3441MR1, FIGS. 26A and 26B).

FIG. 25B depicts the detail of the process 3441MR-P1 of the retrieval assisting routine 3441 when mouse is released, provided that the position pushed just immediately beforehand is the search results display area.

When conditional branching occurs at the position pushed just immediately beforehand and when mouse is pushed on the selection window of any document (when the mode variable MM is 11), the process 3441MR-P1-1 is executed; provided that the inverse value of the selection flag just immediately before the pushing of a document at a position where mouse is pushed is defined as "tmp", the selection flags of all documents displayed between at the position where mouse is pushed and at the position where mouse is released are defined as "tmp" in the search results storage area 34424a (FIG. 13A).

When the position pushed just immediately beforehand is on the score or title of any document (in case that the mode variable MM is 12), the process 3441MR-P1-2 is executed, to substitute the identification number of a defined document with the identification number variable (MD) of a document displayed in the retrieval assisting routine 3441. When not yet opened on display means 32, document browsing means 322R is opened. A query to demand to send the contents of the corresponding document is transmitted to information provider side retrieval assisting program 143, which displays the contents of the document demanded on the document browsing means 322R (see the description of FIG. 27 described below).

For carrying out these operations, mouse pushing should be done on parts visible on the search results display area P1, but mouse release may satisfactorily be done on invisible parts thereon.

At the process 3441MR-P1-3, finally, the mode variable MM of the retrieval assisting routine 3441 is set at 0 to set the variable at general state, irrespective of the position where mouse is pushed just immediately beforehand.

FIG. 25C depicts the detail of the process 3441MR-P2 of the retrieval assisting routine 3441 when mouse is released, provided that the position pushed just immediately beforehand is on the topic word display area during the display of topic word graphs.

Depending on the value of mode variable MM in the retrieval assisting routine, a different process should be executed. Because mouse is pushed on the topic word display area during the display of topic word graphs, possible values of mode variable MM are 0, 21 and 22. 21 means the mode of moving the selected topic word; 22 means the mode of setting topic word selection region; and 0 means modes except these modes (see the process 3441MP-P2 in FIG. 23C).

At the mode during the move of topic word (MM=21), left mouse is pushed on a topic word node when mouse is pushed just immediately beforehand, so that the topic word falls into selection state immediately after such pushing. When mouse is released in this case, the process 3441MR-P2-1 is executed, to modify the display position coordinate of all topic words at selected state in the topic word storage area 34425, by the difference between the position currently designated with mouse and the position pushed just immediately beforehand. During move since mouse pushing, the same process is executed for calculating the coordinate of an imaging data at the routine for generating display data of topic word graph 3444, but the display position in the topic word storage area 34425 of itself is not modified. Mouse release means the settlement of the move partner of the topic word, so that the coordinate position of the topic word storage area 34425 is rewritten.

The topic word selection region setting mode (MM=22) put at on at the timing of mouse release is arranged by mouse pushed just immediately beforehand on base positions, not on the node of any topic word [see FIG. 23C, process 3441MP-P2-4]. Depending on whether or not shift key is pushed when mouse is released, a different process is executed. When shift key is pushed, the selection/non selection state of all of topic words overlapped with the topic word selection region (rectangle region with diagonal angles on mouse pushed position and mouse released position) is toggled. If shift key is not pushed, all of the topic word overlapped with the topic word selection region should be set at selection state, while others except these topic words should be set at non selection state. (In any case, the selection flags of the topic word storage area 34425 should be rewritten.)

In a special case that the base area with no display of any topic word on the topic word display area P2 is clicked, all topic words are at non selection state because the topic word display region is displayed as one point on areas with no display of topic words. Furthermore, this un-selecting operations can be executed by pushing the unselect (right) button as described below.

Excluding these two cases, general mode (MM=0) is on. (One case is such that right mouse is used and the other case is such that immediately after pushing of a topic word node by using left mouse, the topic word is set at non selection state.) When the position pushed just immediately beforehand with right mouse is on any topic word node and the mouse is then released on the same topic word, the following operation should be executed, depending on whether or not shift key is used in combination with mouse pushed just immediately beforehand or depending on the on/off of the selection flag of the designated topic word. When mouse is pushed while pushing shift key and the selection flag is on, all the same words as any of selected topic words are deleted from the graph in put column. When mouse is pushed while pushing shift key and the selection flag is off, all the same words as the designated topic words should be deleted among the words on query input column. When the selection flag is on without pushing of shift key, all the topic words at selection state should be added to the query input column. When the selection flag is off with no pushing of any shift key, only the designated topic words are added to the query input column.

Furthermore, finally, operation 3441MR-P2-4 to set mode variable MM to general state 0 is executed.

Figure 26A:
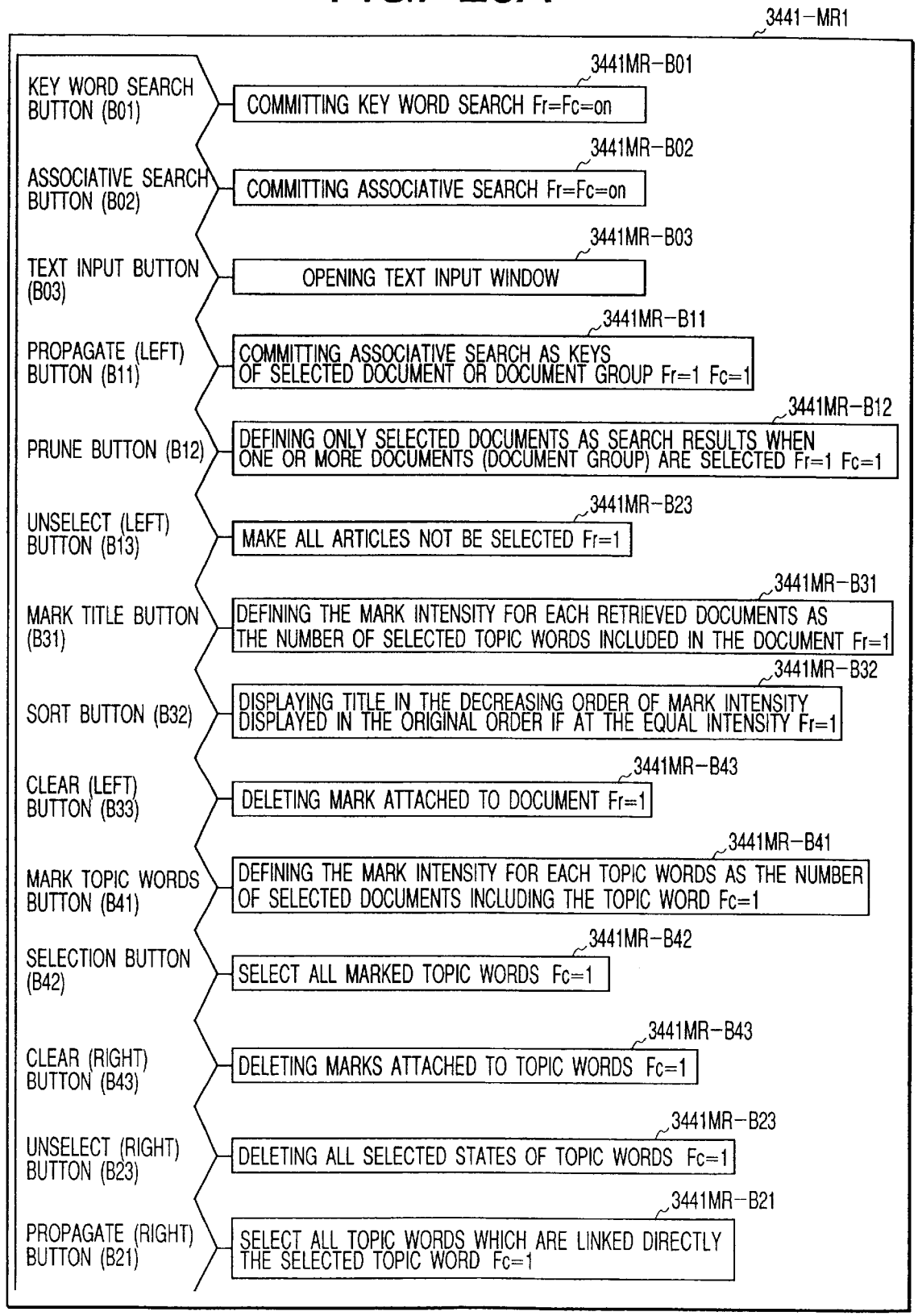
FIG. 26A is a PAD view representing a part of the process of the user side retrieval assisting routine when the button of retrieval assisting interface is clicked.
Figure 26B:
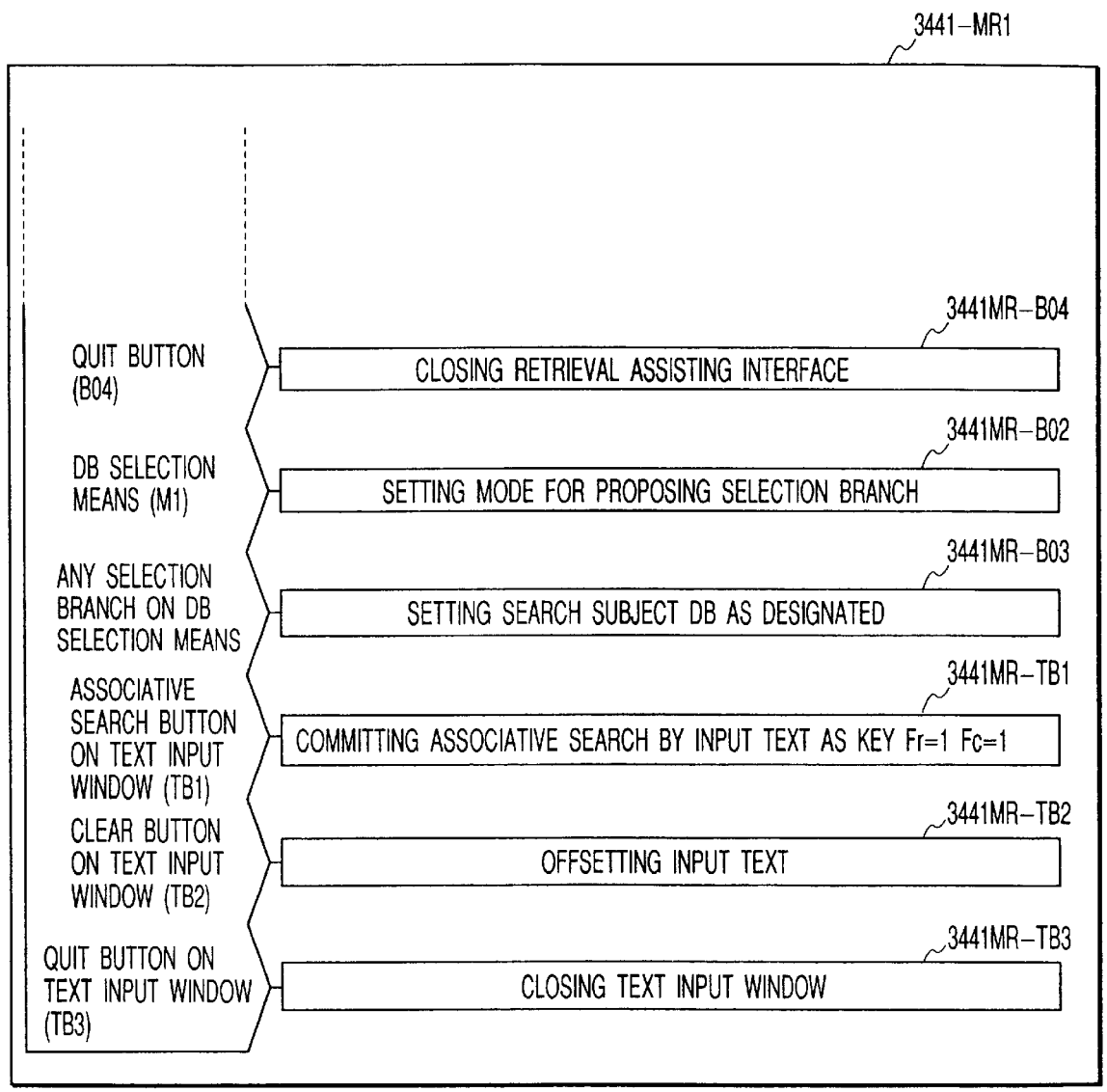
FIG. 26B is a PAD view representing the remaining part of the process of the user side assisting routine when the button of retrieval assisting interface is clicked.

FIGS. 26A and 26B depict the detail of the process when buttons and the like on the retrieval assisting interface 322 are clicked. More accurately, the figures depict the detail of the operations, when mouse is pushed on an object such as button and mouse is then released on the same object, and because such operations are mostly executed with clicking, the operations are referred to as the case of mouse clicking for simple description, unless otherwise required. Hereinafter, the operations will be descried, following the sequence of figures.

When key word search button B01 is clicked, key word search query is sent to information provider side computer 1, which receives information concerning search results and topic words. Because search results imaging data and topic word imaging data should necessarily be updated, individual update flags Fr and Fc on retrieval assisting routine 3441 should be set at 1 (on).

Associative search button B02 is the same as the case for key word search case, and in this case, the retrieval process is designated as "associative search" in light of the contents of query in this case, and the retrieval contents are designated as word row or address on network (URL on Internet). When the address on network is designated, an information provider firstly recovers a document at the designated address to compose word rows contained therein to use them as the input for associative search.

The search results and topic word information when associative search is executed are in the same form as in key word search. In the column suitability score in the search results storage area 34424*a* (FIG. 13A), however, the similarity degree (or relevance degree) or the degree in a normalized form should be placed. Also in this case, the imaging update flags Fr and Fc both are set at on.

For text input button B03, text input means 322T (see FIG. 36) should be opened as another window for text input. Text input is for inputting an interesting phrase or paragraph or a further longer chapter or section or the whole text through keyboard input or cut and paste operation from input part TE1 of the text input means, which is used as key for associative search.

The expand button (B11) is for associative search by using as the key a set of selected documents if one or more documents are selected among search results. Fr and Fc both should be set at on.

Prune button (B12) works to define the set of selected documents (one or more) among search results, as new search results. Because topic word extraction from the new search results should be effected again, the assembly of the selected documents is sent to an information provider and receive therefrom the results of topic word extraction. (Fr=Fc=1).

Unselect (left) button (B31) can release entirely the selected state of documents. More specifically, all the selection flags in the search results storage area 34424*a* should be set at 0. (Fr=1)

Mark title button (B31) functions to make unambiguous the documents among search results containing selected topic word which operates to put marks such as check mark on the left ends of the corresponding documents on the search results display area. If plural types of topic words are selected, furthermore, documents containing more such topic words should be made distinctive, and therefore, it is effective to put marks at a broadness in proportion to the number of the topic words contained. Because which documents contain each selected topic word can be identified with reference to the data in the topic word/document corresponding table storage area 34427, in practical operation, documents containing each selected topic word as search results should be examined, to increase the value of the mark intensity in the corresponding column of the search results storage area 34424*a* by an increment of 1. (Fr=1)

Sort button (B32) is for rearranging the documents as search results in the decreasing order of the intensity of a mark attached to the search result. Conveniently, users can thereby collectively check documents more intensely marked. Practically, temporary document numbers rearranged in the decreasing order of the mark intensity column in the search results storage area 34424*a* are stored in the search results display order storage area 34424*b* (FIG. 13B). (If the intensities are equal, the initial order should be stored (in the increasing order of temporary document numbers) (Fr=1).

Because documents of the corresponding document numbers are sequentially displayed in the order of the search results display order storage area 34424*b* by the routine for generating display data of the search result 3443 (FIGS. 19A through 19C), documents at a high rank of the mark intensity can be first displayed. If the mark intensities are equal, the original order is stored for display.

When sort button is clicked at all un-marked state, in a specific case, the original order can be restored. This is because documents are rearranged so that the original order might wholly be stored since the mark intensities are all 0. This is a convenient function for restoring the original arrangement state, after marking and sorting are executed for rearranging the order.

Clear (left) button (B33) works to set all the mark intensities of documents as search results at 0 (Fr=1). Thereby, all the marks can be deleted.

Mark topic word button (B41) works to make unambiguous the topic words contained in the selected documents. For more specific description, when topic words displayed in the topic word display column P2 are contained in any of the selected documents, the topic words are displayed with emphasis. For example, it is illustrated a method to attach vivid color such as red to frame lines or a method to modify the character font.

Because it can be identified, with reference to the data of the document/topic word corresponding table storage area 34428, which document contains which topic word, at practical operation, topic words contained in each of the selected documents should be examined to increase the value of the mark intensity in the corresponding column of the topic word storage area 34425 (FIG. 14) by an increment of 1 (Fc=1).

At the imaging data preparation routine 34447 (FIG. 21C) of topic word nodes at the routine for generating display data of topic word graph 3444, it is determined whether or not topic words are marked, and if marked, the emphasis color (CFM1) preset in the topic word graph mapping data preparation parameter 344212 (FIG. 20) is used for the frame lines, the topic words thereby emphasized are emphatically displayed.

Selection button (B42) is a function to set all the marked topic words at selection state. If the mark intensity is 0, the selection flag is 0; otherwise, the selection flag is 1. Fc is set at 1.

Clear (right) button (B43) is for clearing the marks attached to the topic word. More specifically, the mark intensity columns in the topic word storage area 34425 are set at 0. Fc is set at 1.

The unselect (right) button (B23) works to wholly release the selection states of topic words. More specifically, the selection flag columns in the topic word storage area 34425 are all set at 0. Fc is set at 1.

Propagate button (B21) is a function to add all topic words linked through one link path from the already selected topic words to selection state. Among the individual topic words in the topic word storage area 34425, a topic word as a linking partner and a linking source of each topic word at selection state should be identified, with reference to the between-topic word linking information storage area 34426 (FIG. 15), and then, these topic words are all put at selection state. Fc is set at 1.

Quit button (B04) is for terminating the present retrieval assisting interface.

DB selection means (M1) works to select the data base as a search subject, wherein the names of the DB usable are proposed in a menu form to select a search subject therefrom. When the selection menu is displayed on the DB selection means and any one thereof is clicked, the designated data base is selected as a search subject.

Description as to the associative search button (TB1), clear button (TB2) and quit button (TB3) of the text input means 322T will be given, with reference to FIG. 36 below.

Hereinafter, it will be described how image display changes when various operations are executed by using the present retrieval assisting interface 322. Because the processes which are conducted then at the retrieval assisting routine 3441 is already present in the descriptions of FIG. 5, FIGS. 19A through 19C, FIGS. 21A through 21C, FIGS. 23 A through 23C to FIGS. 26A and 26B, only brief description thereof will be given herein.

Figure 27:
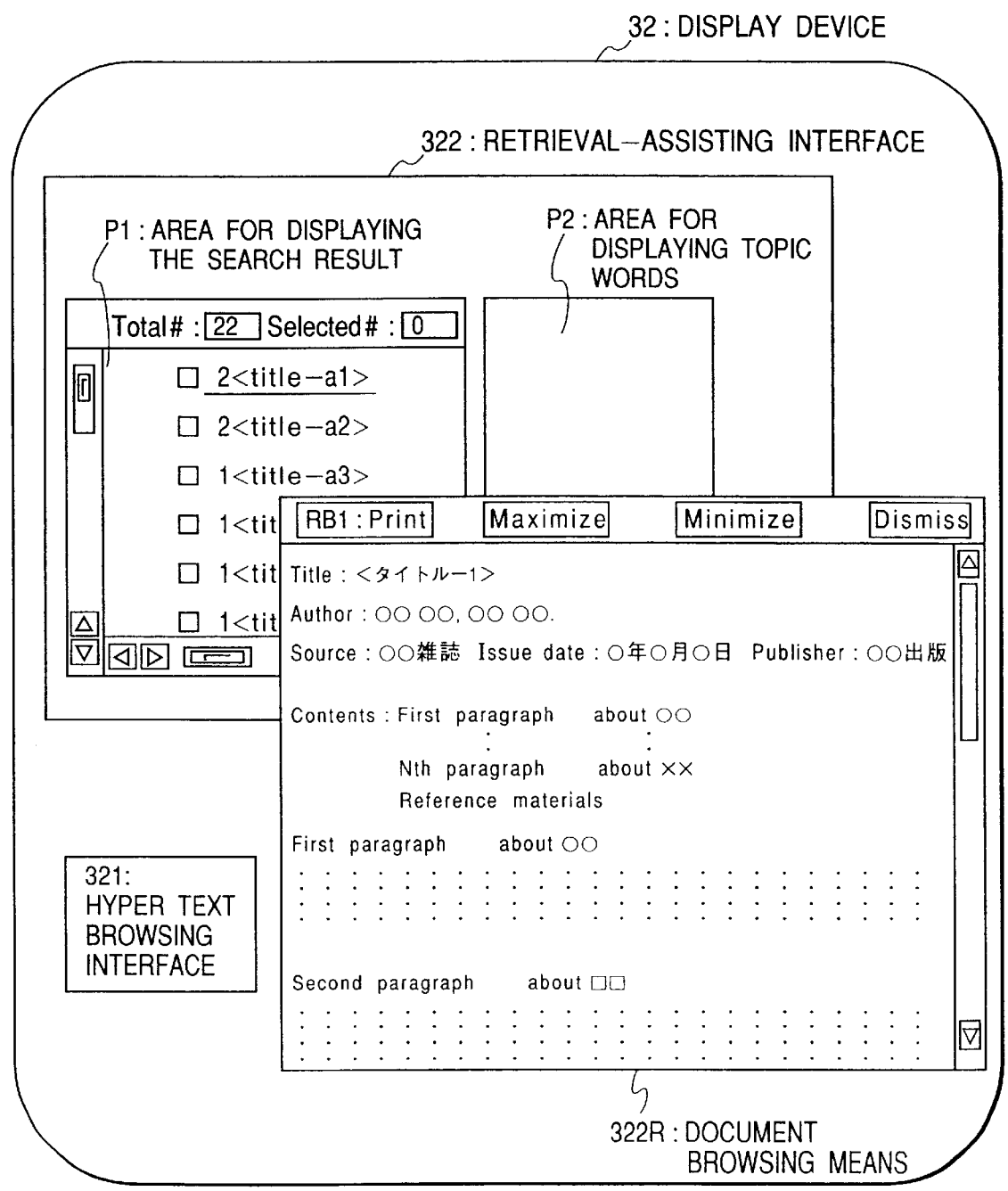
FIG. 27 is a view representing an example of the displayed image when documents as search results are examined one by one.

FIG. 27 is an example of the displayed image when documents as search results are browsed one by one. When search operation (key word search or associative search) is effected, the title list of search results, etc. are displayed on the search results display area P1 of the retrieval assisting interface 322. By clicking an interesting title part, a user can display and read the contents of the designated document.

The operation of the retrieval assisting routine 3441 then is as follows. At the time when mouse is pushed, the process 3441MP-P1-4 (FIG. 23B) is performed, to set the mode variable MM of the retrieval assisting routine 3441 at the mode (=12) during the designation of display document, and when mouse is released, the process 3441MR-P1-2 (FIG. 25B) is executed to open document browsing means 322R, if not yet opened, to receive the contents of the corresponding document from information provider side retrieval assisting program 143 and display the contents on the document browsing means 322R.

At the process 3441MR-P1-2, herein, the document identification number displayed on the retrieval browsing means 322R is substituted with variable MD showing the identification number of the document on display, and the background color of the title of the document on display is displayed with a color different from the surrounding colors to make the title distinctive at the title imaging data preparation routine 34437 (FIGS. 19A through 19C) of the routine for generating display data of the search result 3443. In the present FIG. 27, the title part is underlined for such distinction.

If another title is clicked, the contents of the corresponding document are newly displayed on the same document browsing means 322R. By repeating the operation, a user can read each document with desirable contents from the search results. If printing button RB1 is pushed, additionally, the contents thereof can be printed out on printing means 36 (FIG. 1).

Figure 28A:
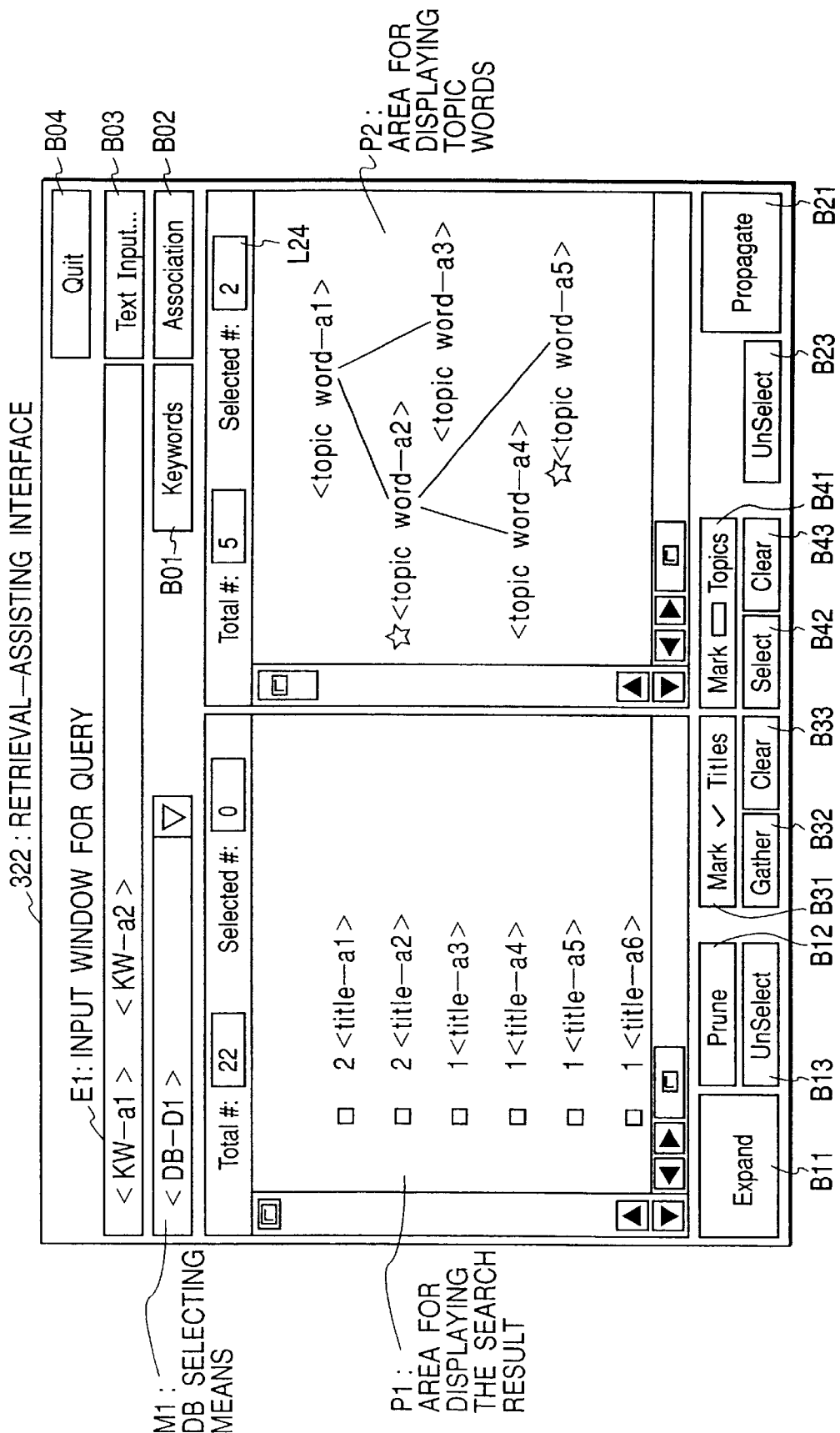
FIGS. 28A through 28C are views representing examples as to how the interface image changes when titles are marked by selecting topic words.
Figure 28B:
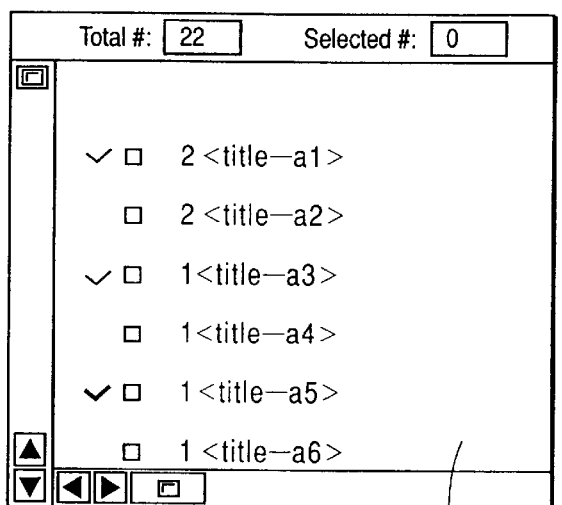
Figure 28C:
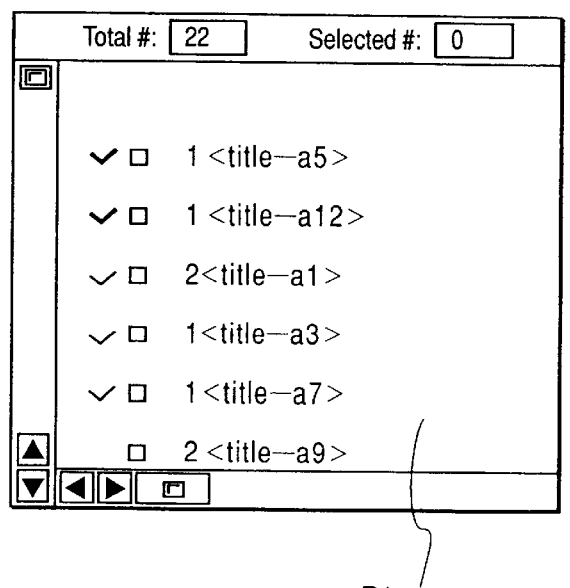

FIGS. 28A through 28C are views depicting the changes of an interface image during the marking operation of titles through topic word selection. FIG. 28A depicts the selection state by clicking sequentially <topic word-a2> and <topic word-a5> as interesting topic words with left mouse, while pushing shift key at the state after the key word search (FIG. 6). The selected topic words after modification with distinctive background color or with distinctive font are shown, but in the present figure, such modification is shown with asterisk symbol ☆ attached to the top of the selected topic words.

When topic words are clicked with left mouse while pushing shift key, operation 3441MP-P2-1 (FIG. 23C) is conducted at the retrieval assisting routine 3441, to toggle the selection/non-selection of a topic word at the pushed position (no influence on the selection/non-selection of other topic words), and accordingly, herein, sequentially clicked topic words are changed to selection state. (Operation 3441MP-P2-2 is effected with the same operation of sequential clicking with left mouse with no pushing of shift key, and in this case, the topic word firstly at selection state turns unselect if a second clicking is executed. Therefore, clicking is necessarily accompanied with pushing of shift key, if desiring that a plurality of topic words be put at selection state by each clicking.) It is needless to say that the setting for clicking under pushing of shift key and for clicking without any shift key pushing is a simple provision, and therefore, the reverse setting may also be possible. The same is true with right and left mouse operation. A method for collectively putting a plurality of topic words at selection state is described hereinafter in the description of FIGS. 29A and 29B hereinafter.

FIG. 28B depicts the change of the search results display area P1 when mark title button (B31) is pushed from the state FIG. 28A. When the mark title button is pushed, the process 3441MR-B31 (FIG. 26A) is executed to make distinctive each document in the search results containing the selected topic words. In the present example, marks such as check mark are attached to the left ends of the titles for distinction. If a plurality of topic words are selected, furthermore, marks with a broadness in proportion to the number of the types of the topic words contained in documents are attached to the documents.

It is indicated that <topic word-a2> currently selected from the data of the topic word/document corresponding table storage area 34427 (FIG. 16) is contained in temporary document numbers 1, 3, 5, - - - , and that <topic word-a5> currently selected is included in temporary document numbers 5, 7, 9, - - - . Based on these, the mark intensity column of the topic word storage area 34425 (FIG. 14) is defined as 1 in the temporary document numbers 1 and 3 while the column is defined as 2 in the temporary document number 5.

Because the update flag of search results imaging Fr is on, search results imaging data is updated at the retrieval assisting routine 3441 (FIG. 5). At the mark imaging data preparation routine 34434 (FIG. 19B) of routine for generating display data of the search result 3443, the data for imaging a mark with a broadness, depending on the mark intensity, is added to the search results display area imaging data 34422P1 (FIG. 7). At the imaging operation 34414 (FIG. 5) of the retrieval assisting interface image, therefore, a mark with a broadness, depending on the mark intensity, is displayed on the side of the title of each document. The present FIG. 28B depicts the imaged state then. The documents with temporary document numbers 1 and 3 are attached with a relatively thin check mark (mark intensity 1) containing only <topic word-a2> and the document with temporary document number 5 is attached with a broad check mark (mark intensity 2) containing both <topic word-a2> and <topic word-a5>.

FIG. 28C depicts the state of the search results display area P1 when sort button (B32) is further clicked from the state 28B. The sort button (B32) rearranges the documents of search results in the decreasing order of mark intensity attached to the search results. Conveniently, a user can thereby browse documents more intensely marked in sequence. In the case of the example, <title-a5> and <title-a12> are at the top because of the mark intensity of 2. Then, <ttitle-a1>, <title-a3> and the like follow due to the mark intensity of 1. If the mark intensities are equal, the original order is stored. For the operation of the retrieval assisting routine 3441 at that time, see the description of the sort buttonB32 in FIG. 26A.

Figure 29A:
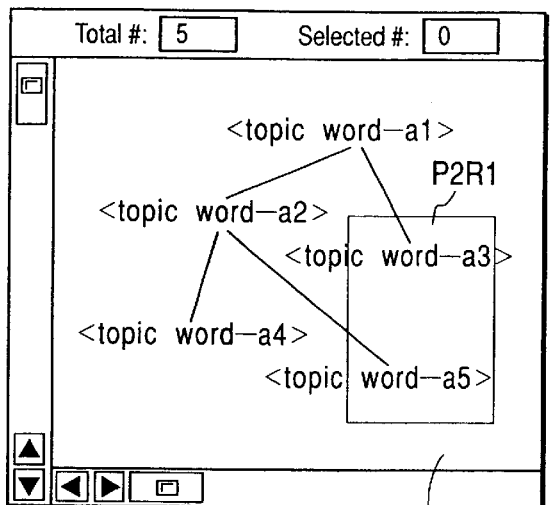
FIGS. 29A and 29B are views representing examples as to how the interface image changes when topic words are selected for graphic expression of the topic words.
Figure 29B:
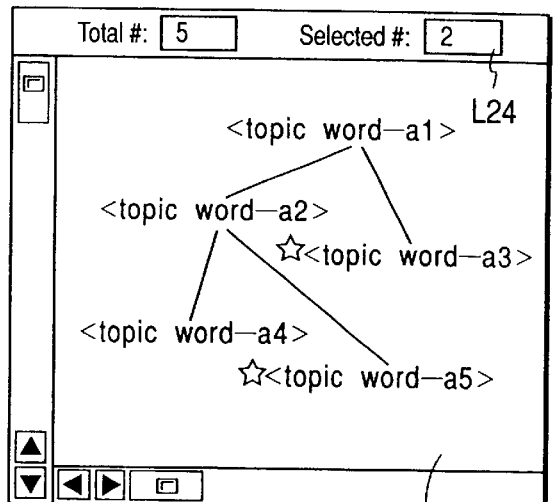

FIGS. 29A and 29B are views depicting examples of the change of the interface image when topic words are in the course of another selecting operation. As described above, a selection method of a plurality of topic words is illustrated, comprising designating topic words, one by one, with left mouse under pushing of shift key. For the present retrieval assisting method, a method utilizing a topic word selection region is proposed as a method for collectively selecting a plurality of topic words at relatively close positions. Rectangle P2R1 shown in the topic word display area P2 in FIG. 29A is an example of the topic word selection region. The topic word selection region can be designated, by pushing a mouse button at a base point with no topic word display and then releasing at any area. During the course of pushing and moving mouse, furthermore, a rectangle with diagonal angles lying on the start point and end point is displayed, following the move of the mouse. (See the descriptions of FIG. 23C and FIG. 24.) The figure depicts the state wherein mouse is pushed on the left top of the rectangle P2R1 to move the mouse under pushing to the right bottom point of the rectangle. When mouse is released at that state, all the topic words with overlap with the topic word selection region are selected, so that the state as shown in the FIG. 29B is brought about (see the process 3441MR-P2-2 of FIG. 25C). In this case, more specifically, the <topic word-a3> and <topic word-a5> are selected because these two have overlap with the topic word selection region P2R1 (as shown with symbol ☆). The selection number display area L24 lies on the upper part of the topic word display area, and 2 as the current selection number is placed on the part L24. While watching the rectangle region, a user can release mouse at a position covering a topic word group desirable to be selected, as just as possible.

Since all the topic words with no overlap with the selection region are set to non selection, at the state 29B, <topic word-a2> falls into non-selection state even if the <topic word-a2> for example is at selection state, at the state FIG. 29A. When selection desirable topic words are in dividend forms of some groups, an operation to preset a topic word selection region under pushing of shift key is satisfactorily repeated. In this case, the process 3441MR-P2-21 (FIG. 25C) does not influence the unselect area, so the selection region can sequentially be increased.

Figure 30A:
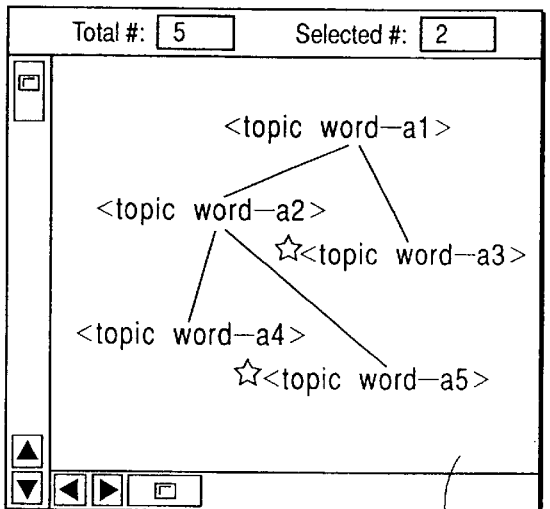
FIGS. 30A and 30B are views representing examples as to how the interface image changes when topic words are moved for graphic expression of the topic words.
Figure 30B:
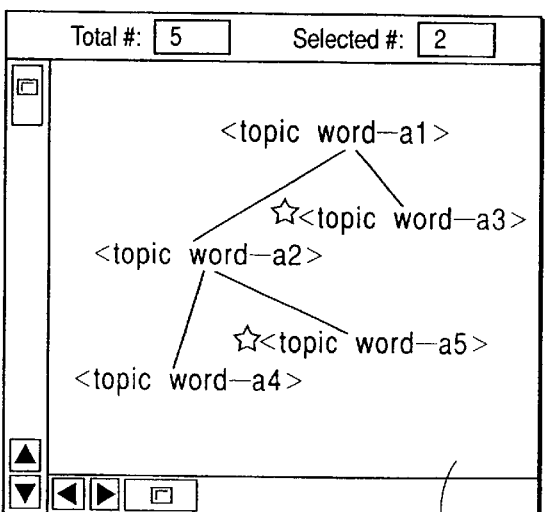

FIGS. 30A and 30B are views depicting examples of the change of the interface image when topic words are moved for graphic display thereof. In the example of the figure, the move may specifically be required, but many topic words once displayed may sometimes cause a display jam such that they overlap and are accordingly hardly visible. In such case, sometimes, the selected topic words are desirably moved to more readily visible positions. In that case, any one of the selected topic words is pushed with left mouse under move while being pushed, and then, the selected topic words are collectively moved in parallel, following the mouse move. (Links also move following the move.) This is because when mouse is pushed on a topic word at selection state just immediately thereafter, the topic word move mode (MM=21) is set at on. Since the update flag of topic word imaging Fc is generally on at the process 3441-MD2 (FIG. 24) during the following move of mouse under pushing, the routine for generating display data of topic word graph 3444 (FIGS. 21A through 21C) functions without exception, so that the positions of the topic words shift by the move of mouse, following the move. When mouse is released, a new display position of each moved topic word is defined at the position of the topic word when mouse is released.

When a topic word selected is pushed with left mouse while pushing shift key in the same circumstance as in FIG. 30A, the pushed topic word just falls into non-selection state, so no move occurs even if mouse is operated. If a word not selected, such as <topic word-a2> is pushed with left mouse while pushing shift key with left mouse, the <topic word-a2> is added to selection state, while other selected words remain at the selected state, so three <topic word-a2, 3, 5> are collectively moved under pushing of mouse. Additionally when <topic word-a2> is alternatively pushed with left mouse without pushing of any shift key, only <topic word-a2> is at selection state while other words are all at non selection state, and therefore, only <topic word-a2> is moved when mouse is pushed.

Figure 31A:
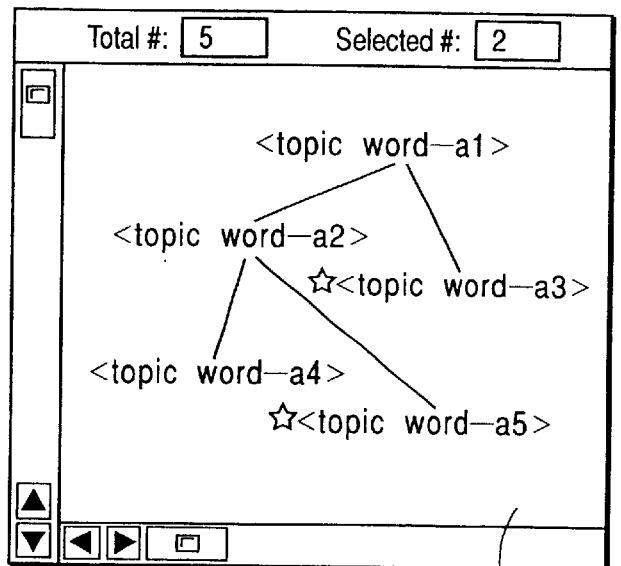
FIGS. 31A through 31C are views representing examples as to how the interface image changes during the operation for utilizing displayed topic words as search words.
Figure 31B:
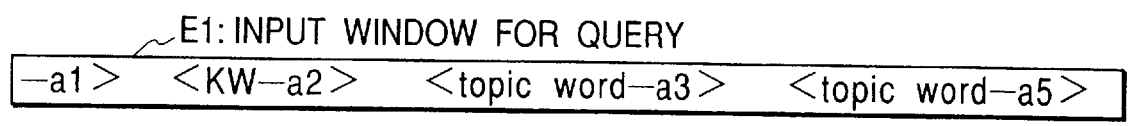
Figure 31C:
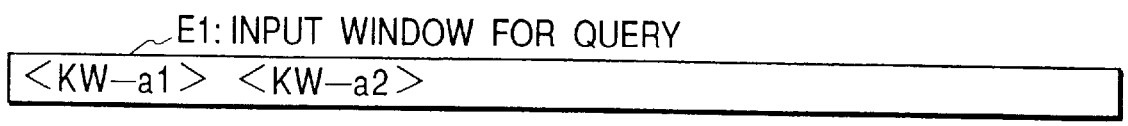
Figure 32A:
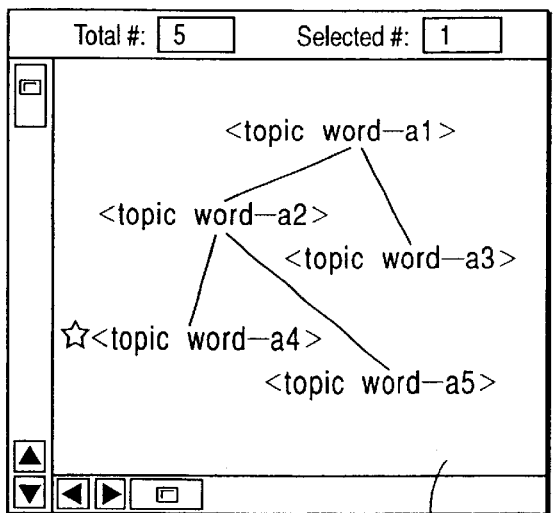
FIGS. 32A through 32D are views representing examples as to how the interface image changes when the function to propagate the selection in graphic expression of topic words is utilized.
Figure 32B:
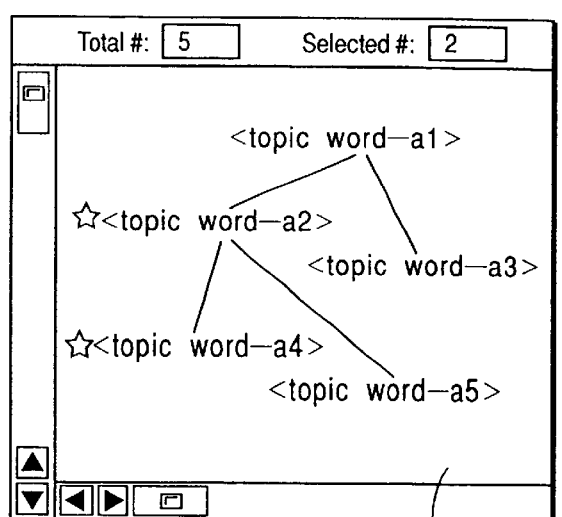
Figure 32C:
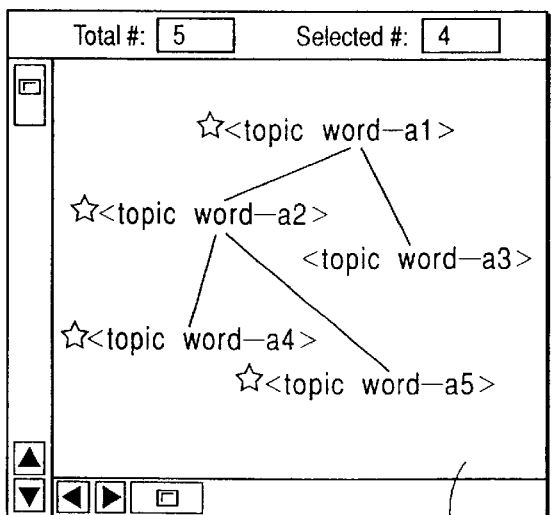
Figure 32D:
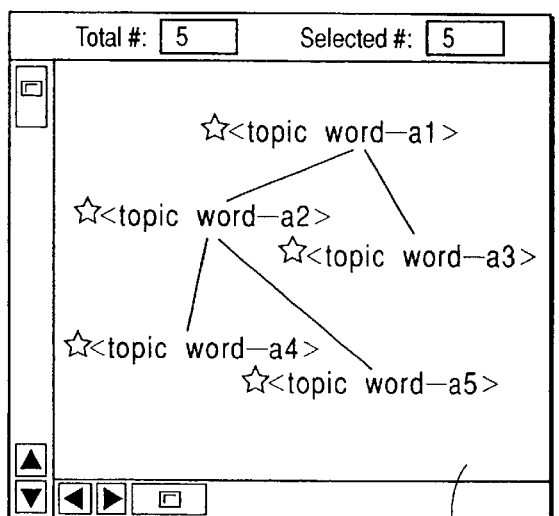

FIGS. 31A through 31C are views depicting examples of the change of the interface image during the operation by utilizing the displayed topic words as search words. Because words better reflecting the characteristics of search results emerge in the topic words, the demand to utilize the words as key words may frequently occur. For such case, the following method is proposed by the present retrieval assisting method. FIG. 31A depicts a view of the currently selected states of <topic word-a3> and <topic word-a5> on the topic word graphs on the topic word display area P2. When either one of them is clicked (with no pushing of shift key) with right mouse, the topic words at selected state (<topic word-a3> and <topic word-a5> in this case) are collectively added to the query input window (E1). This is through the process 3441MR-P2-33 (FIG. 25C).

When <topic word-a3> is continuously clicked with right mouse in a similar fashion by pushing shift key at this time, all words identical as any one of the topic words at selected state are deleted from the query window. Hence, the original state is also recovered in this case. (However, the same one as <topic word-a3> or <topic word-a5> if present in the initial key words is deleted simultaneously, and therefore, in such case, the restoration of the original state is not satisfactorily demonstrated.) This is due to the process 3441MR-P2-31 of FIG. 25C.

When topic words not at selection state, for example <topic word-a2>, are then clicked with right mouse, only the clicked words are added as search words in this case (Process 3441MR-P2-34 of FIG. 25C). By carrying out the same operations while pushing shift key, the same words as <topic word-a2> are deleted from search words (Process 3441MR-P2-32 of FIG. 25C).

FIGS. 32A through 32D are views depicting examples of the change of the interface image when the propagate function of selection for topic word graphic display is utilized. At the state of 32A, only <topic word-a4> is selected. When Propagate button (B21) is pushed at such state, all the topic words linked through one path at most from the selected <topic word-a4> are fallen into selection state. Because only <topic word-a2> can satisfy the condition in this case, <topic word-a2> is changed to selection state, which then falls into the state as shown in 32B. When propagation is continued, the topic word falls into state 32C and then into state 32D after further propagation.

Figure 33A:
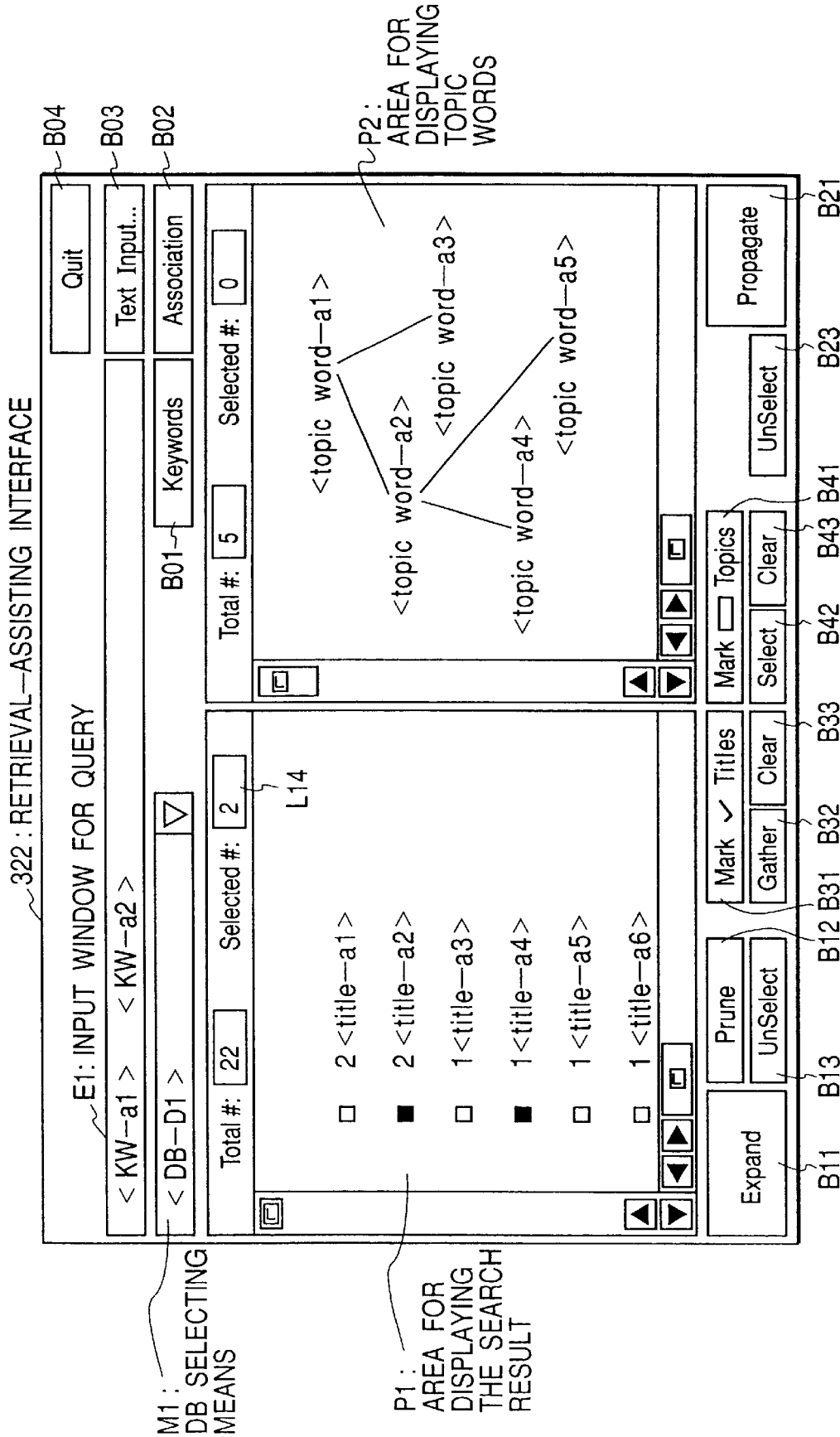

FIGS. 33A through 33C are views depicting examples of the change of the interface image when the marking operation of topic words by selecting retrieved documents is effected. FIG. 33A depicts that, by sequentially clicking the selection windows of <title-a2> and <title-a4> as interesting documents from the state after retrieval (the state of FIG. 6) with mouse, these documents are put at selection state. The selection windows of the selected documents change into distinctive colors. In the present figure, the change is shown by painting the selection windows as black. In the column L14 showing the number of selected documents, the number 2 of currently selected documents is displayed.

When the selection windows are clicked with mouse and just when the mouse is released, the operation 3441MR-P1-1 (FIG. 25B) is conducted, to toggle the selection/non selection of a document at a clicked position. So as to collectively put a plurality of documents continuously positioned, at selection state, mouse is pushed at the selection window of an either end, then dragged to the other end and released there. (Under provision that the document at the start position is originally not selected.) In this case, documents between both the ends are all changed to selection state at the process 3441MR-P1-1 (FIG. 25B).

FIG. 33B depicts the state of the topic word display area P2 when mark topic word button (B41) is pushed from the state FIG. 33A. When the mark topic word button is pushed, the process 3441MR-B41 (FIGS. 26A and 26B) is effected, to make distinctive topic words contained in the selected documents. In the present example, the marked topic words are emphasized by setting the frame line of the topic words to be colored with a distinctive color.

Apparently, document <title-a2> currently selected among the data of the document/topic word corresponding table storage area 34428 (FIG. 17) contains temporary topic word numbers 1, 3, 6, - - - , while document <title-a4> contains temporary word numbers 3, 8, 12, - - - . Based on them, the mark intensity column for the topic word 1 in the search results storage area 34424a (FIG. 13A) is defined as 1 and the column for the topic word 3 is defined as 2.

Because the update flag of topic word imaging Fc is on when the mark topic word button is pushed, the topic word imaging data is updated at the retrieval assisting routine 3441 (FIG. 5). At the topic word node imaging data preparation routine 34447 (FIG. 21C) of the topic word graph mapping data preparation routine, an imaging data to color the frame of the marked topic word in an emphasizing color is added to the topic word display area imaging data 34422P2 (FIG. 8). At the imaging operation 34414 of the retrieval assisting interface image (FIG. 5), the frame line of the marked topic word is imaged with an accent color. The present FIG. 33B depicts the imaging state then, wherein the frame lines of the temporary topic word numbers 1 and 3 are emphasized.

FIG. 33C depicts the state of the topic word display area P2 when selection button (B42) is further clicked from the state FIG. 33B. Because the selection button (B42) works to put collectively the marked topic words at selection state, the marked <topic word-a1> and <topic word-a3> are attached with an asterisk symbol representing that they are at selection state.

Figure 34:
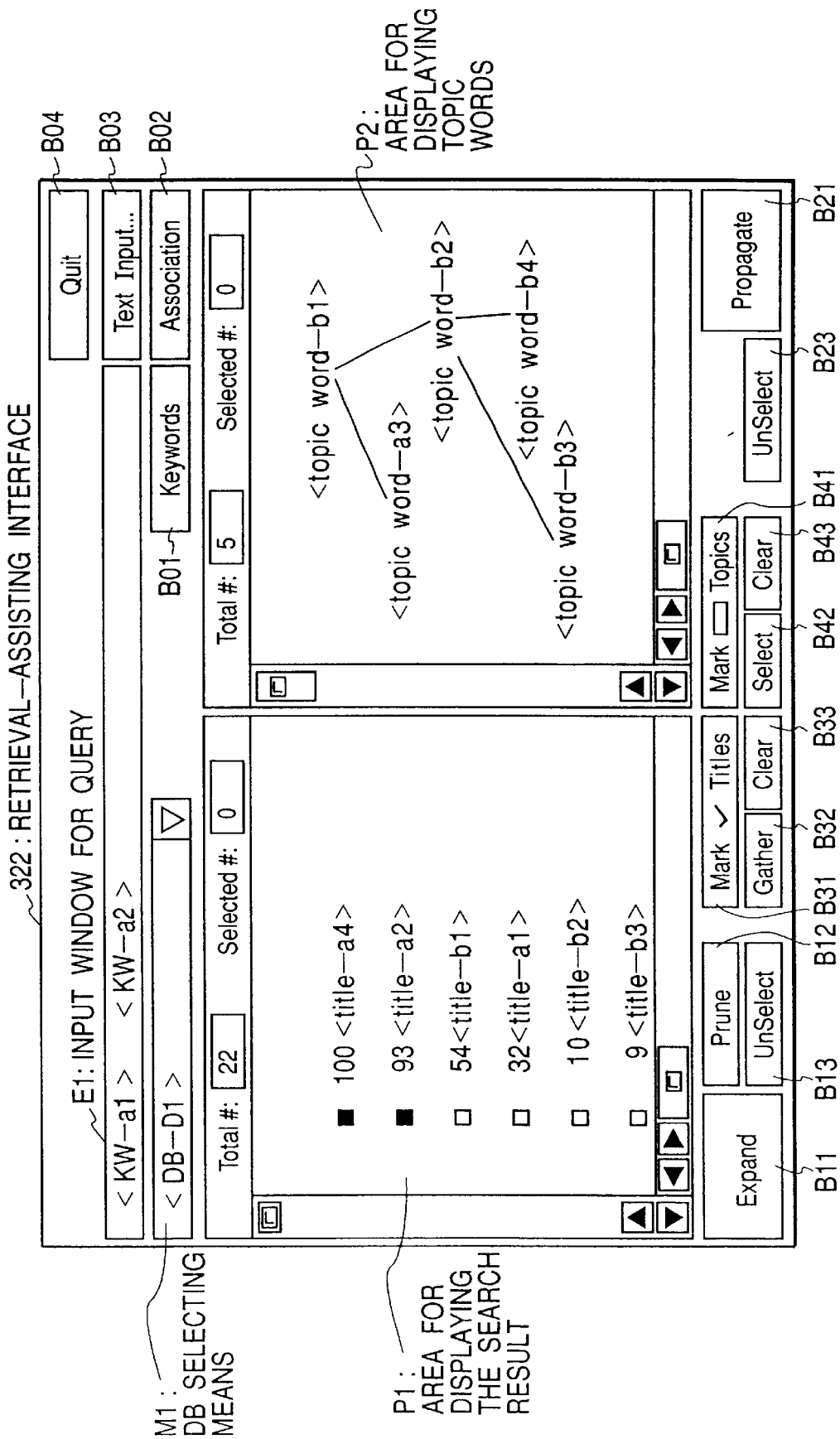
FIG. 34 is a view representing an example of the interface image when associative search is executed.

FIG. 34 is an example of the interface image when associative search is executed by using a selected document as a key. When expand button (B11) is clicked at the state shown in FIG. 33A, namely the selection state of documents <title-a2> and <title-a4>, the query to commit associative search by using the selected documents as keys is sent to an information provider side, so that the results of associative search and the information about the topic words are sent back and displayed on search results display area P1 and topic word display area P2. For associative search, the score indicating the extent how much the search results meet the query is measured on the basis of the similarity to the key documents, and therefore, a normalized value of the similarity is shown in the score display column. Herein, the highest similarity is normalized as 100. Additionally, the search results are sorted in the decreasing order of such score. The graphic display of topic word is the same as the case of key word search. All the operations as described in FIGS. 27 to FIGS. 33A through 33C can be performed for the present figure.

Figure 35:
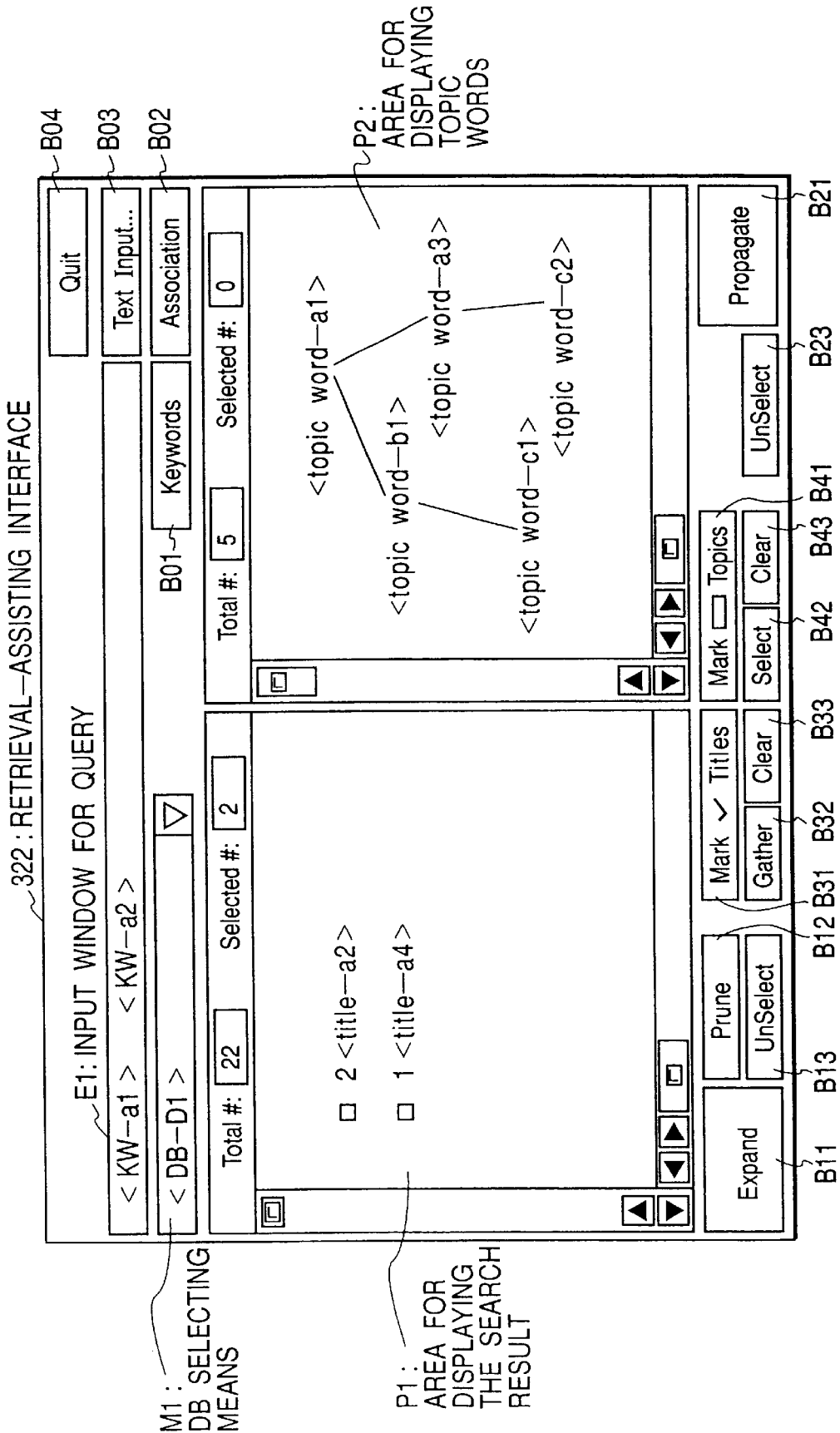
FIG. 35 is a view representing an example of the interface image when search results are pruned.

FIG. 35 is an example of the interface image after pruning for leaving only selected documents and deleting others. When prune button (B12) is clicked from the state of FIG. 33A, namely the selection state of documents <title-a2> and <title-a4>, only the selected documents are defined as search results, and topic word information is extracted only from the selected documents. The present figure depicts the state, wherein only <title-a2> and <title-a4> are left on the search results display area while the results of topic word extraction from these two documents are displayed on the topic word display area P2, and accordingly, a different graph from the topic word graph in FIG. 33A is shown.

Figure 36:
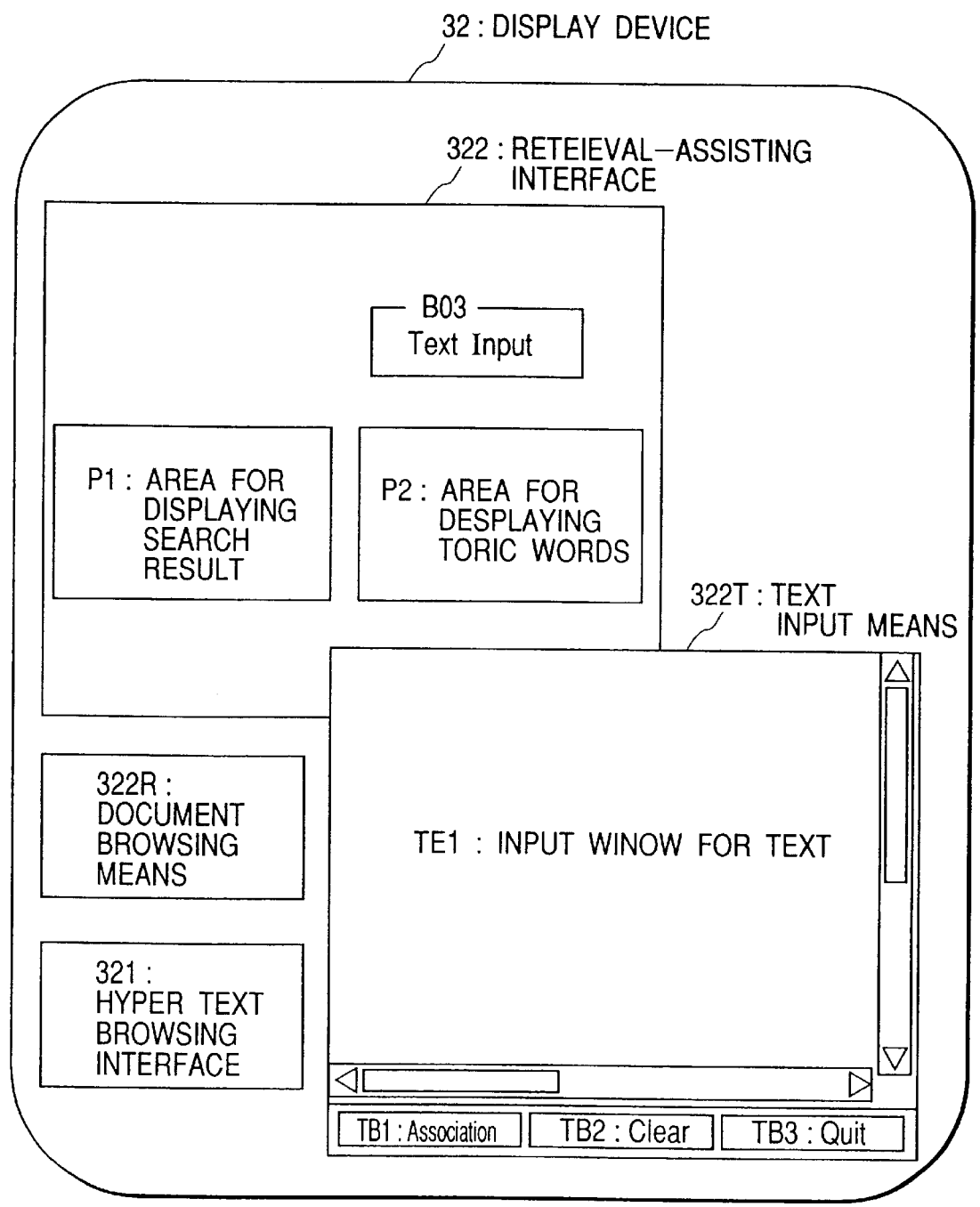
FIG. 36 is a view representing an example of the interface image when a text input means is opened for executing associative search via text input.

FIG. 36 is an example of the display image when the text input means 322T is opened for carrying out associative search by text input. The text input means 322T is for inputting any fragment of the text and retrieving documents similar to the fragment. The text input means is composed of text input part TE1, associative search button TB1, clear button TB2, and quit button TB3. From keyboard and the like, character rows are directly inputted into the text input part TE1, or a part or the whole of other documents are inputted, through cut and paste operation on the display means, into the part TE1. When associative search button TB1 is clicked after termination of text input, a query to carry out associative search by using the input text as a key is sent to an information provider, so that search results and topic word information are sent back. What will be described below is the same with the case when another retrieval is conducted or when expand button is pushed.

Specifically with reference to the interface image when retrieval is executed, then, a very convenient retrieval can be conducted in accordance with the present invention. The example described hereinafter is an example for a user to search patents relevant to "document retrieval interface (文献検索インタフェース)". It is under provision that the user is at a state with some degree of understanding about document retrieval interface but without any established retrieval principle as to on which characteristics of document retrieval interface attention should be focused.

Figure 37:
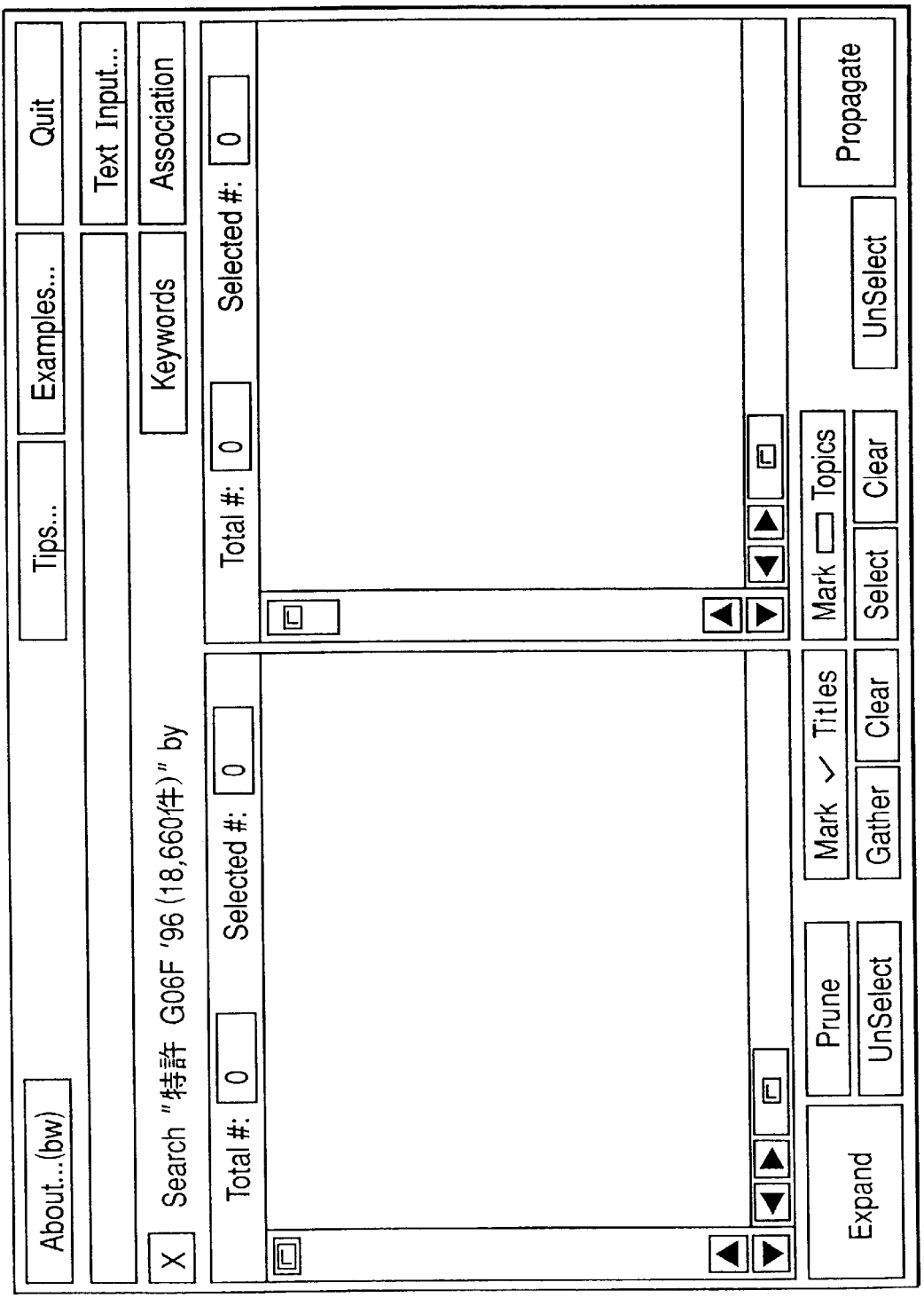
FIG. 37 is an actual view of the interface image adopted for an actual search example.

FIG. 37 is an interface image practically adopted in the present example, depicting such a state that "Patent G 06F'96 (18,660 cases) " is selected as a usable database with no input for retrieval. As apparently shown in a comparative manner with interface images of FIGS. 3 and 6 and the like, the image is substantially the same as the images, except the English representation as well as the three buttons on the left side of the top. Correspondence is illustrated as follows. More specifically, B01: key word search button-Key words, B02: associative search button-Association, B03: text input button-Text Input, B04: quit button-Quit, B11: expand button-Expand, B12: prune button-Prune, B13: unselect (left) button-UnSelect, B21: propagate button-Propagate, B23: unselect (right) button-UnSelect, B31: mark title button-MarkTitle, B32: sort button-Gather, B33: clear (left) button-Clear, B41: mark topic word button-Mark☐Topics, B42: selection button-Select, B43: clear (right) button-Clear.

Figure 38:
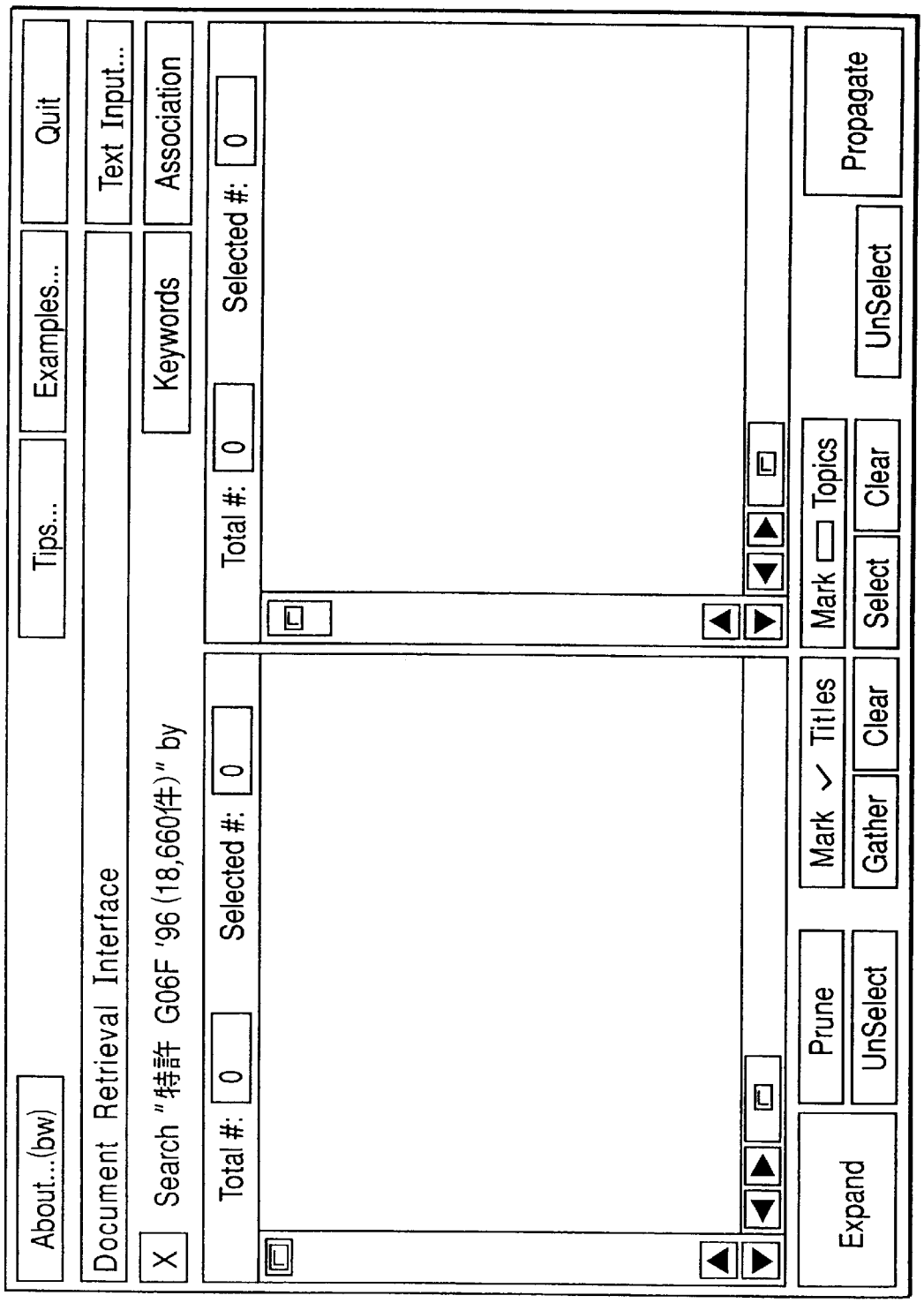
FIG. 38 is a view of the interface image at a state wherein "document retrieval interface (文献検索インタフエース)" is inputted as it is from key word input.
Figure 39:
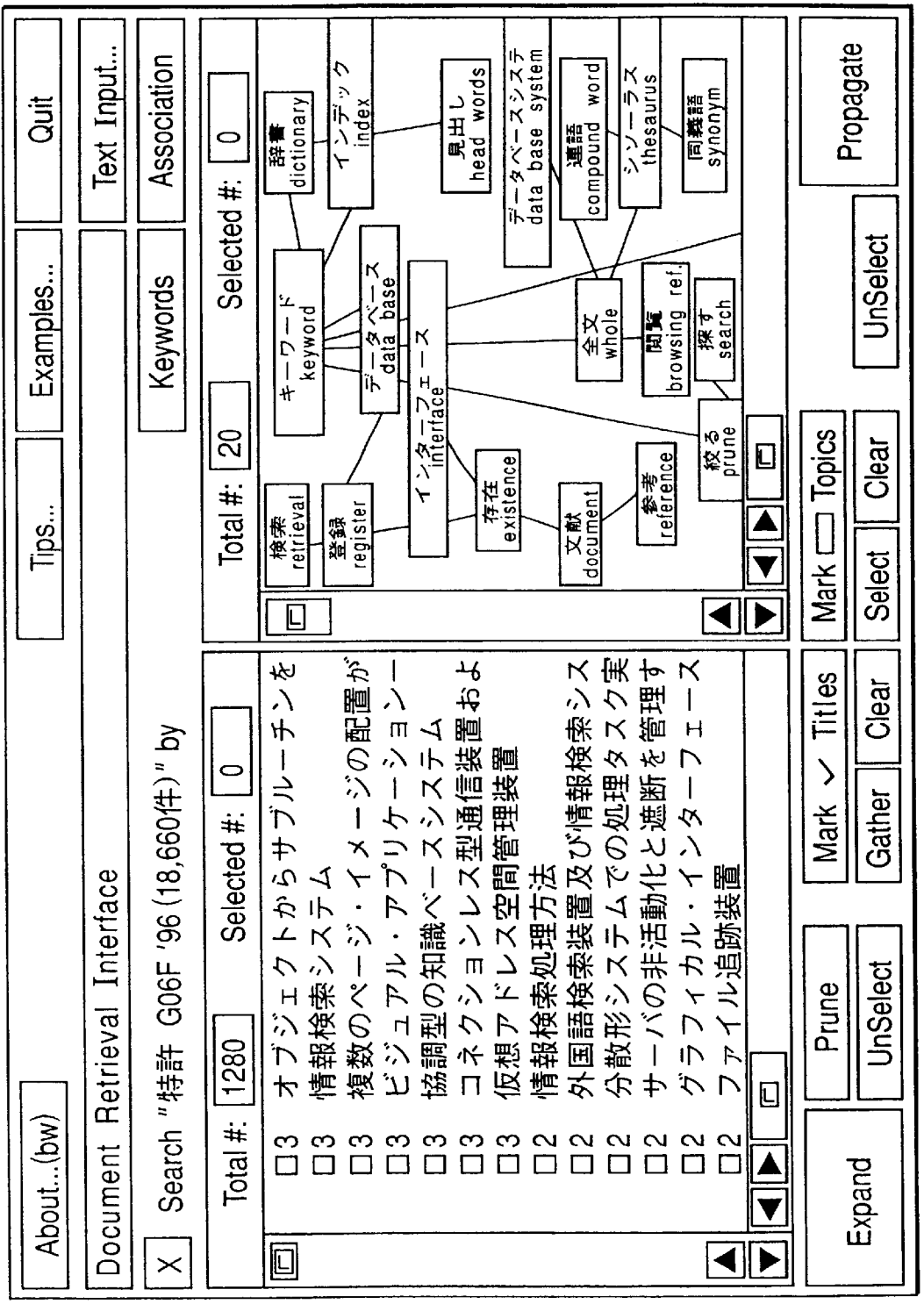
FIG. 39 is a view representing search results after the input character row is decomposed as key words as the consequence of a key word search button pushed.
Figure 40:
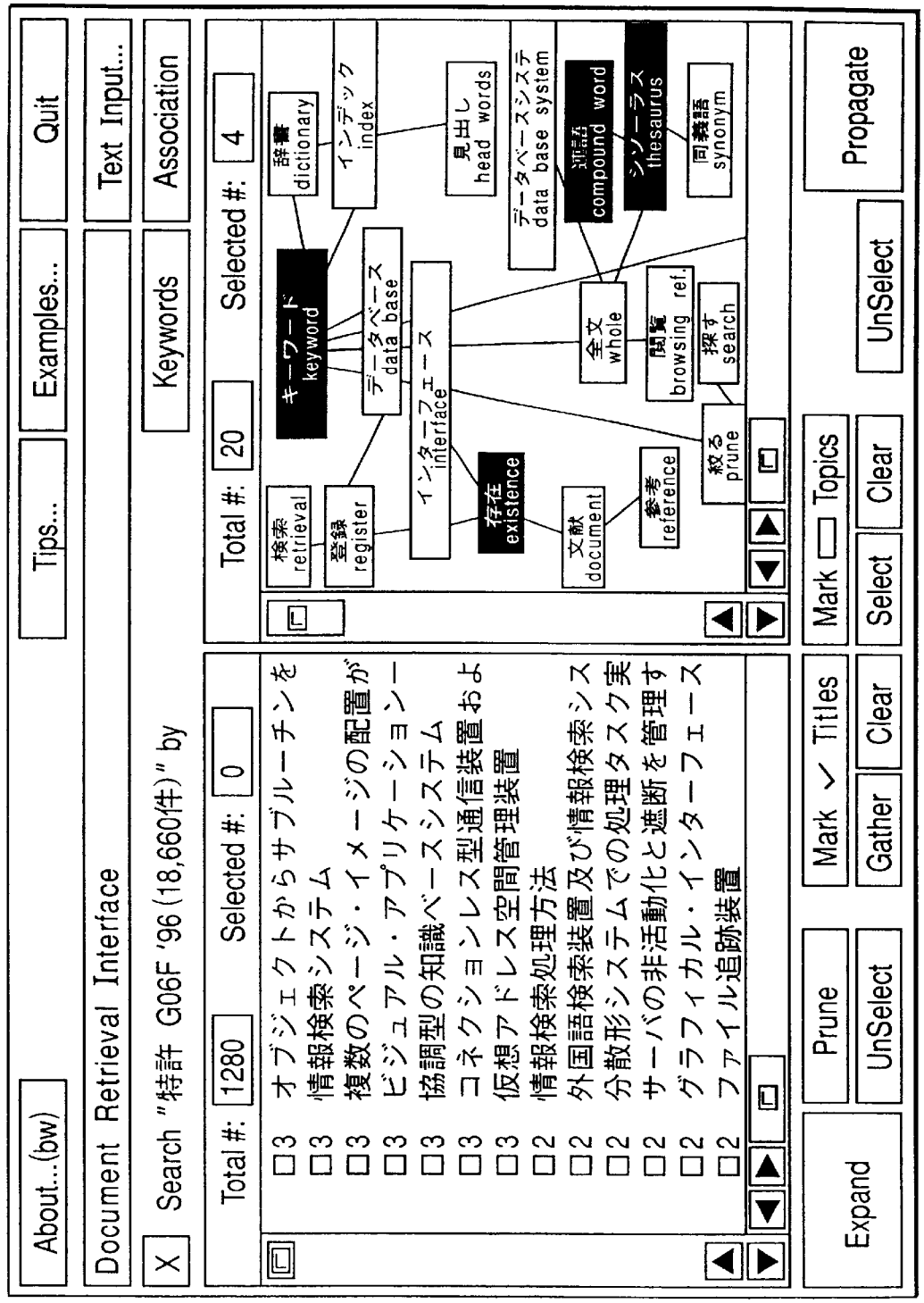
FIG. 40 is a view representing the state of topic words to be selected on the basis of the results of search executed.
Figure 41:
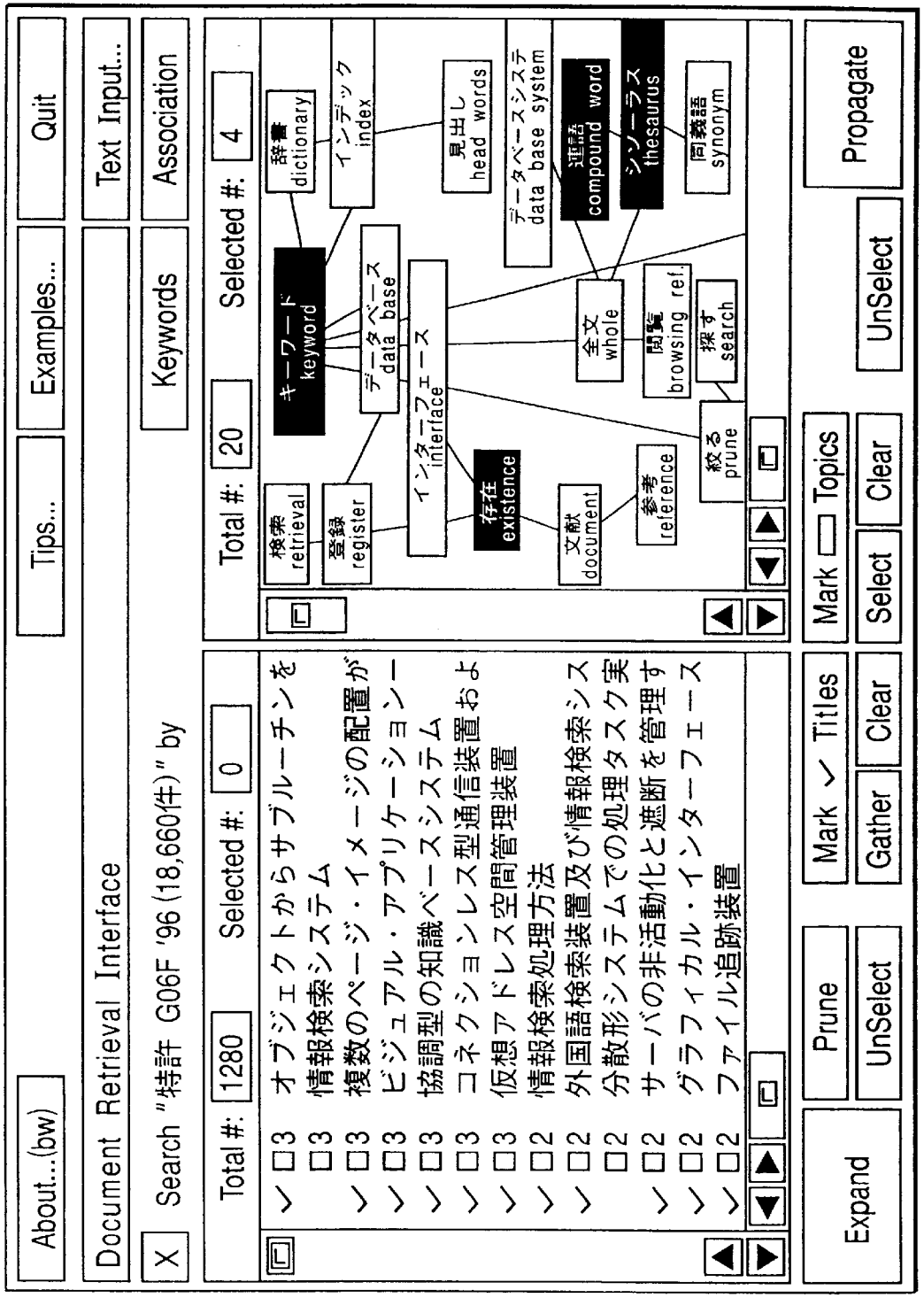
FIG. 41 is a view representing the results of marking of the titles of documents corresponding to selected topic words.
Figure 42:
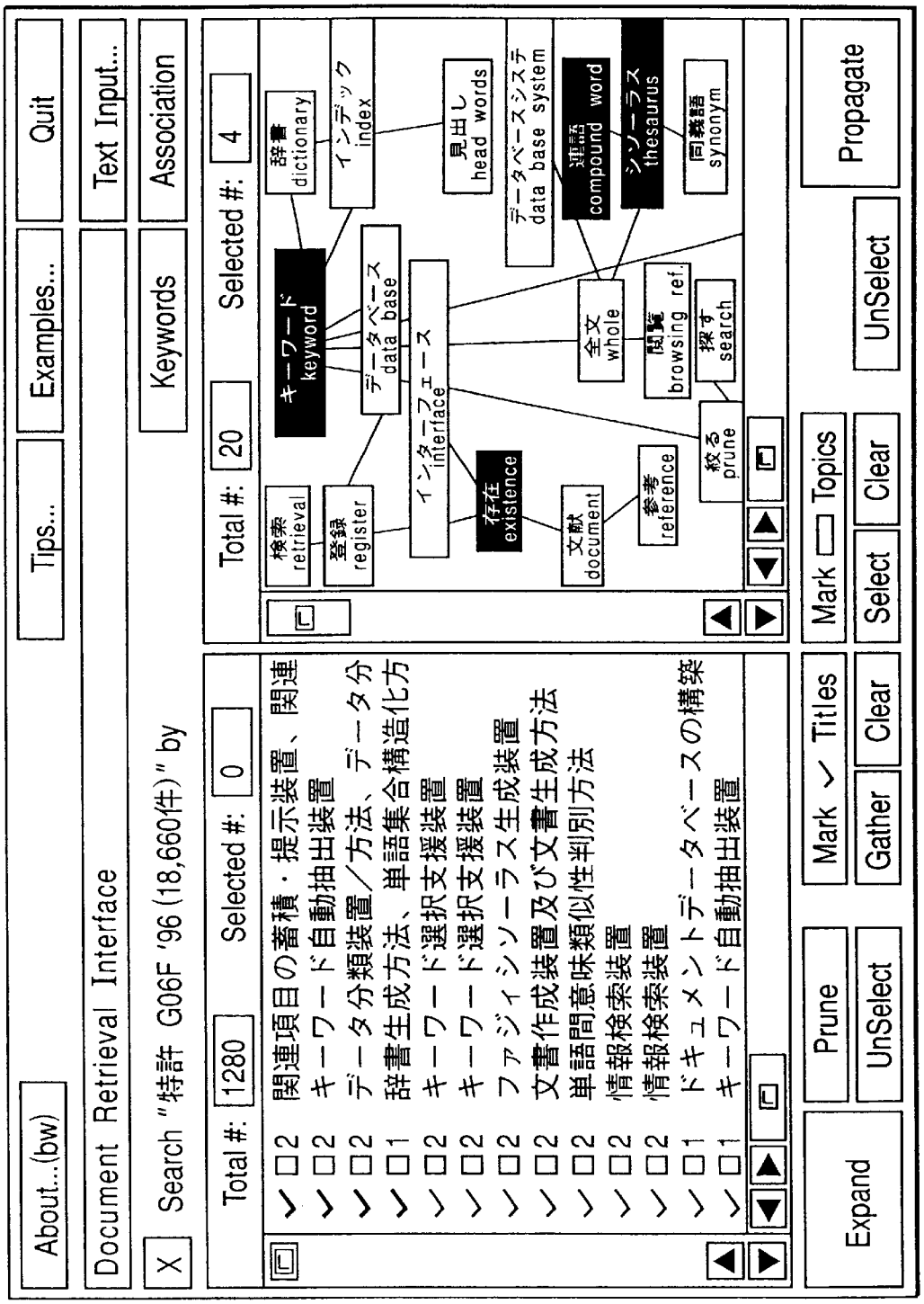
FIG. 42 is a view representing the results of sorting of document lists after marking.
Figure 43:
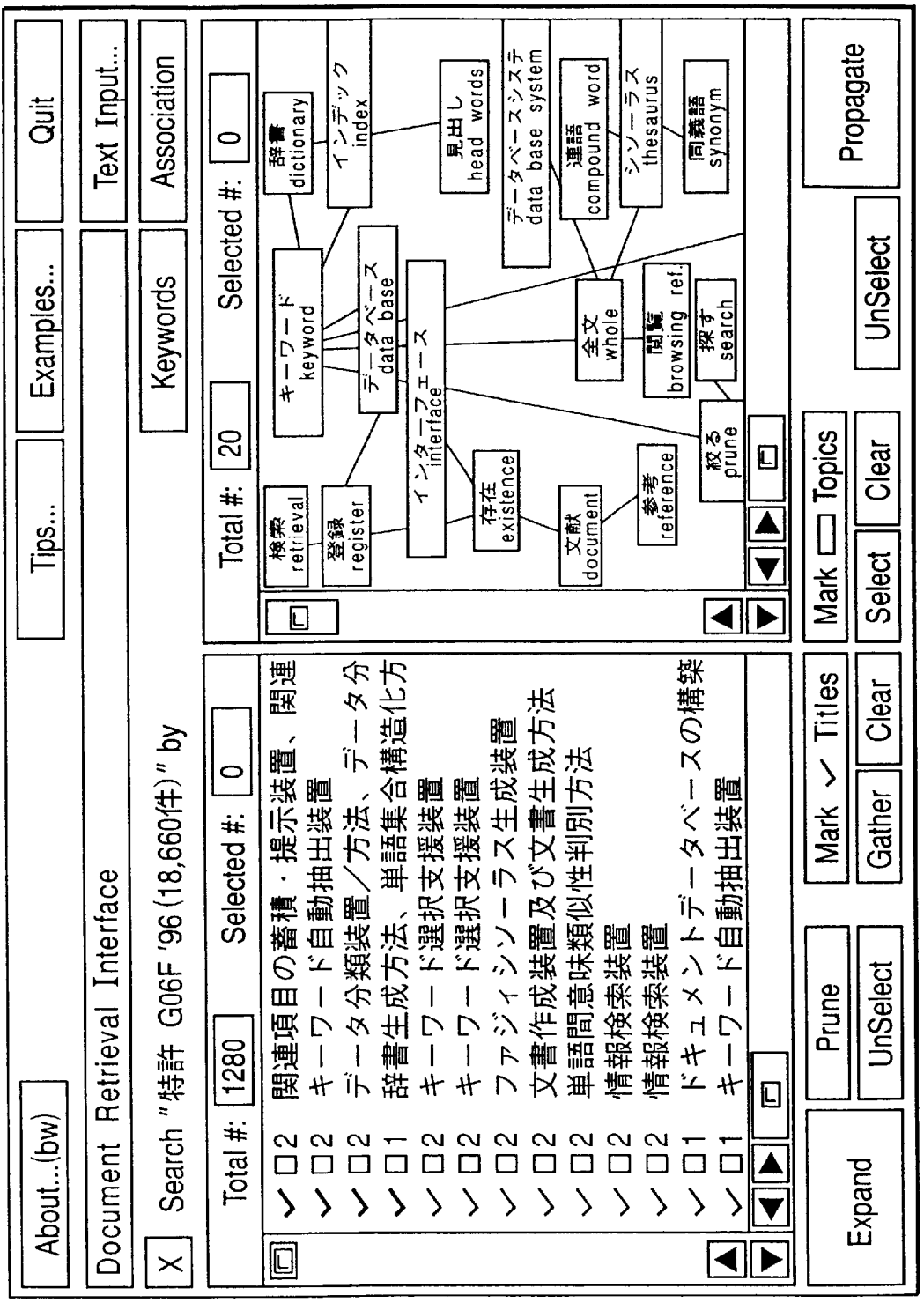
FIG. 43 is a view representing the displayed state of the sorted document lists and the topic words after the nodes are put at unselect state.
Figure 44:
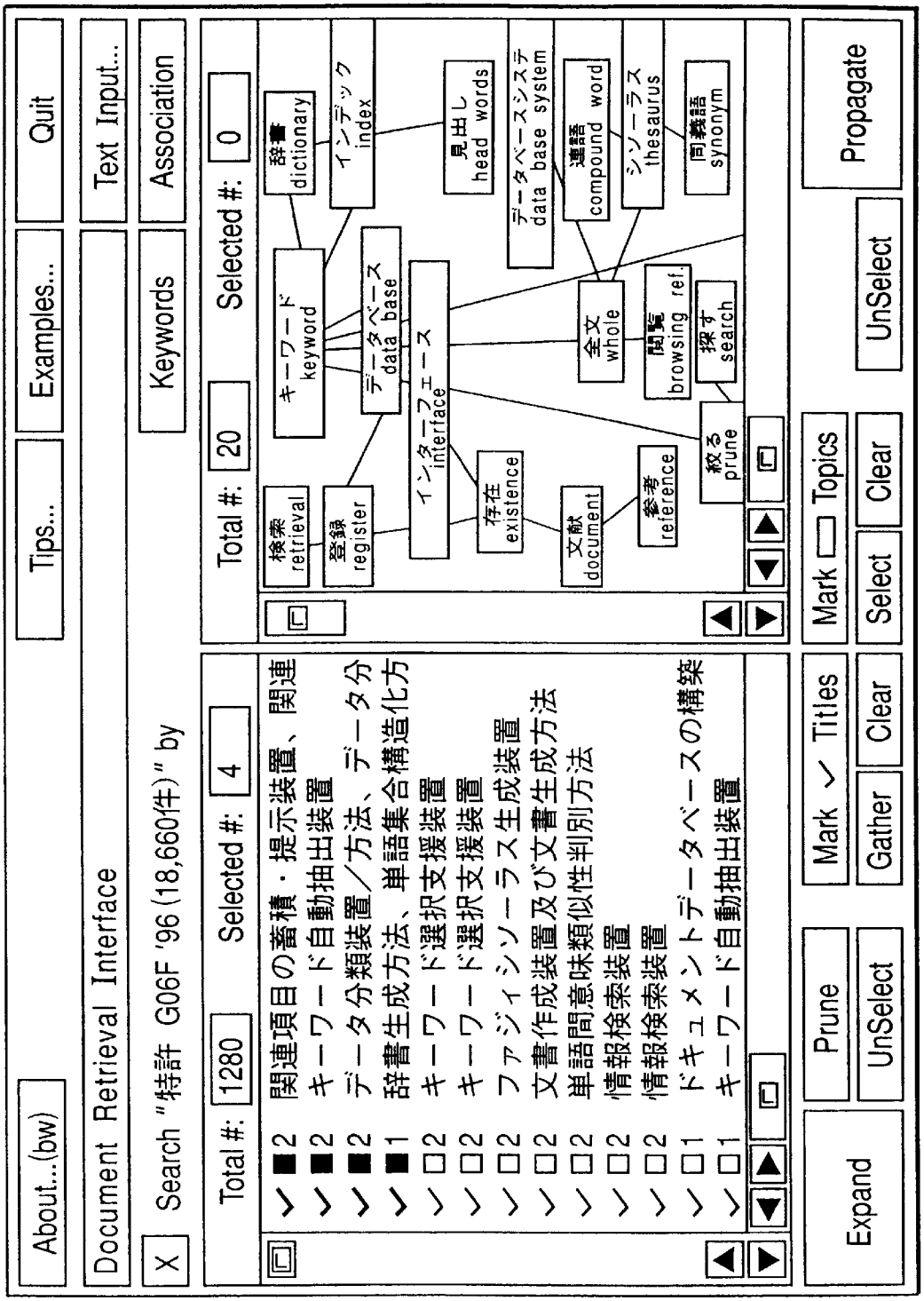
FIG. 44 is a view representing that broadly marked documents are put at selected state by users.
Figure 45:
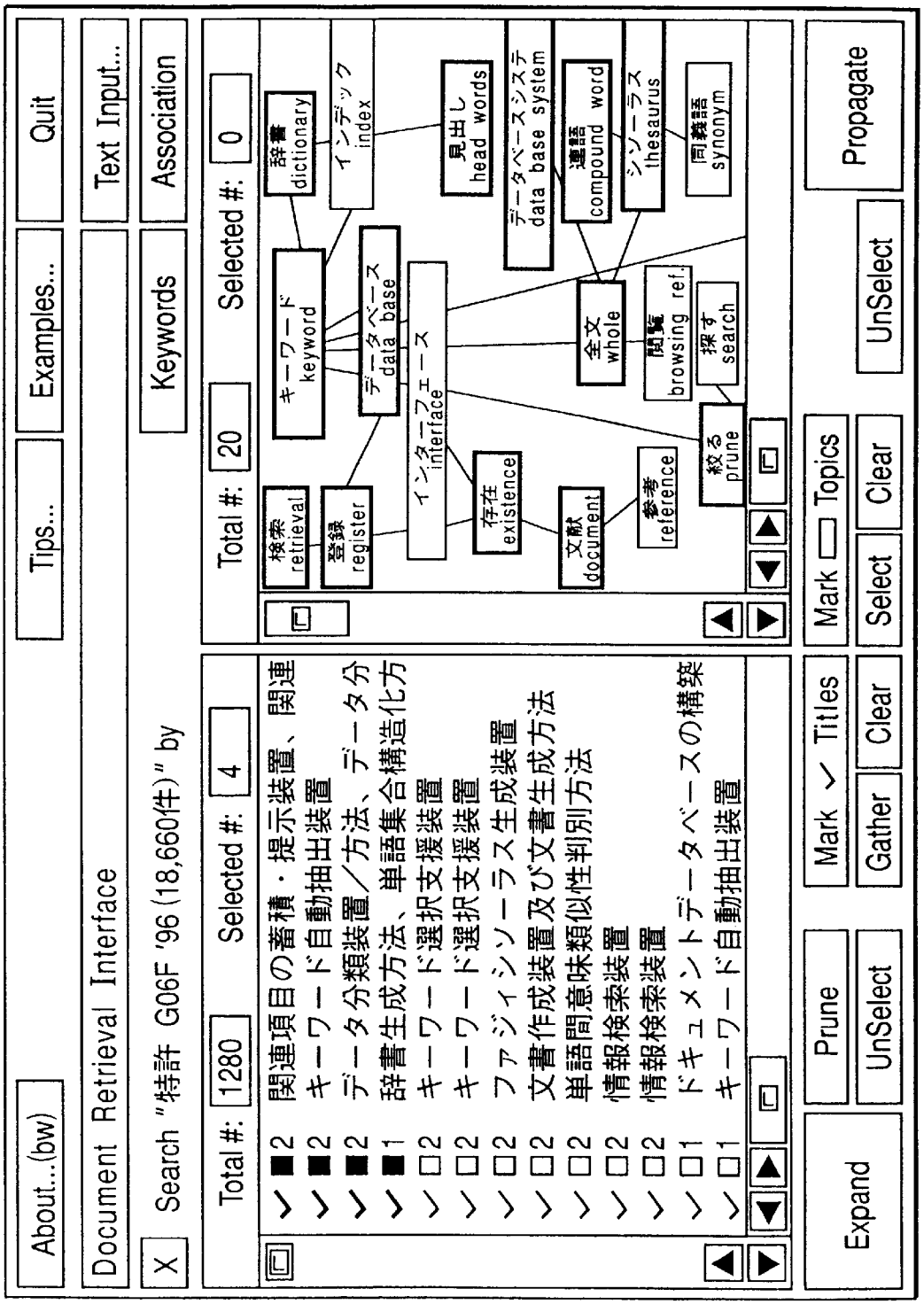
FIG. 45 is a view representing the state of more broadly displayed frames enclosing topic words appearing in the documents at the selected state.
Figure 46:
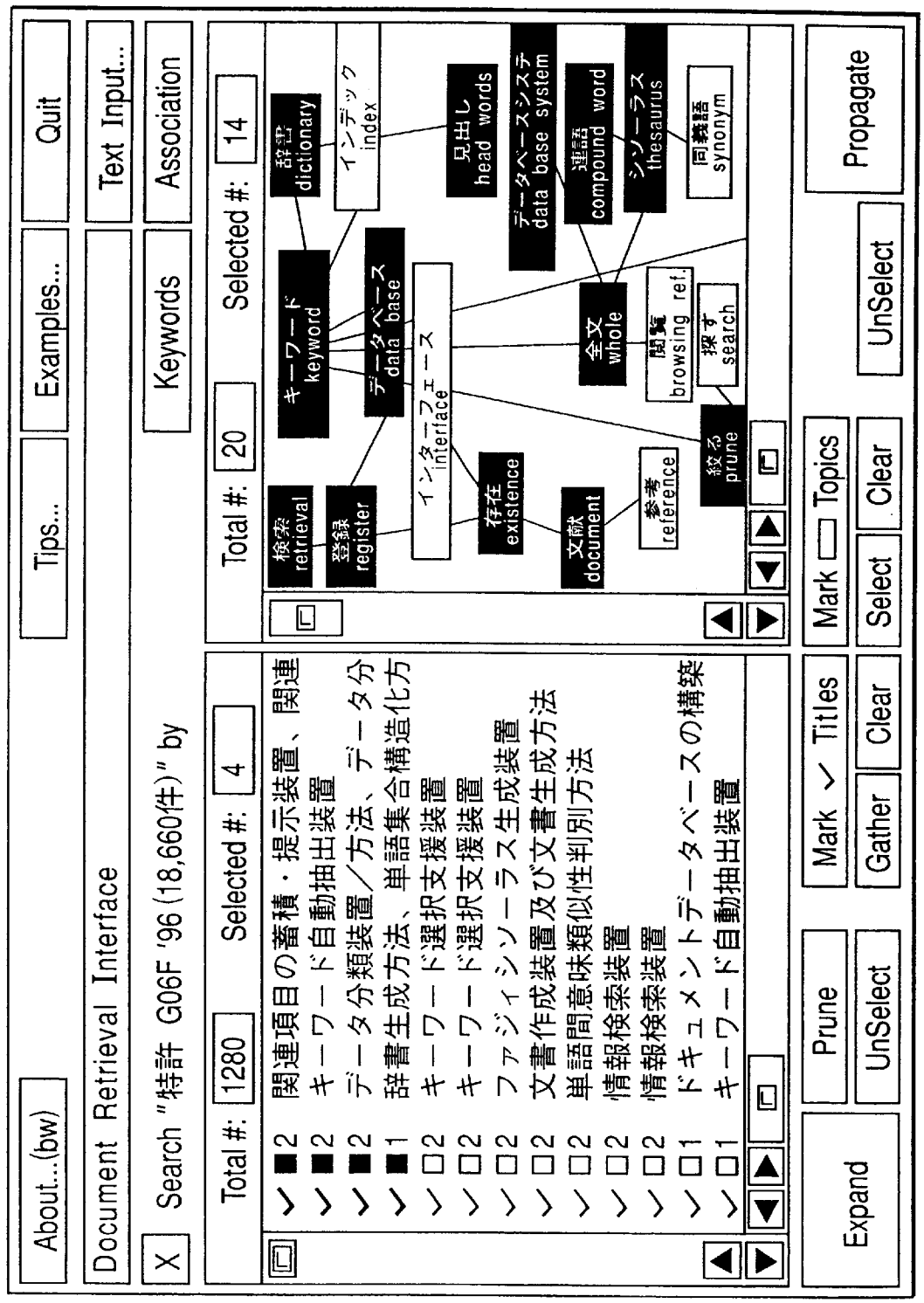
FIG. 46 is a view displaying the selection of the marked topic words.
Figure 47:
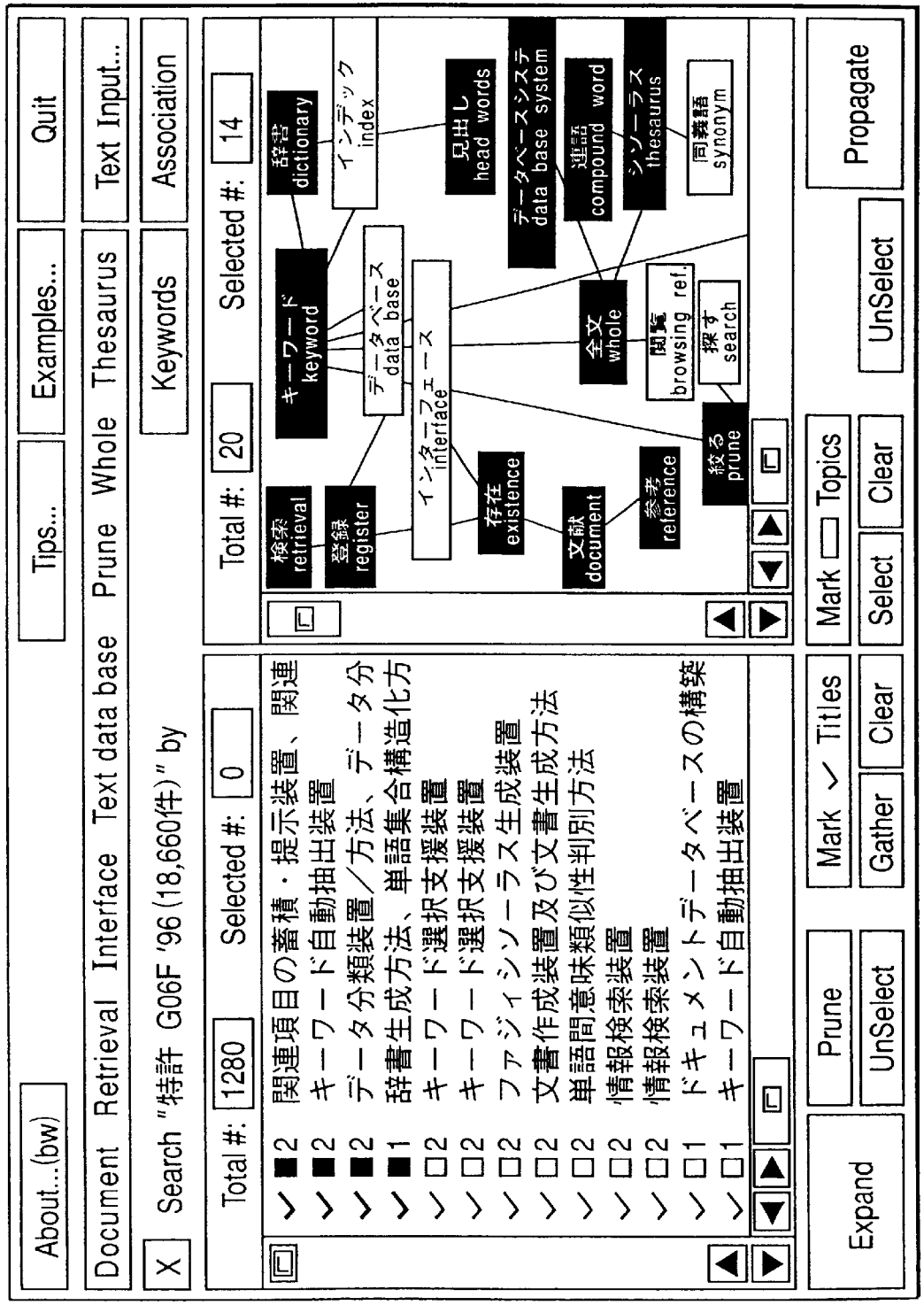
FIG. 47 is a view representing that the execution of retrieval is designated by means of the marked topic words as selection keys.
Figure 48:
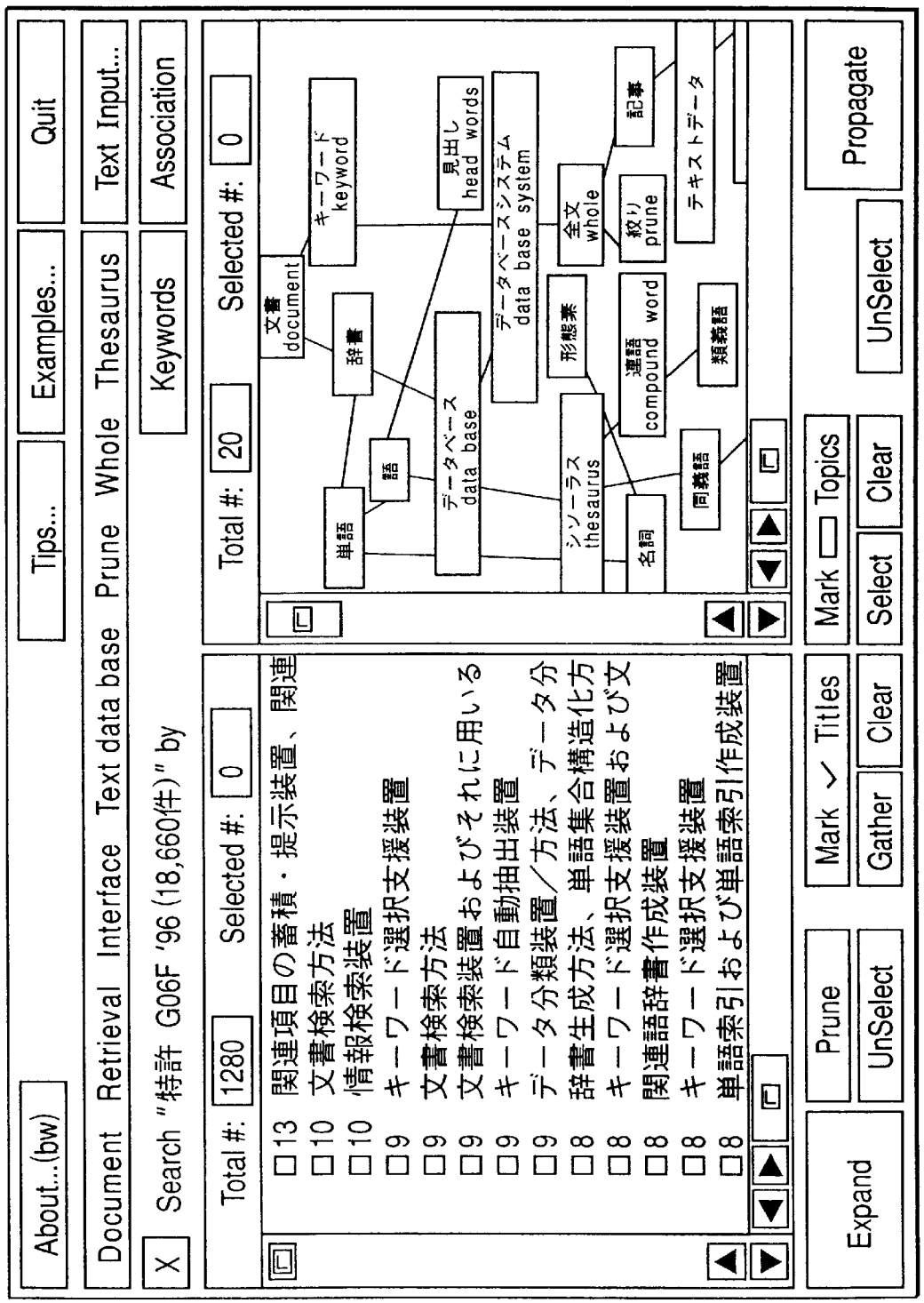
FIG. 48 is a view representing search results corresponding to the new key words.
Figure 49:
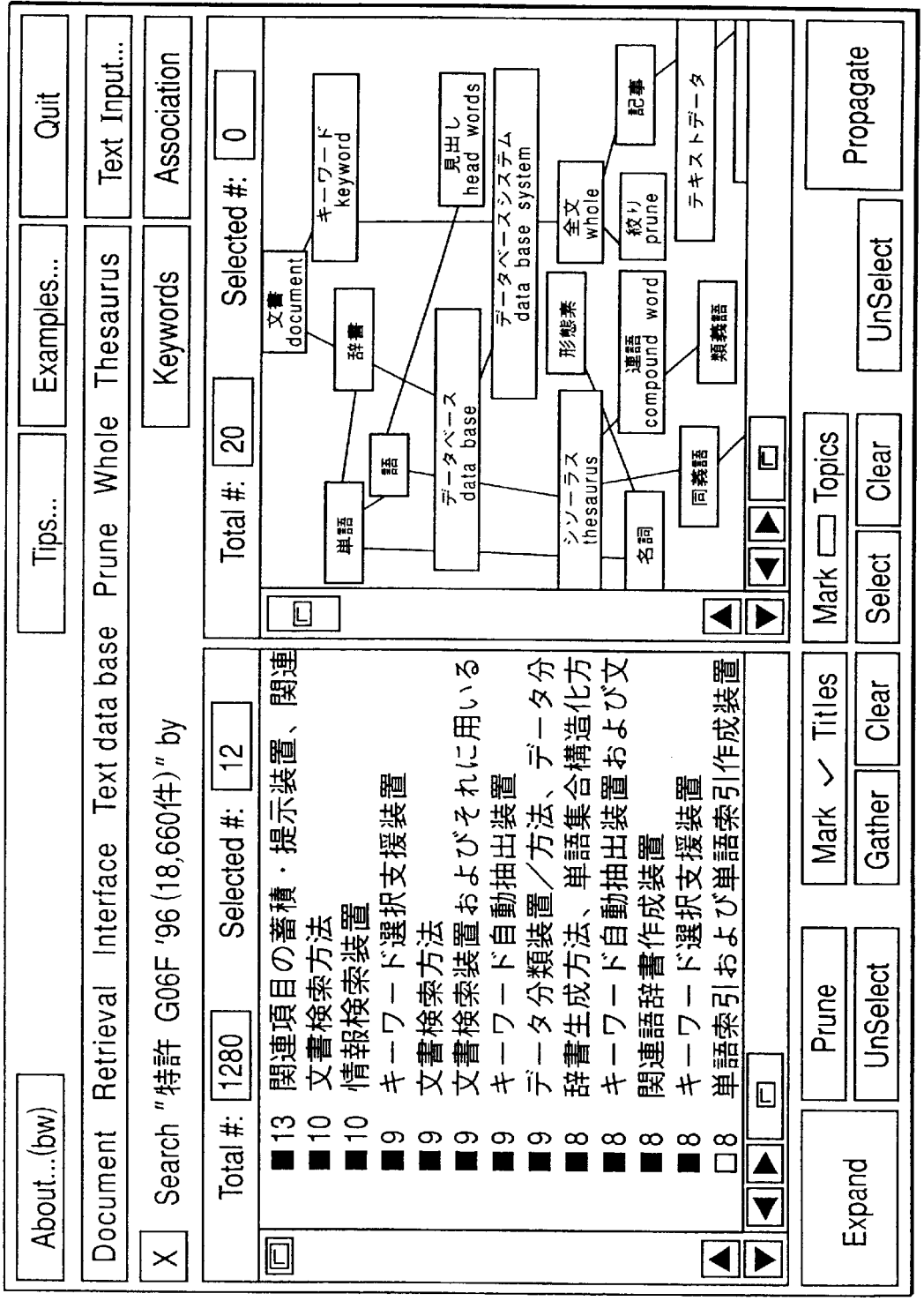
FIG. 49 is a view representing that only the upper documents are selected with mouse clicking from the search results.
Figure 50:
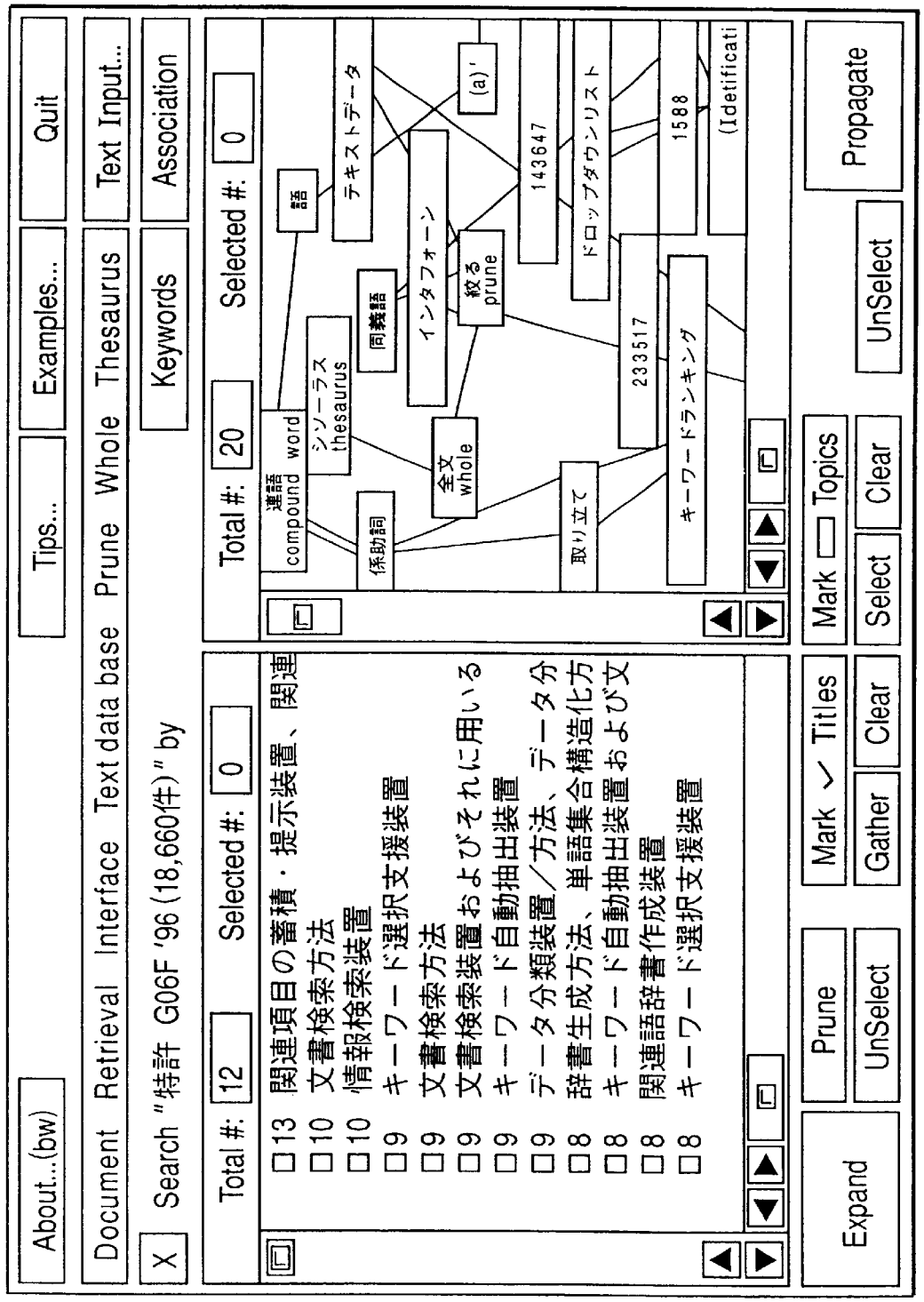
FIG. 50 is a view representing the key word search results by pushing a prune button when only the selected documents are search subjects.
Figure 51:
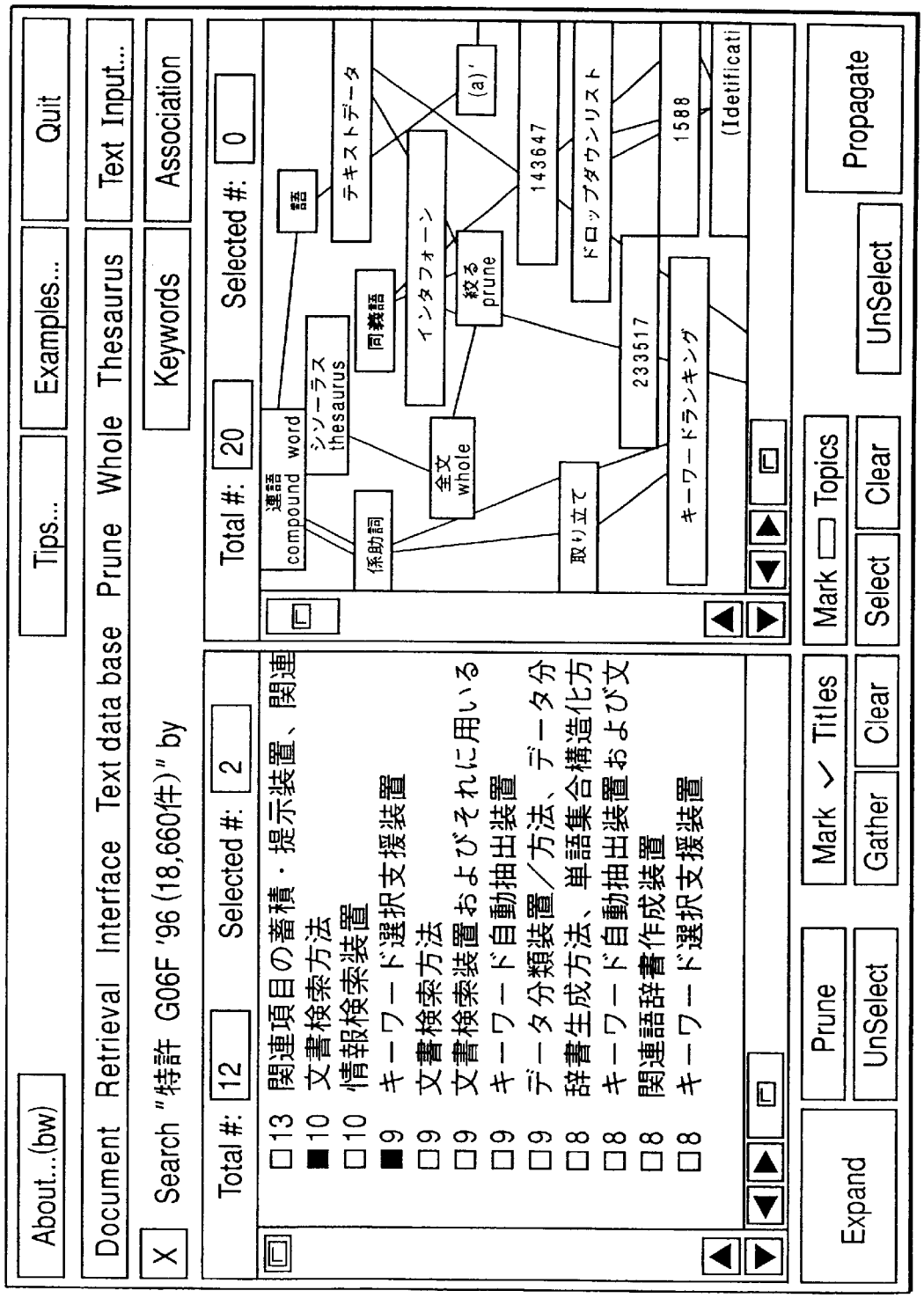
FIG. 51 is a view representing that two document titles are selected with mouse clicking, so as to commit associative search with specific documents among the selected documents.
Figure 52:
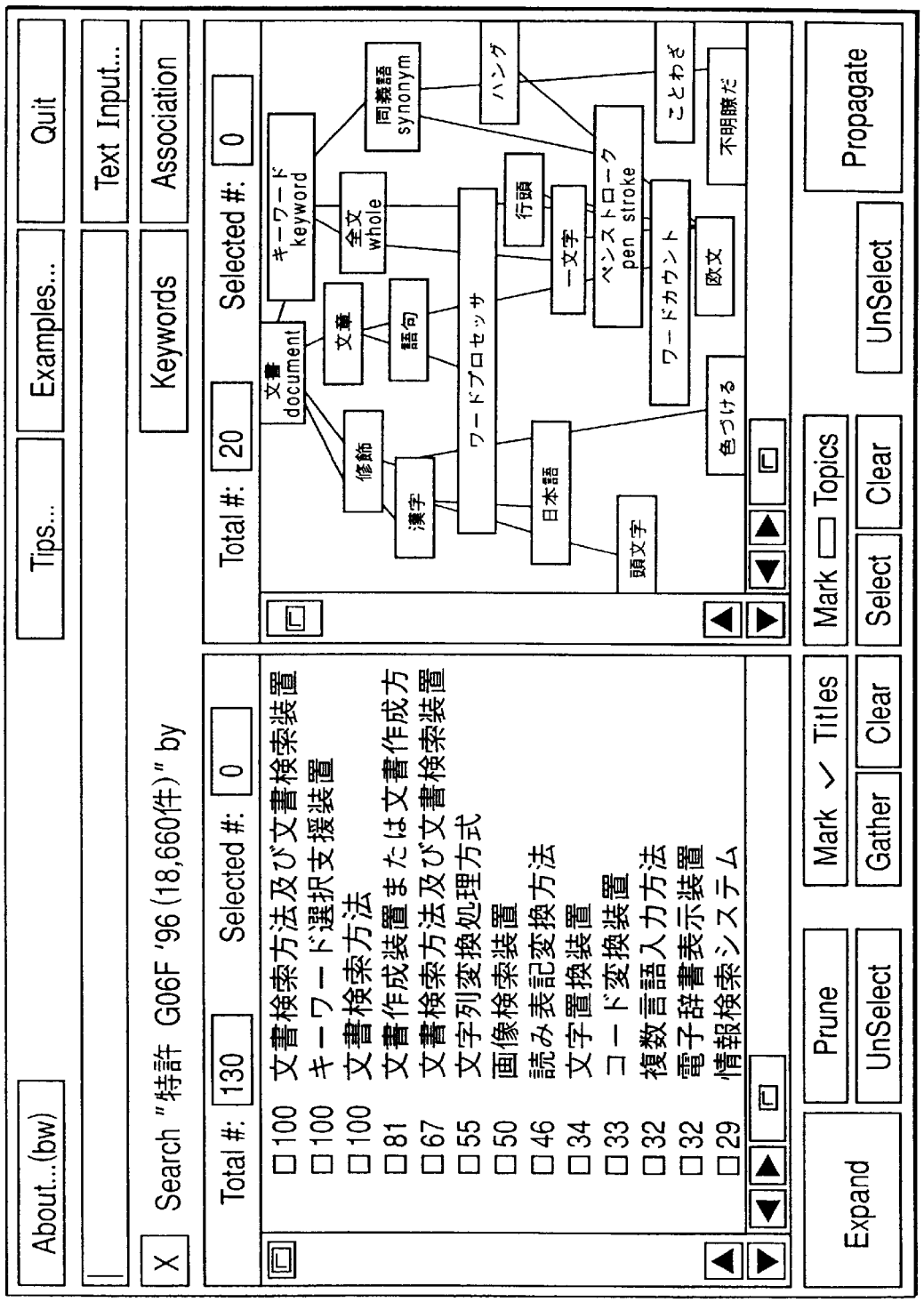
FIG. 52 is a view representing the results of associative search by pushing search key "Association"
Figure 53:
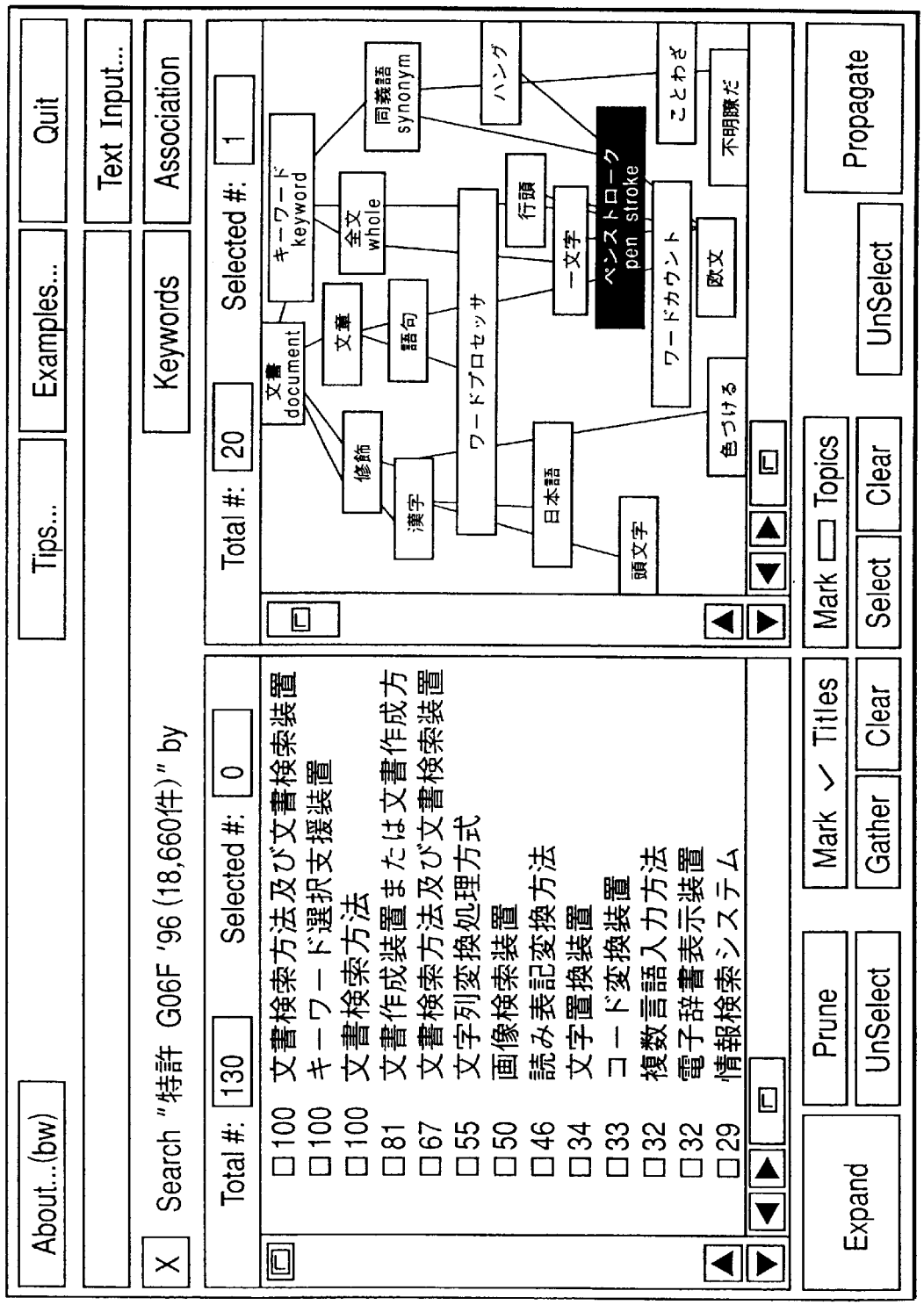
FIG. 53 is a view representing that topic word "pen stroke (ペンストローク)" is selected on the first image of an exemplified change of the interface image when the function of propagating the selection of topic words is utilized by using topic word "pen stroke (ペンストローク)" as a key, with attention focused on the graphic expression of topic words recovered after associative search.
Figure 54:
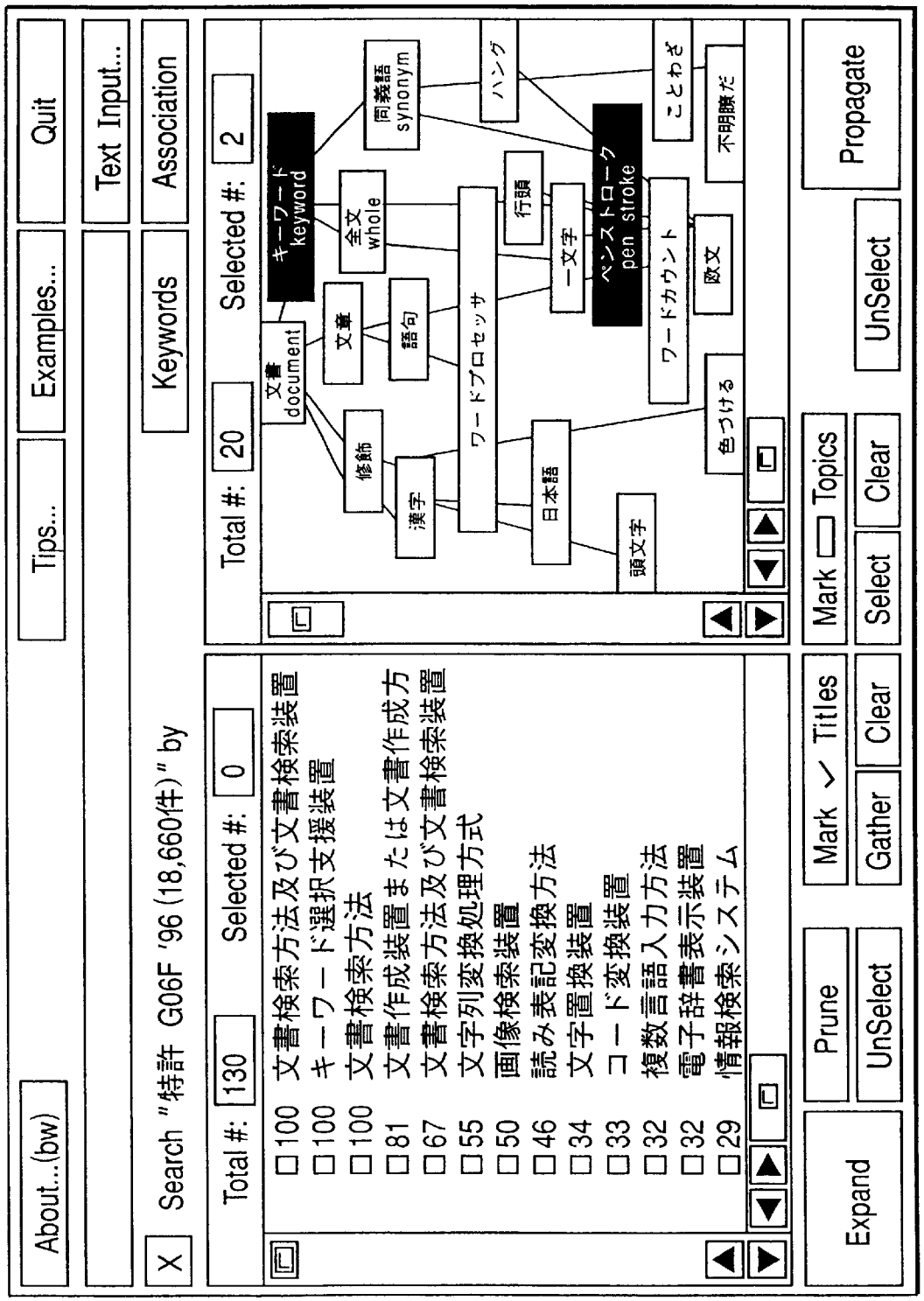
FIG. 54 is a view representing that topic word-key word which can be followed by at most one path from the selected topic word-pen stroke is put at selected state, by pushing propagate (right) button "Propagate", on the next display of the one example of the interface image change.
Figure 55:
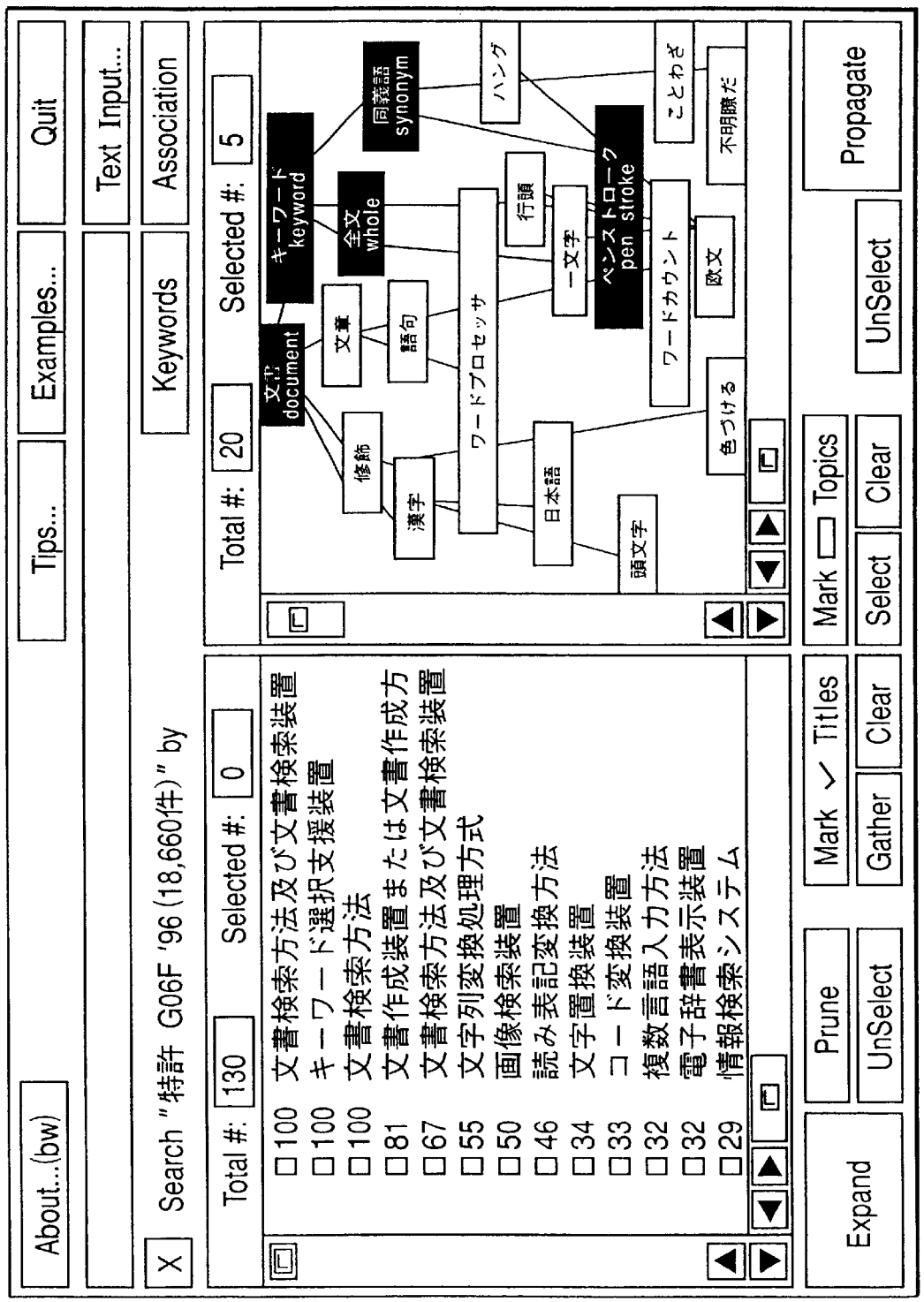
FIG. 55 is a view representing that the topic words "文書 (document)", "全文 (whole document)" and - - - , which can be followed by at most one path from the topic word-key word, are put at selection state, by continuously pushing the propagate (right) button "Propagate", on the second next image of the one example of the interface image change.

FIG. 38 depicts the interface image at a state of "document retrieval interface (文献検索インター フェース)" inputted as it is as a key word input, indicating that the input character row appears as it is on the key word input window. FIG. 39 depicts such a status that the input character row "document retrieval interface (文献検索インター フェース)" is decomposed into three key words of document (文献), retrieval (検索) and interface (インターフェース) for carrying out retrieval as the consequence of pushing the key word search button "Key words", to recover a total of 1280 patents as search results, which are then listed up in the decreasing order of relevance score to be graphically displayed in the decreasing order of significance within a designated total range of 20. Herein, the keyword selection and graphic display are executed according to the methods disclosed in the U.S. patent application Ser. No. 08/888,017 previously mentioned, and the description thereof is omitted. FIG. 40 depicts how a user can click mouse to select the nodes of topic words for the purpose of selecting entitled documents containing all of the individual key words, namely key word (キーワード), presence (存在), compound word (連語) and thesaurus (シソーラス), while attention being focused on these key words and the key word graph on FIG. 39 is watched. The selected topic words are expressed in void characters on black background. FIG. 41 depicts the results of marking by pushing mark title button Mark∨Title at that state. In the figure, broader marks are put to documents with more designated key words, although the marks are not so apparently shown. FIG. 42 depicts the results of sorting the documents by pushing the sort button Gather. In the figure, documents with broader marks are listed on higher ranks. FIG. 43 depicts the state of topic word nodes by pushing unselect button Clear (matching B23). FIG. 44 depicts the selection state of four documents more broadly marked by a user, by sequentially pushing the selection windows thereof, while the user focuses attention on the documents. FIG. 45 depicts examples where the frames enclosing the topic words appearing in these documents are displayed broadly by a user by pushing the mark topic word button Mark□Topics. FIG. 46 depicts that topic words marked as topics and then selected are displayed in void characters when a user pushes the selection button Select. By pushing the selected topic words with the left button of mouse while pushing shift key at that state, the selection is released to put the topic words at non selection state. FIG. 47 depicts the state of one of the topic words clicked with mouse when they are at the selection state, so as to register all the topic words at selection state as shown in FIG. 46 as key words. At the state, new key words are displayed on the keyword window. FIG. 48 is a view depicting the search results corresponding to the new key words. FIG. 49 depicts the state of only the upper ranked 12 documents selected by mouse clicking. FIG. 50 depicts the results of pushing the prune button Prune to define only the selected 12 documents as search subjects. FIG. 51 depicts the state of two documents of which titles are clicked with mouse for their selection, so as to carryout associative search. FIG. 52 depicts the results of carrying out associative search by pushing the search key Association at that state. FIGS. 53, 54 and 55 are views depicting one example of the change of the interface image wherein a function to propagate the selection of topic words is utilized by using topic word/pen stroke as keys, while attention is focused on the graphic display of the topic words recovered as the results of the associative search. FIG. 53 depicts the state of only topic word/pen stroke in selection. FIG. 54 depicts the selected state of a topic word/key word, possibly linked through one path at most from the selected topic word/pen stroke, by pushing the propagate (right) button Propagate at the state. FIG. 55 depicts the selected state of topic word/document, the whole text and thesaurus possibly linked through one path at most from the topic word/key word, as the consequence of continuous pushing of the propagate (right) button Propagate for propagation.

As shown in the example, various retrieval can be developed from the input character row "document retrieval interface (文献検索インターフェイス)".

Not specifically shown as examples, herein, routine procedures for a series of retrieval operations may be set to autonomous operation once the initial operation of the routine procedures is designated, so that the resulting retrieval system may be more convenient for users.

As described in the examples of specific embodiments insofar, retrieval can be effected more conveniently as described below, in accordance with the embodiments of the present invention.

(1) Because information about the topic relevance degree between word groups characteristically appearing in a retrieved document group is arranged and displayed together with a list of titles as primary information from search results, users can carry out retrieval operation while watching the overview of search results together with specific information such as the titles. Additionally, the displayed topic words can be utilized as search words; some of the displayed topic words can be selected by simple mouse operation, to emphasize the titles containing them to concentrate the emphasized titles on the top of a list; by selecting some titles, alternatively, topic words contained in the titles can be emphasized at a high speed, so that the search queries can be improved or retrieval from another standpoint can be attempted, in a simple manner.

(2) The retrieval assisting interface includes a button for search via key word and a button for associative search based on document similarity, and information indicating the address of a document is inputted from the query inputted column for associative search by using a designated document as a key when an associative search button is pushed. Because an interesting document can be selected while watching the title display area of search results and because a button for associative search by means of a selected document as a key is present, a user can retrieve documents with deep relevance to an interesting document a user has found or his (her) own document or an interesting document encountered under the way of retrieval operation, in a simple fashion.

(3) When a button for text input is pushed, a text input means with a button for associative search by means of a text input window and an input text thereon as keys is displayed on an image, so a user can input a part of an interesting document, for example phrase, sentence, and paragraph and the like, from keyboard or through cut and paste operation. Hence, the user can readily retrieve documents with some relation.

In accordance with the present invention, results more satisfying the search query can readily be yielded, while utilizing search results.

What is claimed is:

1. A computer program for assisting document retrieval embodied on computer-readable medium including a retrieval assisting execution program, wherein the retrieval assisting execution program comprises a program for arranging and displaying a display area of the search results in a list of a set of retrieved documents including information in a form from which the agent identifies the retrieved document and an area for displaying topic words reflecting the search results in one of a list or a graph indicating a degree of relevance between the topic words extracted from the set of retrieved documents, a communication program with which the search query input by a user of the program is sent to an information provider computer and with which said agent computer receives necessary information produced and sent from the provider computer concerning the search results, topic words and cross-reference data between retrieved documents and corresponding topic-words, and further receives a program with a set of retrieval operations comprising:

a step of adding or deleting a word display as a topic word to or from search words;

a step of designating a selection/no selection state of each word displayed as a topic word;

a step of emphasizing each document containing one or more selected topic words with an intensity, depending on how many selected topic words are contained;

a step of rearranging and displaying the search results in decreasing order of intensity for emphasis;

a step of designating a selection/no selection state of each document from the search results;

a step of emphasizing topic words contained in the selected documents;

a step of carrying out an associative search by using one or more selected documents as a search key; and a prune step of leaving only selected documents and gathering information about topic words only from the selected documents.

* * * * *